US012020640B2

(12) United States Patent
Kim

(10) Patent No.: US 12,020,640 B2
(45) Date of Patent: Jun. 25, 2024

(54) PIXEL AND ORGANIC LIGHT EMITTING DISPLAY DEVICE COMPRISING THE SAME

(71) Applicant: LG Display Co., Ltd., Seoul (KR)

(72) Inventor: Jaesung Kim, Uijeongbu-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/460,529

(22) Filed: Aug. 30, 2021

(65) Prior Publication Data

US 2022/0122534 A1 Apr. 21, 2022

(30) Foreign Application Priority Data

Oct. 21, 2020 (KR) ........................ 10-2020-0137040

(51) Int. Cl.
*G09G 3/3233* (2016.01)

(52) U.S. Cl.
CPC ... *G09G 3/3233* (2013.01); *G09G 2300/0426* (2013.01); *G09G 2300/0819* (2013.01);
(Continued)

(58) Field of Classification Search
CPC ......... G09G 3/3233; G09G 2300/0426; G09G 2300/0819; G09G 2300/0842; G09G 2320/0233; G09G 2300/0861; G09G 2320/0223; G09G 3/3275; G09G 3/3266; H01L 27/1225
See application file for complete search history.

(56) References Cited

U.S. PATENT DOCUMENTS 8,446,397 B2 5/2013 Kimura
9,721,508 B2 8/2017 Sun et al.
(Continued)

FOREIGN PATENT DOCUMENTS

CN 105405397 A 3/2016
CN 108288456 A 7/2018
(Continued)

OTHER PUBLICATIONS

European Patent Office, Extended European Search Report and Opinion, EP Patent Application No. 21195234.6, Feb. 17, 2022, nine pages.
(Continued)

*Primary Examiner* — Jeff Piziali
(74) *Attorney, Agent, or Firm* — Fenwick & West LLP

(57) ABSTRACT

A pixel for an organic light emitting display device includes an organic light emitting diode that emits light by a driving current, a driving transistor configured to control the driving current, a first transistor to connect the second node and the third node, a second transistor to apply a data voltage to the first node, a third transistor to apply a high-potential driving voltage to the second node, a fourth transistor that forms a current path between the driving transistor and the organic light emitting diode, a fifth transistor to apply an initial voltage to the driving transistor, a sixth transistor configured to apply a reset voltage to a fourth node which is an anode electrode of the organic light emitting diode, a seventh transistor configured to apply the high-potential driving voltage to the fifth node, and an eighth transistor configured to apply a reference voltage to the fifth node.

12 Claims, 38 Drawing Sheets

(52) U.S. Cl.
CPC ............... *G09G 2300/0842* (2013.01); *G09G 2320/0233* (2013.01)

(56) References Cited

U.S. PATENT DOCUMENTS

| | | | |
|---|---|---|---|
| 10,916,198 B2 | 2/2021 | Lin et al. | |
| 10,971,064 B2 | 4/2021 | Lee et al. | |
| 10,971,069 B2 | 4/2021 | Wang et al. | |
| 11,282,462 B2 | 3/2022 | Lin et al. | |
| 11,386,842 B2 | 7/2022 | Lee et al. | |
| 11,651,736 B2 | 5/2023 | Lin et al. | |
| 2010/0141630 A1 | 6/2010 | Kimura | |
| 2010/0265237 A1 | 10/2010 | Tsuge | |
| 2015/0138180 A1* | 5/2015 | Park | G09G 3/3233 345/212 |
| 2015/0348462 A1 | 12/2015 | Ma | |
| 2016/0351122 A1 | 12/2016 | Jung et al. | |
| 2017/0110054 A1 | 4/2017 | Sun et al. | |
| 2018/0218673 A1* | 8/2018 | Li | G09G 3/3233 |
| 2019/0066598 A1 | 2/2019 | Kim et al. | |
| 2019/0131376 A1 | 5/2019 | Hong et al. | |
| 2019/0355302 A1* | 11/2019 | Ding | H01L 27/14609 |
| 2019/0371238 A1 | 12/2019 | Gao et al. | |
| 2020/0090591 A1 | 3/2020 | Wang et al. | |
| 2020/0211452 A1 | 7/2020 | Lee et al. | |
| 2020/0226978 A1 | 7/2020 | Lin et al. | |
| 2020/0251057 A1* | 8/2020 | Sun | G09G 3/3275 |
| 2021/0020109 A1 | 1/2021 | Lin et al. | |
| 2021/0193030 A1 | 6/2021 | Lee et al. | |
| 2022/0101793 A1* | 3/2022 | Yu | G09G 3/3258 |
| 2022/0114943 A1* | 4/2022 | Cao | G09G 3/3258 |
| 2022/0180812 A1 | 6/2022 | Lin et al. | |
| 2023/0237965 A1 | 7/2023 | Lin et al. | |

FOREIGN PATENT DOCUMENTS

| | | | |
|---|---|---|---|
| CN | 108492780 | A | 9/2018 |
| CN | 111383591 | A | 7/2020 |
| CN | 111435587 | A | 7/2020 |
| JP | 2010-156962 | A | 7/2010 |
| JP | 2010-266848 | A | 11/2010 |
| JP | 2014-228744 | A | 12/2014 |
| KR | 10-2020-0087711 | A | 7/2020 |
| TW | 201928930 | A | 7/2019 |

OTHER PUBLICATIONS

Japan Patent Office, Office Action, JP Patent Application No. 2021-151717, Aug. 25, 2022, 16 pages.

China National Intellectual Property Administration, Office Action, Chinese Patent Application No. 202111139441.6, Nov. 9, 2023, 17 pages.

China National Intellectual Property Administration, Office Action, Chinese Patent Application No. 202111139441.6, Apr. 22, 2024, 22 pages.

* cited by examiner

| | | | | |
|---|---|---|---|---|
| 1344 | 1784 | 1260 | 1775 | 1318 |
| 1277 | 1483 | 1227 | 1515 | 1298 |
| 1310 | 1389 | 1250 | 1420 | 1307 |

FIG. 6A
(RELATED ART)

| | | | | |
|---|---|---|---|---|
| 1200 | 1305 | 1334 | 1306 | 1204 |
| 1208 | 1343 | 1342 | 1320 | 1214 |
| 1223 | 1338 | 1367 | 1340 | 1225 |

FIG. 6B

PIXEL AND ORGANIC LIGHT EMITTING DISPLAY DEVICE COMPRISING THE SAME

CROSS-REFERENCE TO RELATED APPLICATIONS

This application claims the priority of Republic of Korea Patent Application No. 10-2020-0137040 filed on Oct. 21, 2020, in the Korean Intellectual Property Office, the disclosure of which is hereby incorporated by reference in its entirety.

BACKGROUND

Field

The present disclosure relates to a pixel and an organic light emitting display device comprising the same, and more particularly, to an organic light emitting display device with a variable driving frequency.

Description of the Related Art

An organic light emitting diode OLED, which is a self-emission device, includes an anode electrode, a cathode electrode, and an organic compound layer formed therebetween. The organic compound layer comprises of a hole transport layer HTL, an emission layer EML, and an electron transport layer ETL. When the driving voltage is applied to the anode electrode and the cathode electrode, holes passing through a hole transport layer HTL and electrons passing through an electron transport layer ETL are moved to an emission layer EML to form excitons, and as a result, the emission layer EML generates visible light. An active matrix type organic light emitting display device includes an organic light emitting diode OLED self-emitting light, and has been variously used due to advantages of fast response rate, and large emission efficiency, luminance, and view angle.

The organic light emitting display device arranges pixels including the OLEDs in the form of a matrix and adjusts the luminance of pixels according to a gray scale of video data. Each of the pixels includes an OLED, a driving transistor controlling a driving current flowing in the OLED according to a gate-source voltage, and at least one switching transistor programming the gate-source voltage of the driving transistor. A source electrode of the driving transistor is connected to a high-potential voltage line, and the driving current is affected by the variance of the high-potential voltage.

Therefore, as the organic light emitting display device is large-scaled, the drop of high-potential voltage occurs due to the resistance of the high-potential voltage line. As a result, the driving current affected by the high-potential voltage becomes unstable. Therefore, a conventional organic light emitting display device has a problem that the luminance of the pixels is uneven.

SUMMARY

The present disclosure is directed to an organic light emitting display device designed to which a pixel circuit is newly designed to reduce the instability of the driving current as described above.

Therefore, an object to be achieved by the present disclosure is to provide an organic light emitting display device capable of stabilizing a driving current of the organic light emitting display device.

Another object to be achieved by the present disclosure is to provide a display device capable of uniformizing the pixel luminance of a large-scaled organic light emitting display device.

Objects of the present disclosure are not limited to the above-mentioned objects, and other objects, which are not mentioned above, can be clearly understood by those skilled in the art from the following descriptions.

According to an aspect of the present disclosure, the organic light emitting display device includes: a plurality of pixels disposed on a display panel, in which each of the plurality of pixels includes an organic light emitting diode that emits light by a driving current, a driving transistor configured to control the driving current and includes a source electrode as a first node, a gate electrode as a second node, and a drain electrode as a third node, a first transistor configured to connect the second node and the third node, a second transistor configured to apply a data voltage to the first node, a third transistor configured to apply a high-potential driving voltage VDD to the second node, a fourth transistor that forms a current path between the driving transistor and the organic light emitting diode, a fifth transistor configured to apply an initial voltage Vini to the driving transistor, a sixth transistor configured to apply a reset voltage VAR to a fourth node which is an anode electrode of the organic light emitting diode, a storage capacitor that includes one electrode connected to the second node and the other electrode connected to a fifth node, a seventh transistor configured to apply the high-potential driving voltage to the fifth node, and an eighth transistor configured to apply a reference voltage Vref to the fifth node, so as to uniformize the pixel luminance of a large-scaled organic light emitting display device.

Other detailed matters of the exemplary embodiments are included in the detailed description and the drawings.

According to the present disclosure, the driving current of the OLED may be controlled regardless of the variances of the threshold voltage and the high-potential driving voltage of the driving transistor to implement constant luminance.

According to the present disclosure, a bias stress is applied to the driving transistor to alleviate a hysteresis effect of the driving transistor.

According to the present disclosure, since a wiring for applying a separate on-bias stress voltage is unnecessary, the resolution of the panel may be increased and a bezel area may also be reduced.

According to the present disclosure, a constant voltage level may be maintained on the anode electrode of the OLED, so that a change in luminance of the organic light emitting display device may be reduced to increase the image quality.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which:

FIG. 6A is a diagram illustrating the luminance for each area of a conventional organic light emitting display device;

FIG. 6B is a diagram illustrating the luminance for each area of the organic light emitting display device according to an exemplary embodiment of the present disclosure;

DETAILED DESCRIPTION

Figure 1:
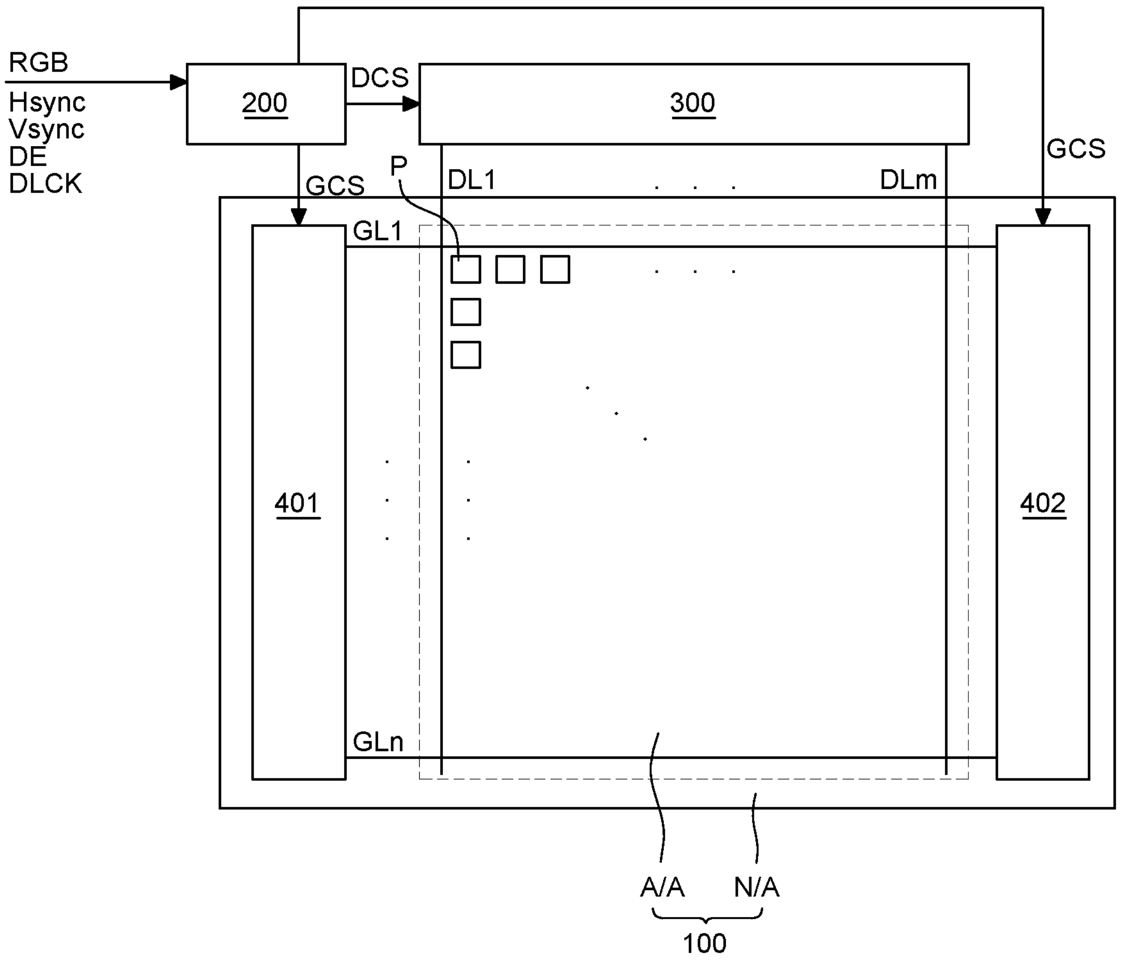
FIG. 1 is a block diagram of an organic light emitting display device according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as “including,” “having,” and “comprising” used herein are generally intended to allow other components to be added unless the terms are used with the term “only”. Any references to singular may include plural unless expressly stated otherwise.

Components are interpreted to include an ordinary error range even if not expressly stated.

When the position relation between two parts is described using the terms such as “on”, “above”, “below”, and “next”, one or more parts may be positioned between the two parts unless the terms are used with the term “immediately” or “directly”.

When an element or layer is disposed “on” another element or layer, another layer or another element may be interposed directly on the other element or therebetween.

Although the terms “first”, “second”, and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

A low level of a signal may be defined as a first level and a high level of a signal may be defined as a second level.

Hereinafter, a display device according to exemplary embodiments of the present disclosure will be described in detail with reference to accompanying drawings.

FIG. 1 is a block diagram of an organic light emitting display device according to an exemplary embodiment of the present disclosure.

Referring to FIG. 1, the organic light emitting display device according to an exemplary embodiment of the present disclosure includes a display panel 100, a timing control circuit 200, a data driver 300, and gate drivers 401 and 402.

The display panel 100 includes a display area A/A displaying an image and a non-display area N/A which is located outside the display area A/A and disposed with various kinds of signal lines and the gate drivers 401 and 402.

In order to display an image, in the display area A/A, a plurality of pixels P are disposed. In addition, in the display area A/A, n gate lines GL1 to GLn disposed in a first direction and m data lines DL1 to DLm disposed in a different direction from the first direction are disposed. The plurality of pixels P are electrically connected to the n gate lines GL1 to GLn and the m data lines DL1 to DLm. Thus, a gate voltage and a data voltage are applied to the pixels P through the gate lines GL1 to GLn and the data lines DL1 to DLm, respectively. In addition, each of the pixels P implements a gray scale by the gate voltage and the data voltage. Finally, an image is displayed in the display area A/A by the gray scale displayed by each of the pixels P.

In the non-display area N/A, various signal lines GL1 to GLn and DL1 to DLm which transmit signals for controlling an operation of the pixels P disposed in the display area A/A and the gate drivers 401 and 402 are disposed.

The timing control circuit 200 transmits an input image signal RGB received from a host system to the data driver 300.

The timing control circuit 200 may generate control signals GCS and DCS for controlling operation timings of the gate drivers 401 and 402 and the data driver 300 using timing signals, such as a clock signal DCLK, a horizontal synchronization signal Hsync, a vertical synchronization signal Vsync, and a data enable signal DE, which are received together with image data RGB. Here, the horizontal synchronization signal Hsync is a signal indicating a time taken to display a horizontal line of a screen, the vertical synchronization signal Vsync is a signal indicating a time taken to display a screen of one frame, and the data enable signal DE is a signal indicating a period of supplying a data voltage to a pixel P defined in the display panel 100.

In other words, the timing control circuit 200 receives a timing signal to output the gate control signal GCS to the gate drivers 401 and 402 and output the data control signal DCS to the data driver 300.

The data driver 300 receives the data control signal DCS to output the data voltage to the data lines DL1 to DLm.

Specifically, the data driver 300 generates a sampling signal according to the data control signal DCS, latches the image data RGB according to the sampling signal to be changed to the data voltage, and then supplies the data voltage to the data lines DL1 to DLm in response to a source output enable (SOE) signal.

The data driver 300 may be connected to a bonding pad of the display panel 100 by a chip on glass (COG) method or disposed directly on the display panel 100, or in some cases, may also be integrated and disposed in the display panel 100. Further, the data driver 300 may be disposed by a chip on film (COF) method.

The gate drivers 401 and 402 sequentially supply a scan signal, an emission signal, and a reset signal corresponding to the gate voltage to the gate lines GL1 to GLn according to the gate control signal GCS.

The general gate drivers 401 and 402 may be formed independently of the display panel 100 to be electrically connected with the display panel in various manners. However, the gate drivers 401 and 402 of the organic light emitting display device according to an exemplary embodiment of the present disclosure are formed in a thin film pattern form when manufacturing a substrate of the display panel 100 to be embedded on the non-display area N/A by a gate in panel (GIP) method.

The gate drivers 401 and 402 may be separated into a first gate driver 401 and a second gate driver 402 disposed on both sides of the display panel 100.

Specifically, the first gate driver 401 supplies a scan signal and a reset signal to the plurality of pixels P. Then, the first gate driver 401 may include a plurality of scan driving stages and a plurality of reset driving stages. In addition, the plurality of scan driving stages supplies the scan signal to the plurality of pixels P, and the plurality of reset driving stages supplies the reset signal to the plurality of pixels P.

In addition, the second gate driver 402 supplies a scan signal and an emission signal to the plurality of pixels P. Then, the second gate driver 402 may include a plurality of scan driving stages and a plurality of emission driving stages. In addition, the plurality of scan driving stages supplies the scan signal to the plurality of pixels P, and the plurality of emission driving stages supplies the emission signal to the plurality of pixels P.

Hereinafter, a configuration and a driving method of the plurality of pixels P will be described in detail.

Switch elements constituting each of the plurality of pixels P may be implemented as transistors of an n-type or p-type MOSFET structure. In the following exemplary embodiments, the n-type transistors are exemplified, but the present disclosure is not limited thereto.

Additionally, the transistor is a three-electrode element including a gate electrode, a source electrode and a drain electrode. The source electrode is an electrode for supplying a carrier to a transistor. The carrier in the transistor starts to flow from the source electrode. The drain electrode is an electrode that discharges the carrier from the transistor to the outside. That is, the carrier in the MOSFET flows from the source electrode to the drain electrode. In the case of an n-type MOSFET (NMOS), since the carrier is an electron, the voltage of the source electrode is lower than the voltage of the drain electrode so that the electrons may flow from the source electrode to the drain electrode. In the n-type MOSFET, since the electrons flow from the source electrode to the drain electrode, the current flows toward the source electrode from the drain electrode. In the case of a p-type MOSFET (PMOS), since the carrier is a hole, the voltage of the source electrode is higher than the voltage of the drain electrode so that the holes may flow from the source electrode to the drain electrode. In the p-type MOSFET, since the holes flow from the source electrode to the drain electrode, the current flows toward the drain electrode from the source electrode. It should be noted that the source electrode and the drain electrode of the MOSFET are not fixed. For example, the source electrode and the drain electrode of the MOSFET may be changed according to an applied voltage. In the following exemplary embodiments, the present disclosure should not be limited due to the source electrode and the drain electrode of the transistor.

Figure 2:
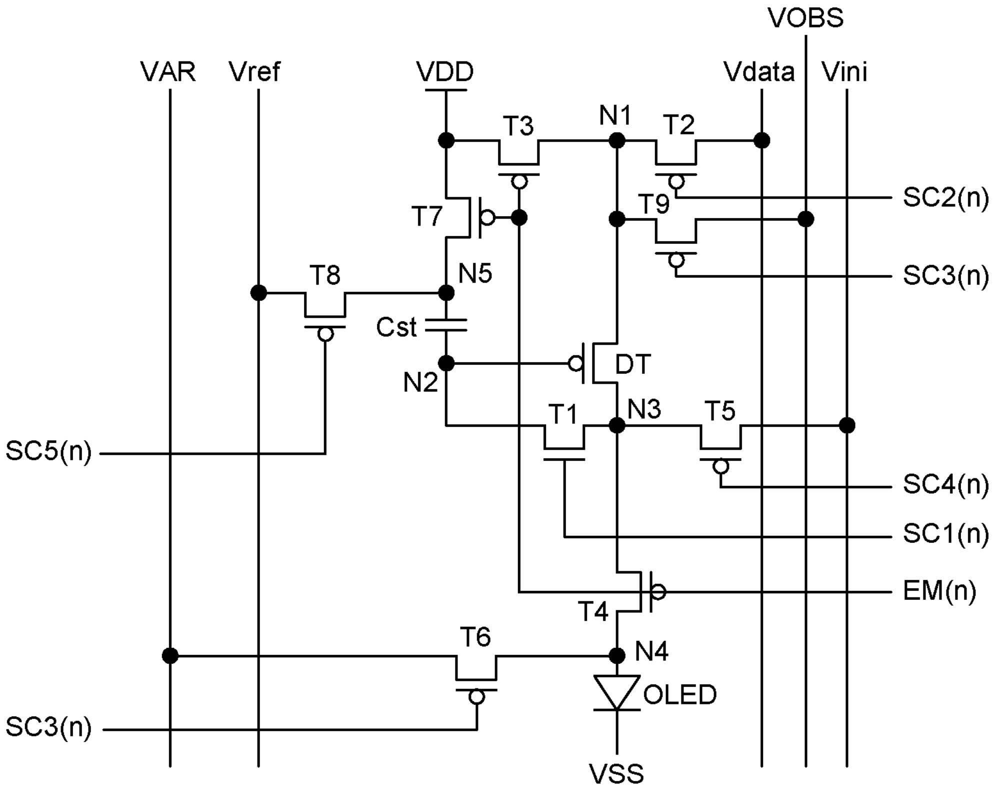
FIG. 2 is a circuit diagram illustrating a pixel of the organic light emitting display device according to an exemplary embodiment of the present disclosure.

FIG. 2 is a circuit diagram illustrating a pixel of the organic light emitting display device according to an exemplary embodiment of the present disclosure.

Each pixel P includes an organic light emitting diode OLED, a driving transistor DT, first to ninth transistors T1 to T9, and a capacitor Cst.

The organic light emitting diode OLED emits light by a driving current supplied from the driving transistor DT. A multilayered organic compound layer is formed between an anode electrode and a cathode electrode of the organic light emitting diode OLED. The organic compound layer may include at least one hole transfer layer and electron transfer layer, and an emission layer EML. Here, the hole transfer layer is a layer that injects or transfers holes to the emission layer, and may include, for example, a hole injection layer HIL, a hole transport layer HTL, an electron blocking layer EBL, and the like. In addition, the electron transfer layer is a layer that injects or transfers electrons to the emission layer, and may include, for example, an electron transport layer ETL, an electron injection layer EIL, a hole blocking layer HBL, and the like. The anode electrode of the organic light emitting diode OLED is connected to a fourth node N4, and the cathode electrode of the organic light emitting diode OLED is connected to an input terminal of a low-potential driving voltage VSS.

The driving transistor DT controls a driving current applied to the organic light emitting diode OLED according to a source-gate voltage Vsg thereof. The driving transistor DT may be a p-type MOSFET PMOS and may be a low-temperature polycrystalline silicon (LTPS) thin film transistor. In addition, the source electrode of the driving transistor DT is connected to a first node N1, the gate electrode is connected to a second node N2, and the drain electrode is connected to a third node N3.

The first transistor T1 connects the gate electrode and the drain electrode. The first transistor T1 may be an n-type MOSFET NMOS to reduce the leakage current, and may be an oxide thin film transistor. The first transistor T1 includes a drain electrode connected to the third node N3, a source electrode connected to the second node N2, and a gate electrode connected to a first scan signal line for transmitting a first scan signal SC1(*n*). Thus, the first transistor T1 connects a gate electrode and a drain electrode of the driving transistor DT, in response to the first scan signal SC1(*n*) at a high level which is a turn-on level.

The second transistor T2 applies a data voltage Vdata received from the data line to the first node N1 which is the source electrode of the driving transistor DT. The second transistor T2 may be a p-type MOSFET PMOS and may be a low-temperature polycrystalline silicon (LTPS) thin film transistor. The second transistor T2 includes a source electrode connected to the data line, a drain electrode connected to the first node N1, and a gate electrode connected to a second scan signal line for transmitting a second scan signal SC2(*n*). Then, the second transistor T2 applies a data voltage Vdata received from the data line to the first node N1 which is the source electrode of the driving transistor DT, in response to the second scan signal SC2(*n*) at a low level which is a turn-on level.

The third transistor T3 applies a high-potential driving voltage VDD to the first node N1 which is the source electrode of the driving transistor DT. The third transistor T3 may be a p-type MOSFET PMOS and may be a low-temperature polycrystalline silicon (LTPS) thin film transistor. The third transistor T3 includes a source electrode connected to a high-potential driving voltage line for transmitting the high-potential driving voltage VDD, a drain electrode connected to the first node N1, and a gate electrode connected to an emission signal line for transmitting an emission signal EM(n). Then, the third transistor T3 applies the high-potential driving voltage VDD to the first node N1 which is the source electrode of the driving transistor DT, in response to the emission signal EM(n) at a low level which is a turn-on level.

The fourth transistor T4 forms a current path between the driving transistor DT and the organic light emitting diode OLED. The fourth transistor T4 may be a p-type MOSFET PMOS and may be a low-temperature polycrystalline silicon (LTPS) thin film transistor. The fourth transistor T4 includes a source electrode connected to the third node N3, a drain electrode connected to the fourth node N4, and a gate electrode connected to an emission signal line for transmitting the emission signal EM(n). The fourth transistor T4 forms a current path between the third node N3 which is the source electrode of the fourth transistor T4 and the fourth node N4 which is the drain electrode of the fourth transistor T4, in response to the emission signal EM(n). Then, the fourth transistor T4 forms a current path between the driving transistor DT and the organic light emitting diode OLED in response to the emission signal EM(n) at a low level which is a turn-on level.

The fifth transistor T5 applies an initial voltage Vini to the third node N3 which is the drain electrode of the driving transistor DT. The fifth transistor T5 may be a p-type MOSFET PMOS and may be a low-temperature polycrystalline silicon (LTPS) thin film transistor. The fifth transistor T5 includes a source electrode connected to an initial voltage line for transmitting the initial voltage Vini, a drain electrode connected to the third node N3, and a gate electrode connected to a fourth scan signal line for transmitting a fourth scan signal SC4(*n*). Then, the fifth transistor T5 applies the initial voltage Vini to the third node N3 which is the drain electrode of the driving transistor DT, in response to the fourth scan signal SC4(*n*) at a low level which is a turn-on level.

The sixth transistor T6 applies a reset voltage VAR to the fourth node N4 which is an anode of the organic light emitting diode. The sixth transistor T6 may be a p-type MOSFET PMOS and may be a low-temperature polycrystalline silicon (LTPS) thin film transistor. The sixth transistor T6 includes a source electrode connected to a reset voltage line for transmitting the reset voltage VAR, a drain electrode connected to the fourth node N4, and a gate electrode connected to a third scan signal line for transmitting a third scan signal SC3(*n*). Then, the sixth transistor T6 applies the reset voltage VAR to the fourth node N4 which is the anode of the organic light emitting diode, in response to the third scan signal SC3(*n*) at a low level which is a turn-on level.

The seventh transistor T7 applies a high-potential driving voltage VDD to the fifth node N5. The seventh transistor T7 may be a p-type MOSFET PMOS and may be a low-temperature polycrystalline silicon (LTPS) thin film transistor. The seventh transistor T7 includes a source electrode connected to a high-potential driving voltage line for transmitting the high-potential driving voltage VDD, a drain electrode connected to the fifth node N5, and a gate electrode connected to an emission signal line for transmitting an emission signal EM(n). Then, the seventh transistor T7 applies the high-potential driving voltage VDD to the fifth node N5, in response to the emission signal EM(n) at a low level which is a turn-on level.

The eighth transistor T8 applies a reference voltage Vref to the fifth node N5. The eighth transistor T8 may be a p-type MOSFET PMOS and may be a low-temperature polycrystalline silicon (LTPS) thin film transistor. The eighth transistor T8 includes a source electrode connected to a reference voltage line for transmitting the reference voltage Vref, a drain electrode connected to the fifth node N5, and a gate electrode connected to a fifth scan signal line for transmitting a fifth scan signal SC5(*n*). Then, the eighth transistor T8 applies the reference voltage Vref to the fifth node N5, in response to the fifth scan signal SC5(*n*) at a low level which is a turn-on level.

The ninth transistor T9 applies a stress voltage VOBS to the first node N1 which is the source electrode of the driving transistor DT. The ninth transistor T9 may be a p-type MOSFET PMOS and may be a low-temperature polycrystalline silicon (LTPS) thin film transistor. The ninth transistor T9 includes a source electrode connected to a stress voltage line for transmitting the stress voltage VOBS, a drain electrode connected to the first node N1, and a gate electrode connected to a third scan signal line for transmitting a third scan signal SC3(*n*). Then, the ninth transistor T9 applies the stress voltage VOBS to the first node N1 which is the source electrode of the driving transistor DT, in response to the third scan signal SC3(*n*) at a low level which is a turn-on level.

The storage capacitor Cst includes a first electrode connected to the second node N2 and a second electrode connected to the fifth node N5. That is, one electrode of the storage capacitor Cst is connected to the gate electrode of the driving transistor DT, and the other electrode of the storage capacitor Cst is connected to the seventh transistor T7 and the eighth transistor T8.

Figure 3:
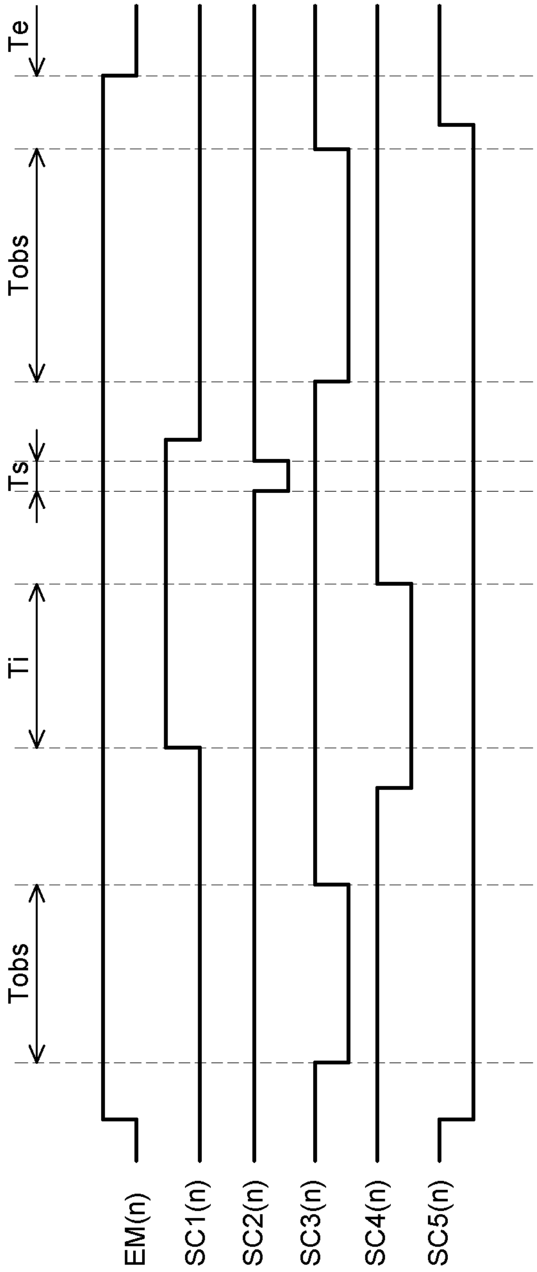
FIG. 3 is a waveform diagram illustrating an emission signal and a scan signal for a refresh frame in the organic light emitting display device according to an exemplary embodiment of the present disclosure.

FIG. 3 is a waveform diagram illustrating an emission signal and a scan signal for a refresh frame in the organic light emitting display device according to an exemplary embodiment of the present disclosure.

Figure 4:
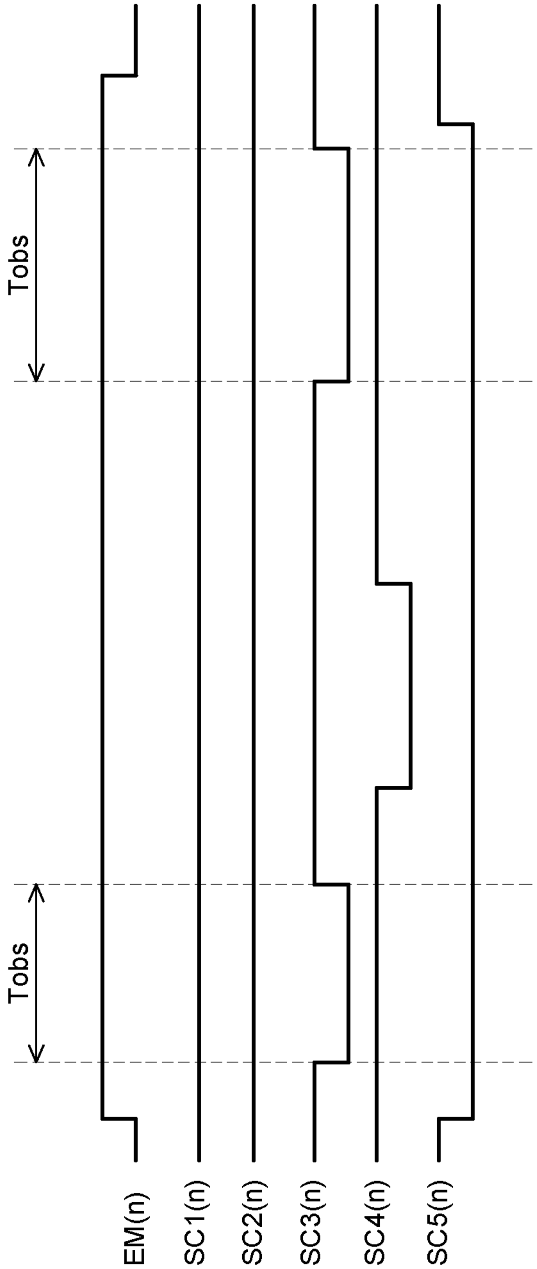
FIG. 4 is a waveform diagram illustrating an emission signal and a scan signal for a reset frame in the organic light emitting display device according to an exemplary embodiment of the present disclosure.

FIG. 4 is a waveform diagram illustrating an emission signal and a scan signal for a reset frame in the organic light emitting display device according to an exemplary embodiment of the present disclosure.

Figure 5A:
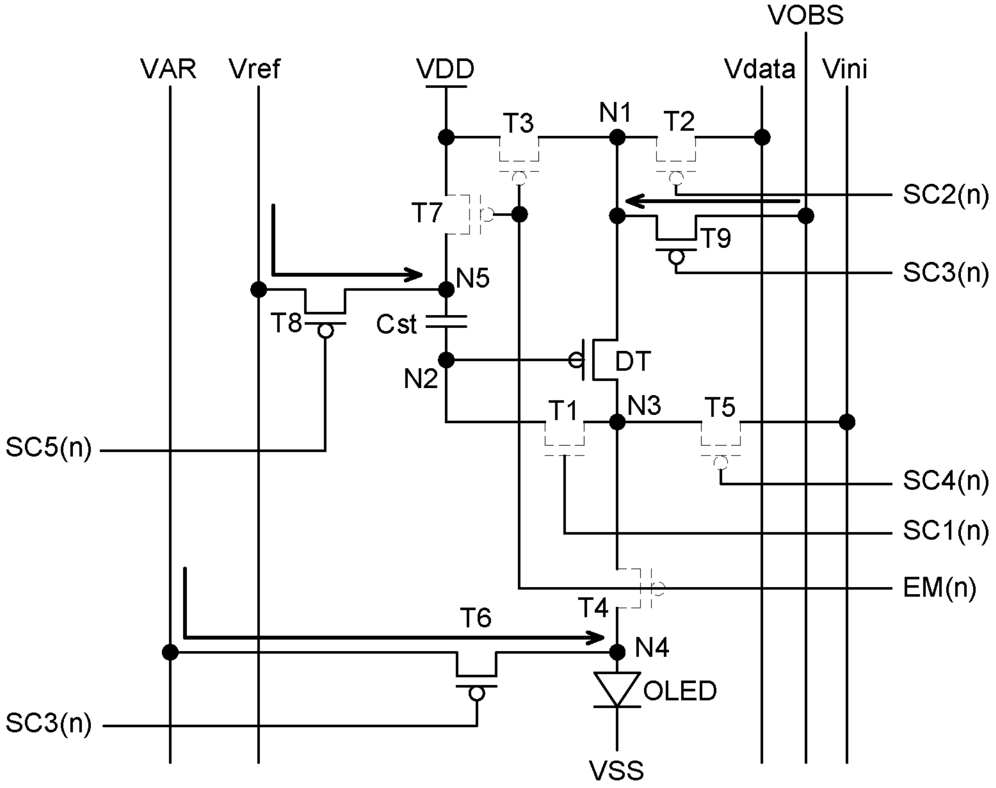
FIG. 5A is a circuit diagram of a pixel for an on-bias stress period in the organic light emitting display device according to an exemplary embodiment of the present disclosure.

FIG. 5A is a circuit diagram of a pixel for an on-bias stress period in the organic light emitting display device according to an exemplary embodiment of the present disclosure.

Figure 5B:
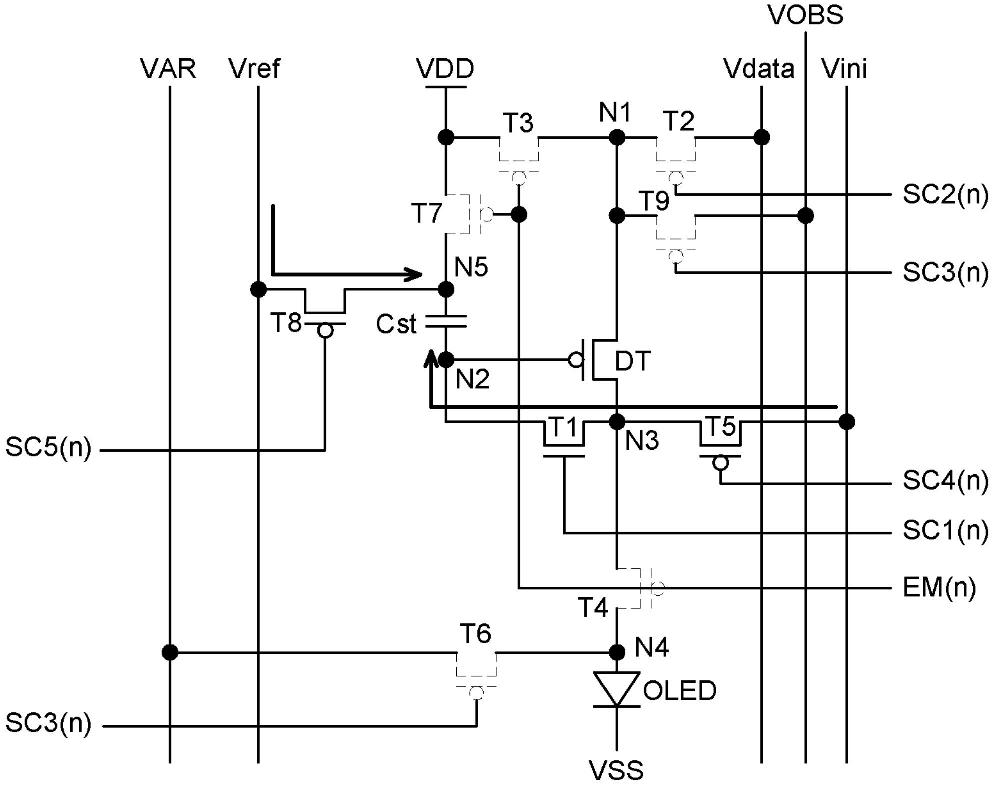
FIG. 5B is a circuit diagram of a pixel for an initial period in the organic light emitting display device according to an exemplary embodiment of the present disclosure.

FIG. 5B is a circuit diagram of a pixel for an initial period in the organic light emitting display device according to an exemplary embodiment of the present disclosure.

Figure 5C:
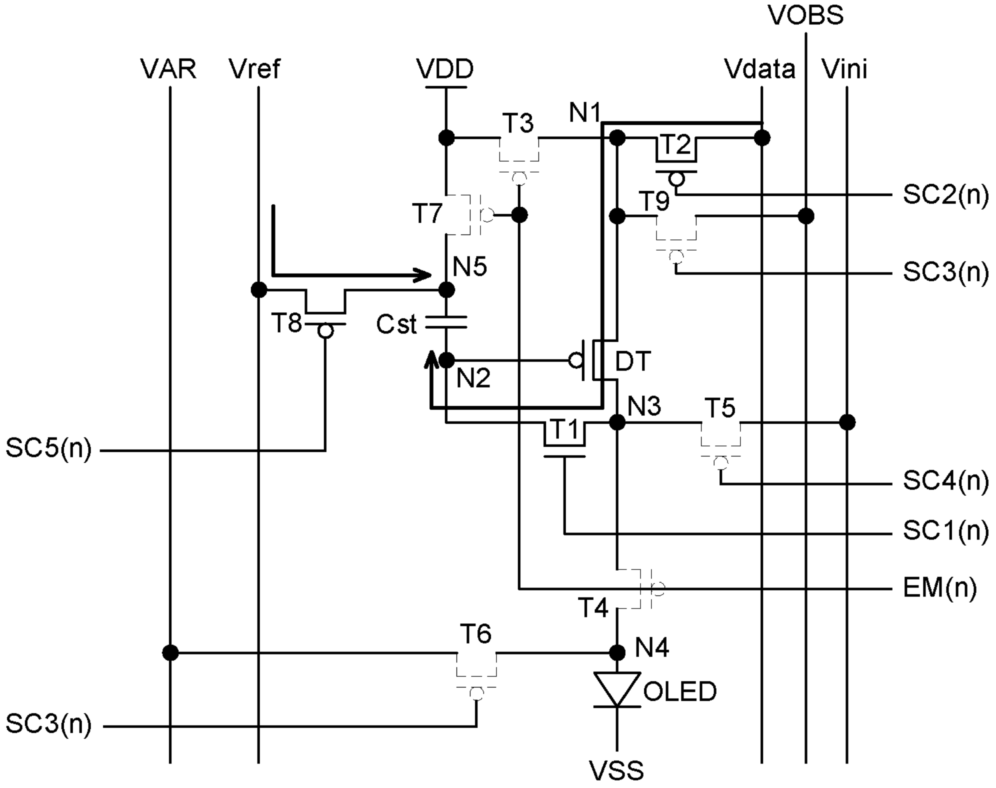
FIG. 5C is a circuit diagram of a pixel for a sampling period in the organic light emitting display device according to an exemplary embodiment of the present disclosure.

FIG. 5C is a circuit diagram of a pixel for a sampling period in the organic light emitting display device according to an exemplary embodiment of the present disclosure.

Figure 5D:
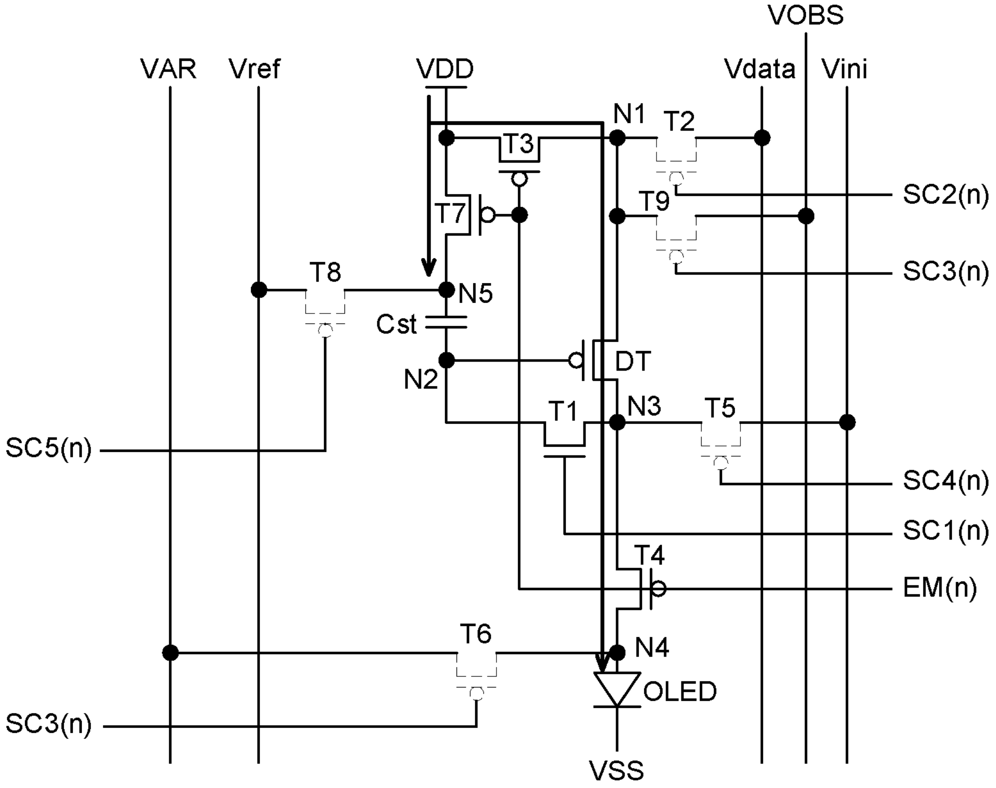
FIG. 5D is a circuit diagram of a pixel for an emission period in the organic light emitting display device according to an exemplary embodiment of the present disclosure.

FIG. 5D is a circuit diagram of a pixel for an emission period in the organic light emitting display device according to an exemplary embodiment of the present disclosure.

Referring to FIGS. 2 to 5D, the driving of the organic light emitting display device according to an exemplary embodiment of the present disclosure will be described as follows.

The organic light emitting display device according to an exemplary embodiment of the present disclosure may be driven separately in a refresh frame and a reset frame. In the refresh frame, the data voltage Vdata is programmed in each pixel P, and the organic light emitting diode OLED emits light. Then, the reset frame may be a vertical blank frame, and the anode of the organic light emitting diode OLED is reset for the reset frame.

In the organic light emitting display device according to an exemplary embodiment of the present disclosure, the refresh frame may be divided into an on-bias stress period Tobs (hereinafter, referred to as a "stress period"), an initial period Ti, a sampling period Ts, and an emission period Te. The stress period Tobs is a period of giving a bias stress to the first node N1 which is the source electrode of the driving transistor DT. The initial period Ti is a period of initializing the voltage of the third node N3 which is the drain electrode of the driving transistor DT. The sampling period Ts is a period for sampling a threshold voltage Vth of the driving transistor DT and programming the data voltage Vdata. The emission period Te is a period for allowing the organic light emitting diode OLED to emit light according to a driving current by a source-gate voltage of the programmed driving transistor DT.

Specifically, referring to FIGS. 3 and 5A, for a first stress period Tobs, the third scan signal SC3(*n*) has a low level which is a turn-on level and the fifth scan signal SC5(*n*) has a low level which is a turn-on level. Thus, the sixth transistor T6 is turned on to apply the reset voltage to the fourth node N4. That is, the anode electrode of the organic light emitting diode OLED is reset to the reset voltage VAR. In addition, the eighth transistor T8 is turned on to apply the reference voltage Vref to the fifth node N5. In addition, the ninth transistor T9 is turned on to apply an on-bias stress voltage VOBS (hereinafter, referred to as a "stress voltage") to the first node N1. The stress voltage VOBS may be selected within a voltage range that is sufficiently higher than an operating voltage of the organic light emitting diode OLED and set as a voltage equal to or lower than the high-potential driving voltage VDD. That is, for the stress period Tobs, the bias stress is applied to the first node N1 which is the source electrode of the driving transistor DT to lower the gate-source voltage Vgs of the driving transistor DT. Therefore, for the stress period Tobs, a source-drain current Ids of the driving transistor DT flows to mitigate the hysteresis of the driving transistor DT.

However, the first stress period Tobs is not limited thereto, and may be extended until the fourth scan signal SC4(*n*) is switched to a low level which is a turn-on level.

In addition, referring to FIGS. 3 and 5B, for the initial period Ti, the first scan signal SC1(*n*) has a high level which is a turn-on level, the fourth scan signal SC4(*n*) has a low level which is a turn-on level, and the fifth scan signal SC5(*n*) has a low level which is a turn-on level. Then, the first transistor T1 and the fifth transistor T5 are turned on, and the initial voltage Vini is applied to the second node N2. As a result, the gate electrode of the driving transistor DT is initialized to the initial voltage Vini. The initial voltage Vini may be selected within a voltage range that is sufficiently lower than an operating voltage of the organic light emitting diode OLED and set as a voltage equal to or lower than a low-potential driving voltage VSS. In addition, in the initial period Ti, the eighth transistor T8 is still turned on, and the reference voltage Vref is maintained in the fifth node N5. In addition, in the initial period Ti, since the second scan signal SC2(*n*), the third scan signal SC3(*n*), and the emission signal EM(n) have a high level which is a turn-off level, the second transistor T2, the third transistor T3, and the ninth transistor T9 are turned off, and as a result, the first node N1 may be floated while the stress voltage VOBS is applied. Thus, the gate-source voltage Vgs of the driving transistor DT may be Vini−VOBS.

In addition, referring to FIGS. 3 and 5C, for the sampling period Ts, the first scan signal SC1(*n*) has a high level which is a turn-on level, the second scan signal SC2(*n*) has a low level which is a turn-on level, and the fifth scan signal SC5(*n*) has a low level which is a turn-on level. For the sampling period Ts, the second transistor T2 is turned on, and the data voltage Vdata is applied to the first node N1. In addition, since the first transistor T1 is also turned on, the driving transistor DT is connected and the gate electrode and the drain electrode of the driving transistor DT are short-circuited, and as a result, the driving transistor DT operates like a diode.

In the sampling period Ts, a current Ids flows between the source and drain electrodes of the driving transistor DT. Since the gate electrode and the drain electrode of the driving transistor DT are connected, the voltage of the second node N2 increases by the current flowing from the source electrode to the drain electrode until the gate-source voltage Vgs of the driving transistor DT is Vth. For the sampling period Ts, the voltage of the second node N2 is charged into a voltage Vdata+Vth corresponding to a sum of the data voltage Vdata and the threshold voltage Vth of the driving transistor DT.

In addition, referring to FIGS. 3 and 5A, for a second stress period Tobs, the third scan signal SC3(*n*) has a low level which is a turn-on level and the fifth scan signal SC5(*n*) has a low level which is a turn-on level. Thus, the sixth transistor T6 is turned on to apply the reset voltage to the fourth node N4. That is, the anode electrode of the organic light emitting diode OLED is reset to the reset voltage VAR. In addition, the ninth transistor T9 is turned on to apply the stress voltage VOBS to the first node N1. That is, for the stress period Tobs, the bias stress is applied to the first node N1 which is the source electrode of the driving transistor DT to mitigate a hysteresis effect of the driving transistor DT. For the second stress period Tobs, the eighth transistor T8 is still turned on, and the reference voltage Vref is still maintained in the fifth node N5.

Referring to FIGS. 3 and 5D, for the emission period Te, the emission signal EM(n) has a low level which is a turn-on level. Then, the third transistor T3 is turned on to apply the high-potential driving voltage VDD to the first node N1. In addition, the seventh transistor T7 is turned on to apply the high-potential driving voltage VDD to the fifth node N5. That is, in the fifth node N5, the voltage is increased from the reference voltage Vref to the high-potential driving voltage VDD. In addition, since the second node N2 is coupled with the fifth node N5 through the storage capacitor Cst, a voltage variance VDD−Vref of the fifth node N5 is reflected to the second node N2. Thus, the voltage of the second node N2, which is the gate electrode of the driving transistor DT, is changed to Vdata+Vth+(VDD−Vref). Thus, the gate-source voltage Vgs of the driving transistor DT may be Vdata+Vth−Vref. In addition, the fourth transistor T4 is turned on to form a current path of the third node N3 and the fourth node N4. As a result, the driving current Ioled via the source electrode and the drain electrode of the driving transistor DT is applied to the organic light emitting diode OLED.

For the emission period Te, a relation on the driving current Ioled flowing in the organic light emitting diode OLED is as the following Equation 1.

$$Ioled=k(Vgs-Vth)2=k(Vdata+Vth-Vref-Vth)2=k(Vdata-Vref)2 \quad \text{Equation [1]}$$

In Equation 1, k represents a proportional constant determined by an electron mobility, a parasitic capacitance, a channel capacity, and the like of the driving transistor DT.

As shown in Equation 1, in the relation of the driving current Ioled, both a threshold voltage Vth component and a high-potential driving voltage VDD component of the driving transistor DT are erased. This means that in the organic light emitting display device according to the present disclosure, even if the threshold voltage Vth and the high-potential driving voltage VDD change, the driving current Ioled does not change. That is, the organic light emitting display device according to an exemplary embodiment of the present disclosure may program the data voltage regardless of the variances of the threshold voltage Vth and the high-potential driving voltage VDD.

In addition, referring to FIG. 4, for the reset frame, the first scan signal SC1(*n*) is maintained at a low level which is a turn-off level, and the second scan signal SC2(*n*) is maintained at a high level which is a turn-off level. Then, for the reset frame, the data voltage Vdata is not programmed in each pixel P, and the organic light emitting diode OLED does not emit light.

However, the emission signal EM(n), the third scan signal SC3(*n*), the fourth scan signal SC4(*n*) and the fifth scan signal SC5(*n*) periodically swing, respectively. That is, since the third scan signal SC3(*n*) periodically swings, the reset frame may include a plurality of stress periods Tobs.

That is, for the reset frame, the anode electrode of the organic light emitting diode OLED is not only reset to the reset voltage VAR, but also may apply a bias stress to the first node N1 which is the source electrode of the driving transistor DT.

As a result, in the organic light emitting display device according to an exemplary embodiment of the present disclosure, the anode electrode of the organic light emitting diode OLED may be periodically reset through the refresh frame and the reset frame. Then, even in the driving at a low frequency, since the continuous voltage rise of the anode electrode of the organic light emitting diode OLED caused by the leakage current is suppressed, the anode electrode of the organic light emitting diode OLED may maintain a constant voltage level. Therefore, despite the switching of the driving frequency, a change in luminance of the organic light emitting display device may be reduced to increase the image quality.

FIG. 6A is a diagram illustrating the luminance for each area of a conventional organic light emitting display device.

FIG. 6B is a diagram illustrating the luminance for each area of the organic light emitting display device according to an exemplary embodiment of the present disclosure.

As illustrated in FIG. 6A, in a conventional organic light emitting display device, a maximum luminance for each area is 1775 nit (nt) and a minimum luminance for each area is 1227 nit. That is, as the conventional organic light emitting display device is large-scaled, the minimum luminance for each area is decreased to 69% as compared to the maximum luminance for each area due to the drop of the high-potential voltage caused by the resistance of the high-potential voltage line. Accordingly, as the conventional organic light emitting display device is large-scaled, there was a problem that the luminance for each area is ununiform.

However, as illustrated in FIG. 6B, in the organic light emitting display device according to an exemplary embodiment of the present disclosure, a maximum luminance for each area is 1367 nit and a minimum luminance for each area is 1200 nit. That is, in the organic light emitting display device according to an exemplary embodiment of the present disclosure, the minimum luminance for each area is decreased to 88% as compared to the maximum luminance for each area. In the organic light emitting display device according to an exemplary embodiment of the present disclosure, as compared to the conventional organic light emitting display device, a percentage of the minimum luminance for each area to the maximum luminance for each area increases by about 19% to uniformize the luminance for each area.

As described above, the organic light emitting display device according to an exemplary embodiment of the present disclosure may program the data voltage regardless of the variances of the threshold voltage Vth and the high-potential driving voltage VDD. That is, as the organic light emitting display device is large-scaled, even if the high-potential driving voltage VDD is unstable, the organic light emitting diode according to an exemplary embodiment of the present disclosure may implement a constant luminance.

Hereinafter, an organic light emitting display device according to another exemplary embodiment of the present disclosure will be described. There is only a difference in that the stress voltage and the initial voltage of the organic light emitting display device according to an exemplary embodiment of the present disclosure are integrated to an initial voltage of the organic light emitting display device according to another exemplary embodiment of the present disclosure. Other technical features are the same as each other. Therefore, the difference between the organic light emitting display device according to another exemplary embodiment of the present disclosure and the organic light emitting display device according to an exemplary embodiment of the present disclosure will be mainly described, and the description for the duplicated parts will be omitted.

Second Exemplary Embodiment

Figure 7:
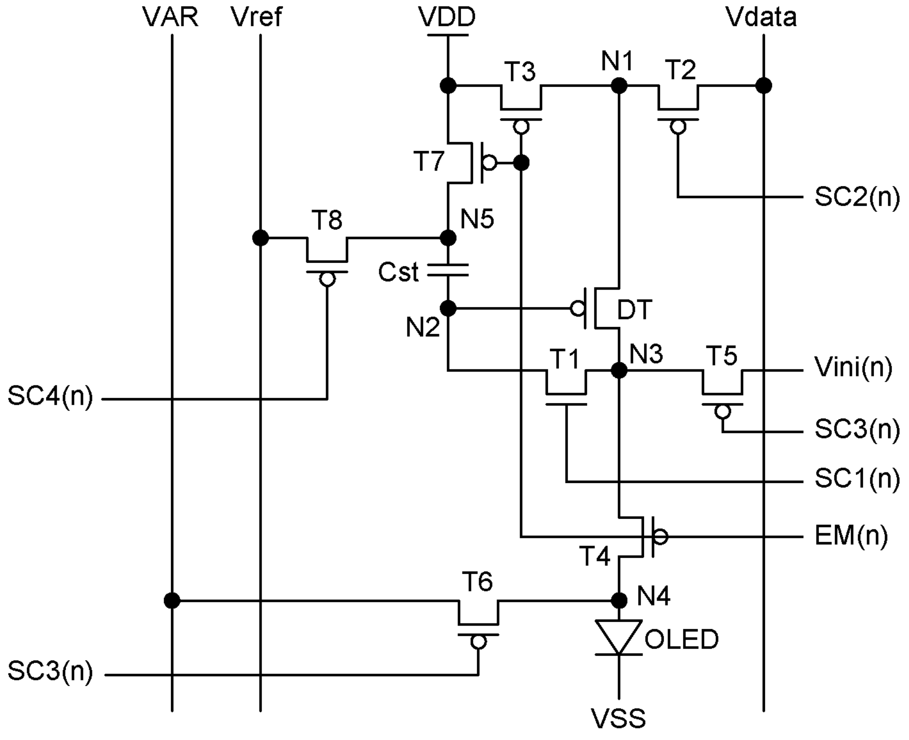
FIG. 7 is a circuit diagram illustrating a pixel of an organic light emitting display device according to another exemplary embodiment of the present disclosure.

FIG. 7 is a circuit diagram of a pixel of an organic light emitting display device according to another exemplary embodiment of the present disclosure.

In the organic light emitting display device according to another exemplary embodiment of the present disclosure, each pixel P includes an organic light emitting diode OLED, a driving transistor DT, first to eighth transistors T1 to T8, and a capacitor Cst.

The driving transistor DT controls a driving current applied to the organic light emitting diode OLED according to a source-gate voltage Vsg thereof. The driving transistor DT may be a p-type MOSFET PMOS and may be a low-temperature polycrystalline silicon (LTPS) thin film transistor. In addition, a source electrode of the driving transistor DT is connected to a first node N1, a gate electrode thereof is connected to a second node N2, and a drain electrode thereof is connected to a third node N3.

The first transistor T1 connects the gate electrode and the drain electrode. The first transistor T1 may be an n-type MOSFET NMOS to reduce the leakage current, and may be an oxide thin film transistor. The first transistor T1 includes a drain electrode connected to the third node N3, a source electrode connected to the second node N2, and a gate electrode connected to a first scan signal line for transmitting a first scan signal SC1(*n*). Thus, the first transistor T1 connects the gate electrode and the drain electrode of the driving transistor DT, in response to the first scan signal SC1(*n*) at a high level which is a turn-on level.

The second transistor T2 applies a data voltage Vdata received from the data line to the first node N1 which is the source electrode of the driving transistor DT. The second transistor T2 may be a p-type MOSFET PMOS and may be a low-temperature polycrystalline silicon (LTPS) thin film transistor. The second transistor T2 includes a source electrode connected to the data line, a drain electrode connected to the first node N1, and a gate electrode connected to a second scan signal line for transmitting a second scan signal SC2(*n*). Then, the second transistor T2 applies a data voltage Vdata received from the data line to the first node N1 which is the source electrode of the driving transistor DT, in response to the second scan signal SC2(*n*) at a low level which is a turn-on level.

The third transistor T3 applies a high-potential driving voltage VDD to the first node N1 which is the source electrode of the driving transistor DT. The third transistor T3 may be a p-type MOSFET PMOS and may be a low-temperature polycrystalline silicon (LTPS) thin film transistor. The third transistor T3 includes a source electrode connected to a high-potential driving voltage line for transmitting the high-potential driving voltage VDD, a drain electrode connected to the first node N1, and a gate electrode connected to an emission signal line for transmitting an emission signal EM(n). Then, the third transistor T3 applies the high-potential driving voltage VDD to the first node N1 which is the source electrode of the driving transistor DT, in response to the emission signal EM(n) at a low level which is a turn-on level.

The fourth transistor T4 forms a current path between the driving transistor DT and the organic light emitting diode OLED. The fourth transistor T4 may be a p-type MOSFET PMOS and may be a low-temperature polycrystalline silicon (LTPS) thin film transistor. The fourth transistor T4 includes a source electrode connected to the third node N3, a drain electrode connected to the fourth node N4, and a gate electrode connected to an emission signal line for transmitting the emission signal EM(n). The fourth transistor T4 forms a current path between the third node N3 which is the source electrode of the fourth transistor T4 and the fourth node N4 which is the drain electrode of the fourth transistor T4, in response to the emission signal EM(n). Then, the fourth transistor T4 forms a current path between the driving transistor DT and the organic light emitting diode OLED in response to the emission signal EM(n) at a low level which is a turn-on level.

The fifth transistor T5 applies an initial voltage Vini(n) to the third node N3 which is the drain electrode of the driving transistor DT. The fifth transistor T5 may be a p-type MOSFET PMOS and may be a low-temperature polycrystalline silicon (LTPS) thin film transistor. The fifth transistor T5 includes a source electrode connected to an initial voltage line for transmitting the initial voltage Vini(n), a drain electrode connected to the third node N3, and a gate electrode connected to a third scan signal line for transmitting a third scan signal SC3(*n*). Then, the fifth transistor T5 applies the initial voltage Vini(n) to the third node N3 which is the drain electrode of the driving transistor DT, in response to the third scan signal SC3(*n*) at a low level which is a turn-on level. Unlike the organic light emitting display device according to an exemplary embodiment of the present disclosure, in the organic light emitting display device according to another exemplary embodiment of the present disclosure, the initial voltage Vini(n) periodically swings. That is, in the organic light emitting display device according to another exemplary embodiment of the present disclosure, the initial voltage Vini(n) may be periodically switched to the high level and the low level.

The sixth transistor T6 applies a reset voltage VAR to the fourth node N4 which is an anode of the organic light emitting diode. The sixth transistor T6 may be a p-type MOSFET PMOS and may be a low-temperature polycrystalline silicon (LTPS) thin film transistor. The sixth transistor T6 includes a source electrode connected to a reset voltage line for transmitting the reset voltage VAR, a drain electrode connected to the fourth node N4, and a gate electrode connected to a third scan signal line for transmitting a third scan signal SC3(*n*). Then, the sixth transistor T6 applies the reset voltage VAR to the fourth node N4 which is the anode of the organic light emitting diode, in response to the third scan signal SC3(*n*) at a low level which is a turn-on level.

The seventh transistor T7 applies a high-potential driving voltage VDD to the fifth node N5. The seventh transistor T7 may be a p-type MOSFET PMOS and may be a low-temperature polycrystalline silicon (LTPS) thin film transistor. The seventh transistor T7 includes a source electrode connected to a high-potential driving voltage line for transmitting the high-potential driving voltage VDD, a drain electrode connected to the fifth node N5, and a gate electrode connected to an emission signal line for transmitting an emission signal EM(n). Then, the seventh transistor T7 applies the high-potential driving voltage VDD to the fifth node N5, in response to the emission signal EM(n) at a low level which is a turn-on level.

The eighth transistor T8 applies a reference voltage Vref to the fifth node N5. The eighth transistor T8 may be a p-type MOSFET PMOS and may be a low-temperature polycrystalline silicon (LTPS) thin film transistor. The eighth transistor T8 includes a source electrode connected to a reference voltage line for transmitting the reference voltage Vref, a drain electrode connected to the fifth node N5, and a gate electrode connected to a fourth scan signal line for transmitting a fourth scan signal SC4(*n*). Then, the eighth transistor T8 applies the reference voltage Vref to the fifth node N5, in response to the fourth scan signal SC4(*n*) at a low level which is a turn-on level.

The storage capacitor Cst includes a first electrode connected to the second node N2 and a second electrode connected to the fifth node N5. That is, one electrode of the storage capacitor Cst is connected to the gate electrode of the driving transistor DT, and the other electrode of the storage capacitor Cst is connected to the seventh transistor T7 and the eighth transistor T8.

Figure 8:
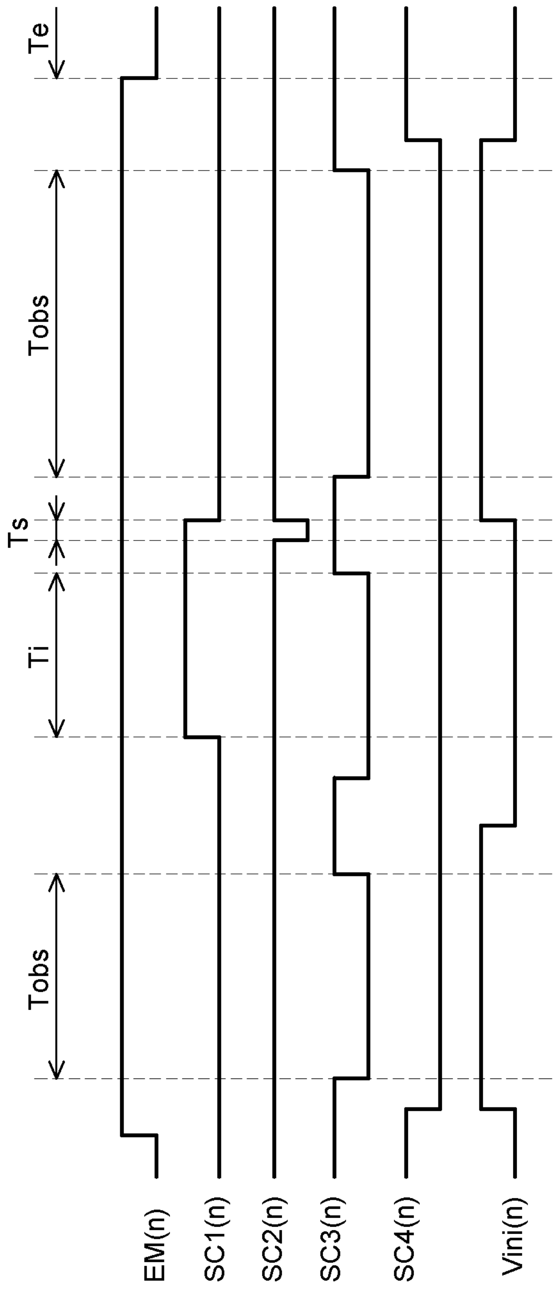
FIG. 8 is a waveform diagram illustrating an emission signal and a scan signal for a refresh frame in the organic light emitting display device according to another exemplary embodiment of the present disclosure.

FIG. 8 is a waveform diagram illustrating an emission signal and a scan signal for a refresh frame in the organic light emitting display device according to another exemplary embodiment of the present disclosure.

Figure 9:
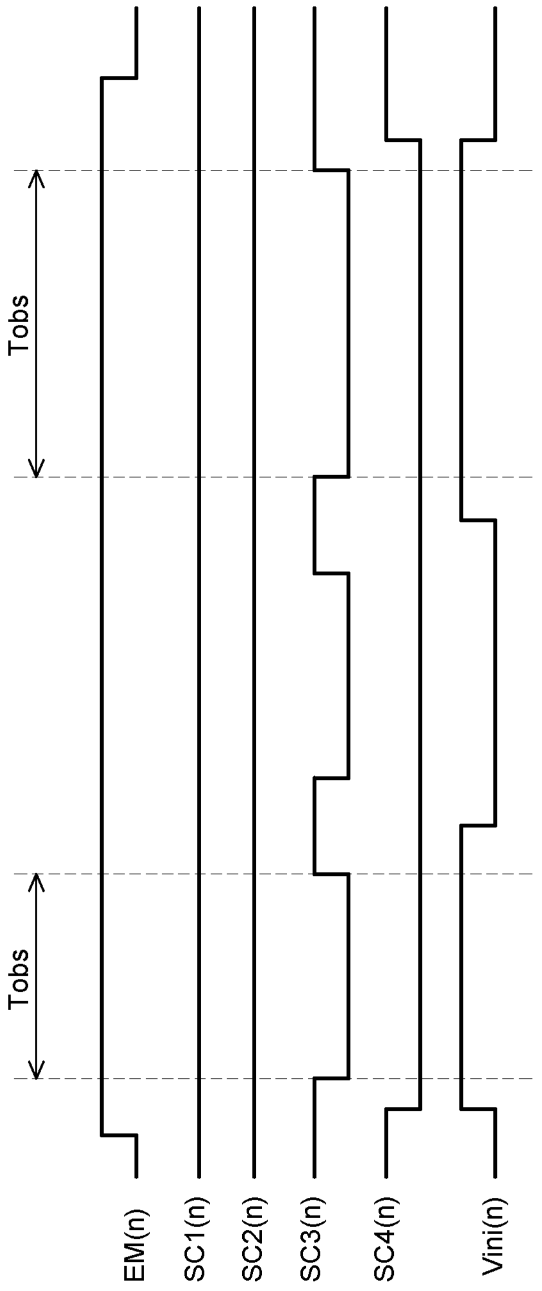
FIG. 9 is a waveform diagram illustrating an emission signal and a scan signal for a reset frame in the organic light emitting display device according to another exemplary embodiment of the present disclosure.

FIG. 9 is a waveform diagram illustrating an emission signal and a scan signal for a reset frame in the organic light emitting display device according to another exemplary embodiment of the present disclosure.

Figure 10A:
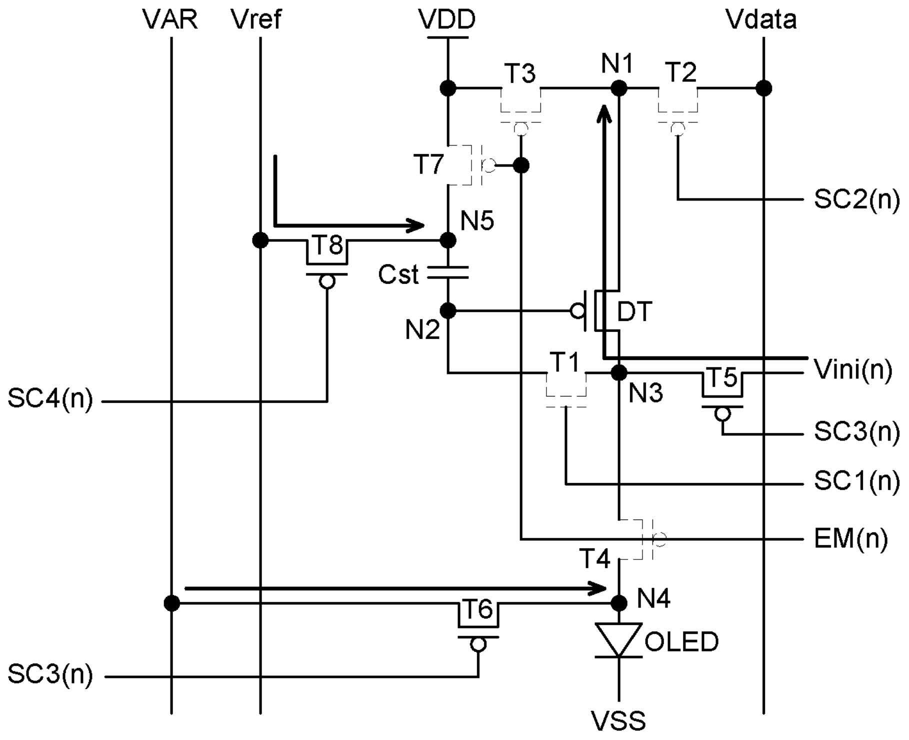
FIG. 10A is a circuit diagram of a pixel for an on-bias stress period in the organic light emitting display device according to another exemplary embodiment of the present disclosure.

FIG. 10A is a circuit diagram of a pixel for an on-bias stress period in the organic light emitting display device according to another exemplary embodiment of the present disclosure.

Figure 10B:
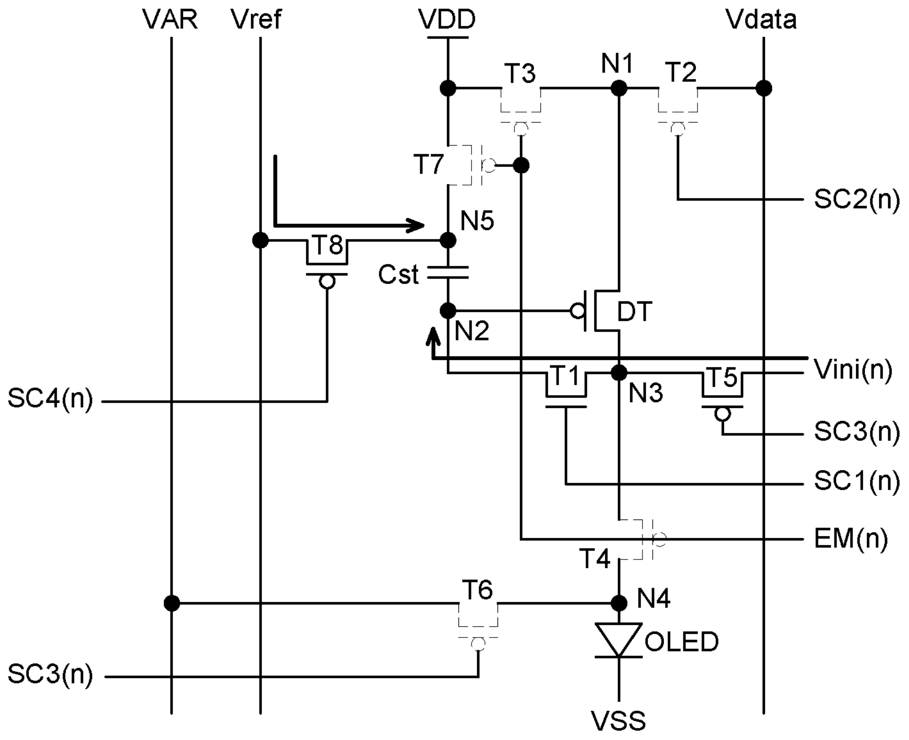
FIG. 10B is a circuit diagram of a pixel for an initial period in the organic light emitting display device according to another exemplary embodiment of the present disclosure.

FIG. 10B is a circuit diagram of a pixel for an initial period in the organic light emitting display device according to another exemplary embodiment of the present disclosure.

Figure 10C:
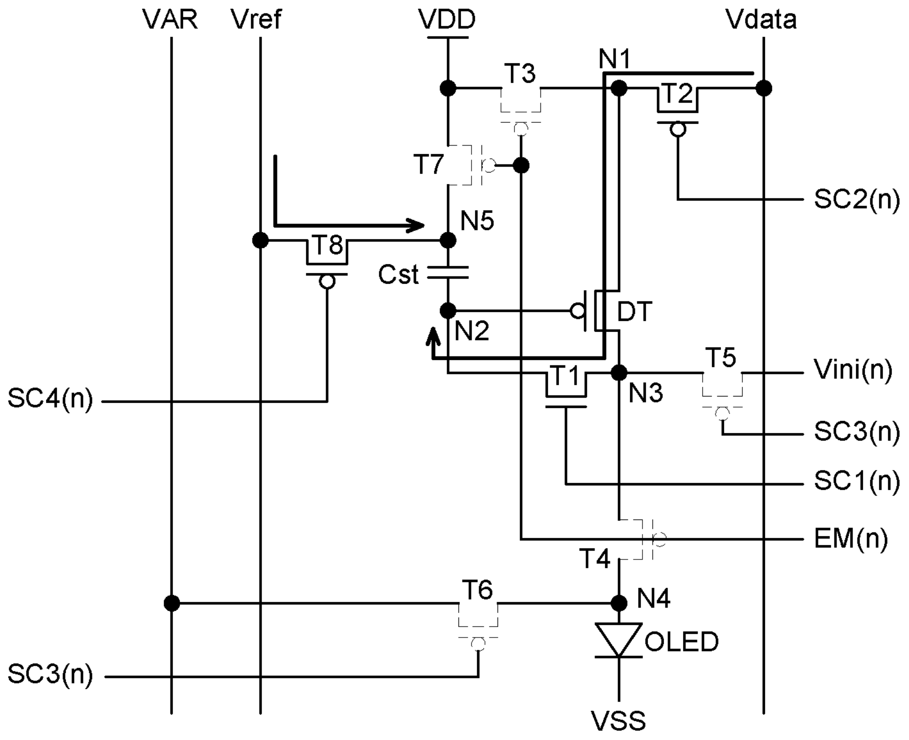
FIG. 10C is a circuit diagram of a pixel for a sampling period in the organic light emitting display device according to another exemplary embodiment of the present disclosure.

FIG. 10C is a circuit diagram of a pixel for a sampling period in the organic light emitting display device according to another exemplary embodiment of the present disclosure.

Figure 10D:
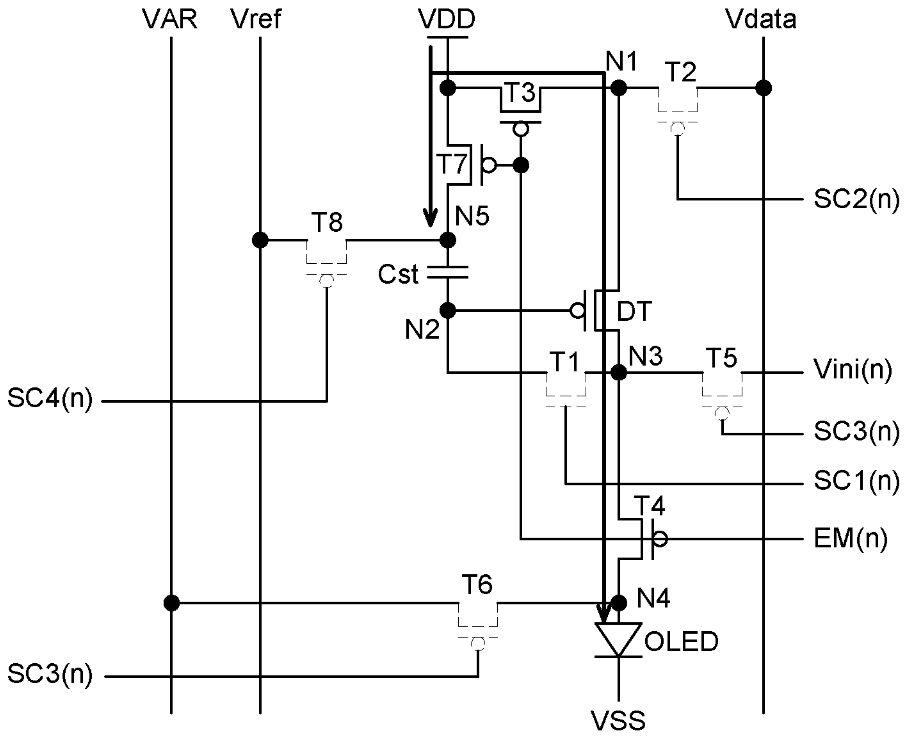
FIG. 10D is a circuit diagram of a pixel for an emission period in the organic light emitting display device according to another exemplary embodiment of the present disclosure.

FIG. 10D is a circuit diagram of a pixel for an emission period in the organic light emitting display device according to another exemplary embodiment of the present disclosure.

Referring to FIGS. 7 to 10D, the driving of the organic light emitting display device according to another exemplary embodiment of the present disclosure will be described as follows.

The organic light emitting display device according to another exemplary embodiment of the present disclosure may be driven separately in a refresh frame and a reset frame. In the refresh frame, the data voltage Vdata is programmed in each pixel, and the organic light emitting diode OLED emits light. In addition, the reset frame may be a vertical blank frame, and the anode of the organic light emitting diode OLED is reset for the reset frame.

In the organic light emitting display device according to another exemplary embodiment of the present disclosure, the refresh frame may be divided into a stress period Tobs, an initial period Ti, a sampling period Ts, and an emission period Te. The stress period Tobs is a period of giving a bias stress to the first node N1 which is the source electrode of the driving transistor DT. The initial period Ti is a period of initializing the voltage of the third node N3 which is the drain electrode of the driving transistor DT. The sampling period Ts is a period for sampling a threshold voltage Vth of the driving transistor DT and programming the data voltage Vdata. The emission period Te is a period for allowing the organic light emitting diode OLED to emit light according to a driving current by a source-gate voltage of the programmed driving transistor DT.

Specifically, referring to FIGS. 8 and 10A, for a first stress period Tobs, the third scan signal SC3(*n*) has a low level which is a turn-on level, the fourth scan signal SC4(*n*) has a low level which is a turn-on level, and the initial voltage Vini(n) has a high level. Thus, the sixth transistor T6 is turned on to apply the reset voltage to the fourth node N4. That is, the anode electrode of the organic light emitting diode OLED is reset to the reset voltage VAR. In addition, the eighth transistor T8 is turned on to apply the reference voltage Vref to the fifth node N5. Then, the fifth transistor T5 is turned on to apply the initial voltage Vini(n) of the high level to the first node N1 and the third node N3. The initial voltage Vini(n) of the high level may be selected within a voltage range that is sufficiently higher than an operating voltage of the organic light emitting diode OLED and set as a voltage equal to or lower than the high-potential driving voltage VDD. That is, for the stress period Tobs, the bias stress is applied to the first node N1 which is the source electrode of the driving transistor DT to lower the gate-source voltage Vgs of the driving transistor DT. Therefore, for the stress period Tobs, a source-drain current Ids of the driving transistor DT flows to mitigate the hysteresis of the driving transistor DT.

However, the first stress period Tobs is not limited thereto, and may be extended until the third scan signal SC3(*n*) has a high level which is a turn-off level.

In addition, referring to FIGS. 8 and 10B, for the initial period Ti, the first scan signal SC1(*n*) has a high level which is a turn-on level, the third scan signal SC3(*n*) has a low level which is a turn-on level, the fourth scan signal SC4(*n*) has a low level which is a turn-on level, and the initial voltage Vini(n) has a low level. Thus, the first transistor T1 and the fifth transistor T5 are turned on, and the initial voltage Vini(n) of the low level is applied to the second node N2. As a result, the gate electrode of the driving transistor DT is initialized to the initial voltage Vini(n) of the low level. The initial voltage Vini(n) of the low level may be selected within a voltage range that is sufficiently lower than an operating voltage of the organic light emitting diode OLED and set as a voltage equal to or lower than a low-potential driving voltage VSS. In addition, in the initial period Ti, the eighth transistor T8 is still turned on, and the reference voltage Vref is maintained in the fifth node N5. In addition, in the initial period Ti, since the second scan signal SC2(*n*) and the emission signal EM(n) have a high level which is a turn-off level, the second transistor T2 and the third transistor T3 are turned off, and as a result, the first node N1 may be floated while the initial voltage Vini(n) of the high level is applied. Thus, the gate-source voltage Vgs of the driving transistor DT may be a difference between the initial voltage Vini(n) of the low level and the initial voltage Vini(n) of the high level.

In addition, referring to FIGS. 8 and 10C, for the sampling period Ts, the first scan signal SC1(*n*) has a high level which is a turn-on level, the second scan signal SC2(*n*) has a low level which is a turn-on level, and the fourth scan signal SC4(*n*) has a low level which is a turn-on level. In addition, for the sampling period Ts, the second transistor T2 is turned on, and the data voltage Vdata is applied to the first node N1. Then, since the first transistor T1 is also turned on, the driving transistor DT is connected and the gate electrode and the drain electrode of the driving transistor DT are short-circuited, so that the driving transistor DT operates like a diode.

In the sampling period Ts, a current Ids flows between the source-drain of the driving transistor DT. Since the gate electrode and the drain electrode of the driving transistor DT are connected, the voltage of the second node N2 increases by the current flowing from the source electrode to the drain electrode until the gate-source voltage Vgs of the driving transistor DT is Vth. For the sampling period Ts, the voltage of the second node N2 is charged into a voltage Vdata+Vth corresponding to a sum of the data voltage Vdata and the threshold voltage Vth of the driving transistor DT.

In addition, referring to FIGS. 8 and 10A, for a second stress period Tobs, the third scan signal SC3(*n*) has a low level which is a turn-on level, the fourth scan signal SC4(*n*) has a low level which is a turn-on level, and the initial voltage Vini(n) has a high level. Thus, the sixth transistor T6 is turned on to apply the reset voltage to the fourth node N4. That is, the anode electrode of the organic light emitting diode OLED is reset to the reset voltage VAR. Then, the fifth transistor T5 is turned on to apply the initial voltage Vini(n) of the high level to the first node N1 and the third node N3. That is, for the stress period Tobs, the bias stress is applied to the first node N1 which is the source electrode of the driving transistor DT to mitigate a hysteresis effect of the driving transistor DT. For the second stress period Tobs, the eighth transistor T8 is still turned on, and the reference voltage Vref is still maintained in the fifth node N5.

Referring to FIGS. 8 and 10D, for the emission period Te, the emission signal EM(n) has a low level which is a turn-on level. Then, the third transistor T3 is turned on to apply the high-potential driving voltage VDD to the first node N1. In addition, the seventh transistor T7 is turned on to apply the high-potential driving voltage VDD to the fifth node N5. That is, in the fifth node N5, the voltage is increased from the reference voltage Vref to the high-potential driving voltage VDD. In addition, since the second node N2 is coupled with the fifth node N5 through the storage capacitor Cst, a voltage variance VDD−Vref of the fifth node N5 is reflected to the second node N2. Thus, the voltage of the second node N2, which is the gate electrode of the driving transistor DT, is changed to Vdata+Vth+(VDD−Vref). Thus, the gate-source voltage Vgs of the driving transistor DT may be Vdata+Vth−Vref. In addition, the fourth transistor T4 is turned on to form a current path of the third node N3 and the fourth node N4. As a result, the driving current Ioled via the source electrode and the drain electrode of the driving transistor DT is applied to the organic light emitting diode OLED. For the emission period Te, a relation on the driving current Ioled flowing in the organic light emitting diode OLED is as the following Equation 1.

$$Ioled=k(Vgs-Vth)2=k(Vdata+Vth-Vref-Vth)2=k(Vdata-Vref)2 \quad \text{[Equation 1]}$$

In Equation 1, k represents a proportional constant determined by an electron mobility, a parasitic capacitance, a channel capacity, and the like of the driving transistor DT.

As shown in Equation 1, in the relation of the driving current Ioled, both a threshold voltage Vth component and a high-potential driving voltage VDD component of the driving transistor DT are erased. This means that in the organic light emitting display device according to the present disclosure, even if the threshold voltage Vth and the high-potential driving voltage VDD change, the driving current Ioled does not change. That is, the organic light emitting display device according to another exemplary embodiment of the present disclosure may program the data voltage regardless of the variances of the threshold voltage Vth and the high-potential driving voltage VDD.

In addition, referring to FIG. 9, for the reset frame, the first scan signal SC1($n$) is maintained at a low level which is a turn-off level, and the second scan signal SC2($n$) is maintained at a high level which is a turn-off level. Then, for the reset frame, the data voltage Vdata is not programmed in each pixel P, and the organic light emitting diode OLED does not emit light.

However, the emission signal EM(n), the third scan signal SC3($n$), and the fourth scan signal SC4($n$) periodically swing, respectively. That is, since the third scan signal SC3($n$) periodically swings, the reset frame may include a plurality of stress periods Tobs.

That is, for the reset frame, the anode electrode of the organic light emitting diode OLED is not only reset to the reset voltage VAR, but also may apply a bias stress to the first node N1 which is the source electrode of the driving transistor DT.

As a result, in the organic light emitting display device according to another exemplary embodiment of the present disclosure, the anode electrode of the organic light emitting diode OLED may be periodically reset through the refresh frame and the reset frame. Then, even in the driving at a low frequency, since the continuous voltage rise of the anode electrode of the organic light emitting diode OLED caused by the leakage current is suppressed, the anode electrode of the organic light emitting diode OLED may maintain a constant voltage level. Therefore, despite the switching of the driving frequency, a change in luminance of the organic light emitting display device may be reduced to increase the image quality.

The stress voltage and the initial voltage of the organic light emitting display device according to an exemplary embodiment of the present disclosure may be integrated to an initial voltage of the organic light emitting display device according to another exemplary embodiment of the present disclosure. Accordingly, in the organic light emitting display device according to another exemplary embodiment of the present disclosure, a transistor for removing the stress voltage is not required. As a result, a pixel structure of the organic light emitting display device according to another exemplary embodiment of the present disclosure may be simplified.

Hereinafter, an organic light emitting display device according to yet another (third) exemplary embodiment of the present disclosure will be described. The organic light emitting display device according to yet another (third) exemplary embodiment of the present disclosure has a difference in a signal applied to the transistor from the organic light emitting display device according to another exemplary embodiment of the present disclosure, and other technical features are the same as each other. Therefore, the difference between the organic light emitting display device according to yet another (third) exemplary embodiment of the present disclosure and the organic light emitting display device according to another exemplary embodiment of the present disclosure will be mainly described, and the description for the duplicated parts will be omitted.

Third Exemplary Embodiment

Figure 11:
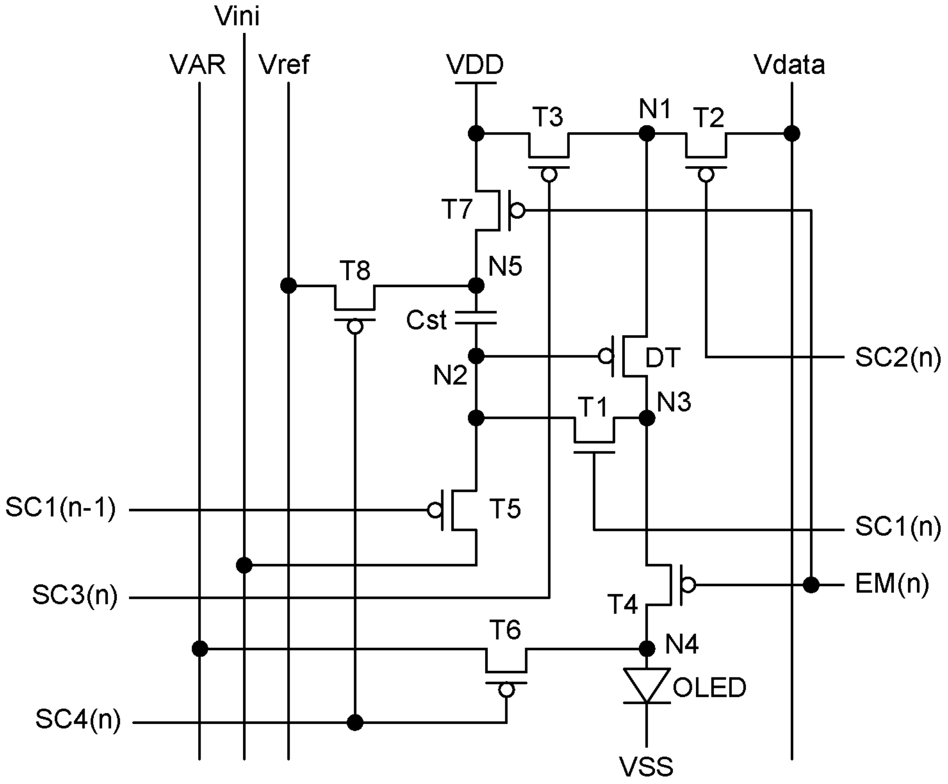
FIG. 11 is a circuit diagram illustrating a pixel of an organic light emitting display device according to yet another exemplary embodiment of the present disclosure.

FIG. 11 is a circuit diagram illustrating a pixel of an organic light emitting display device according to yet another (third) exemplary embodiment of the present disclosure.

In the organic light emitting display device according to yet another (third) exemplary embodiment of the present disclosure, each pixel P includes an organic light emitting diode OLED, a driving transistor DT, first to eighth transistors T1 to T8, and a capacitor Cst.

The driving transistor DT controls a driving current applied to the organic light emitting diode OLED according to a source-gate voltage Vsg thereof. The driving transistor DT may be a p-type MOSFET PMOS and may be a low temperature polycrystalline silicon (LTPS) thin film transistor. In addition, a source electrode of the driving transistor DT is connected to a first node N1, a gate electrode thereof is connected to a second node N2, and a drain electrode thereof is connected to a third node N3.

The first transistor T1 connects the gate electrode and the drain electrode. The first transistor T1 may be an n-type MOSFET NMOS to reduce the leakage current, and may be an oxide thin film transistor. The first transistor T1 includes a drain electrode connected to the third node N3, a source electrode connected to the second node N2, and a gate electrode connected to a first scan signal line for transmitting a first scan signal SC1($n$). Thus, the first transistor T1 connects a gate electrode and a drain electrode of the driving transistor DT, in response to the first scan signal SC1($n$) at a high level which is a turn-on level.

The second transistor T2 applies a data voltage Vdata received from the data line to the first node N1 which is the source electrode of the driving transistor DT. The second transistor T2 may be a p-type MOSFET PMOS and may be a low-temperature polycrystalline silicon (LTPS) thin film transistor. The second transistor T2 includes a source electrode connected to the data line, a drain electrode connected to the first node N1, and a gate electrode connected to a second scan signal line for transmitting a second scan signal SC2($n$). Then, the second transistor T2 applies a data voltage Vdata received from the data line to the first node N1 which is the source electrode of the driving transistor DT, in response to the second scan signal SC2($n$) at a low level which is a turn-on level.

The third transistor T3 applies a high-potential driving voltage VDD to the first node N1 which is the source electrode of the driving transistor DT. The third transistor T3 may be a p-type MOSFET PMOS and may be a low-temperature polycrystalline silicon (LTPS) thin film transistor. The third transistor T3 includes a source electrode connected to a high-potential driving voltage line for transmitting the high-potential driving voltage VDD, a drain electrode connected to the first node N1, and a gate electrode connected to a third scan signal line for transmitting a third scan signal SC3($n$). Then, the third transistor T3 applies the high-potential driving voltage VDD to the first node N1 which is the source electrode of the driving transistor DT, in response to the third scan signal SC3($n$) at a low level which is a turn-on level.

The fourth transistor T4 forms a current path between the driving transistor DT and the organic light emitting diode OLED. The fourth transistor T4 may be a p-type MOSFET PMOS and may be a low-temperature polycrystalline silicon (LTPS) thin film transistor. The fourth transistor T4 includes a source electrode connected to the third node N3, a drain electrode connected to the fourth node N4, and a gate electrode connected to an emission signal line for transmitting the emission signal EM(n). The fourth transistor T4 forms a current path between the third node N3 which is the source electrode of the fourth transistor T4 and the fourth node N4 which is the drain electrode of the fourth transistor T4, in response to the emission signal EM(n). Then, the fourth transistor T4 forms a current path between the driving transistor DT and the organic light emitting diode OLED in response to the emission signal EM(n) at a low level which is a turn-on level.

The fifth transistor T5 applies an initial voltage Vini to the second node N2 which is the gate electrode of the driving transistor DT. The fifth transistor T5 may be an n-type MOSFET NMOS to reduce the leakage current, and may be an oxide thin film transistor. The fifth transistor T5 includes a source electrode connected to an initial voltage line for transmitting the initial voltage Vini, a drain electrode connected to the second node N2, and a gate electrode connected to a first scan signal line at a previous stage transmitting a first scan signal SC1(*n*−1) at the previous stage. Then, the fifth transistor T5 applies the initial voltage Vini to the second node N2 which is the drain electrode of the driving transistor DT, in response to the first scan signal SC1(*n*−1) at the previous stage at a high level which is a turn-on level.

The sixth transistor T6 applies a reset voltage VAR to the fourth node N4 which is an anode of the organic light emitting diode. The sixth transistor T6 may be a p-type MOSFET PMOS and may be a low-temperature polycrystalline silicon (LTPS) thin film transistor. The sixth transistor T6 includes a source electrode connected to a reset voltage line for transmitting the reset voltage VAR, a drain electrode connected to the fourth node N4, and a gate electrode connected to a fourth scan signal line for transmitting a fourth scan signal SC4(*n*). Then, the sixth transistor T6 applies the reset voltage VAR to the fourth node N4 which is the anode of the organic light emitting diode, in response to the fourth scan signal SC4(*n*) at a low level which is a turn-on level.

The seventh transistor T7 applies a high-potential driving voltage VDD to the fifth node N5. The seventh transistor T7 may be a p-type MOSFET PMOS and may be a low-temperature polycrystalline silicon (LTPS) thin film transistor. The seventh transistor T7 includes a source electrode connected to a high-potential driving voltage line for transmitting the high-potential driving voltage VDD, a drain electrode connected to the fifth node N5, and a gate electrode connected to an emission signal line for transmitting an emission signal EM(n). Then, the seventh transistor T7 applies the high-potential driving voltage VDD to the fifth node N5, in response to the emission signal EM(n) at a low level which is a turn-on level.

The eighth transistor T8 applies a reference voltage Vref to the fifth node N5. The eighth transistor T8 may be a p-type MOSFET PMOS and may be a low-temperature polycrystalline silicon (LTPS) thin film transistor. The eighth transistor T8 includes a source electrode connected to a reference voltage line for transmitting the reference voltage Vref, a drain electrode connected to the fifth node N5, and a gate electrode connected to a fourth scan signal line for transmitting a fourth scan signal SC4(*n*). Then, the eighth transistor T8 applies the reference voltage Vref to the fifth node N5, in response to the fourth scan signal SC4(*n*) at a low level which is a turn-on level.

The storage capacitor Cst includes a first electrode connected to the second node N2 and a second electrode connected to the fifth node N5. That is, one electrode of the storage capacitor Cst is connected to the gate electrode of the driving transistor DT, and the other electrode of the storage capacitor Cst is connected to the seventh transistor T7 and the eighth transistor T8.

Figure 12:
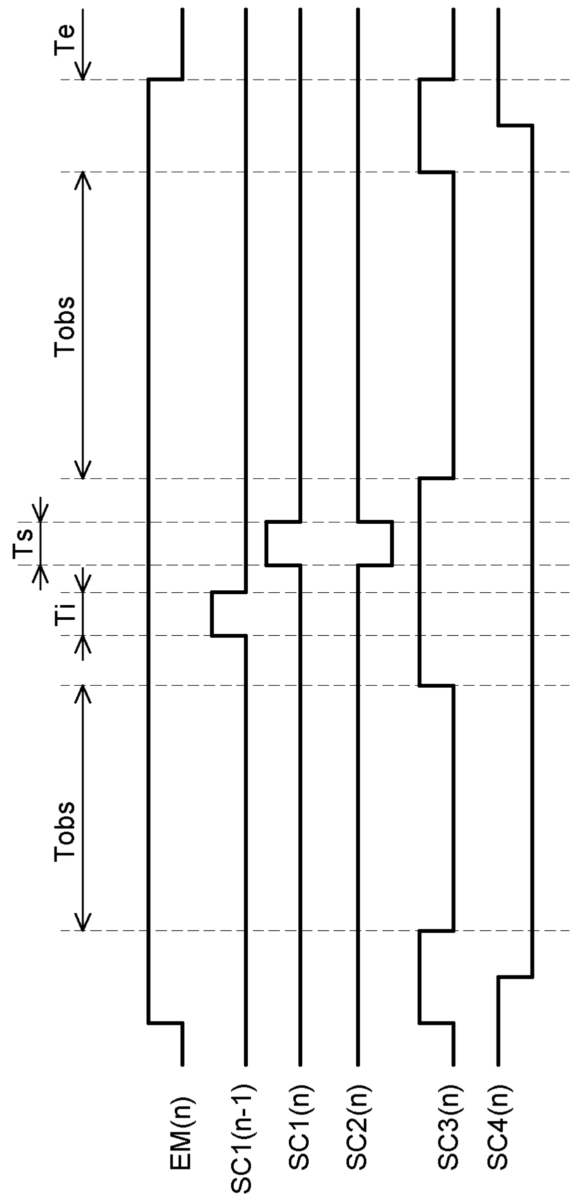
FIG. 12 is a waveform diagram illustrating an emission signal and a scan signal for a refresh frame in the organic light emitting display device according to yet another (third) exemplary embodiment of the present disclosure.

FIG. 12 is a waveform diagram illustrating an emission signal and a scan signal for a refresh frame in the organic light emitting display device according to yet another (third) exemplary embodiment of the present disclosure.

Figure 13:
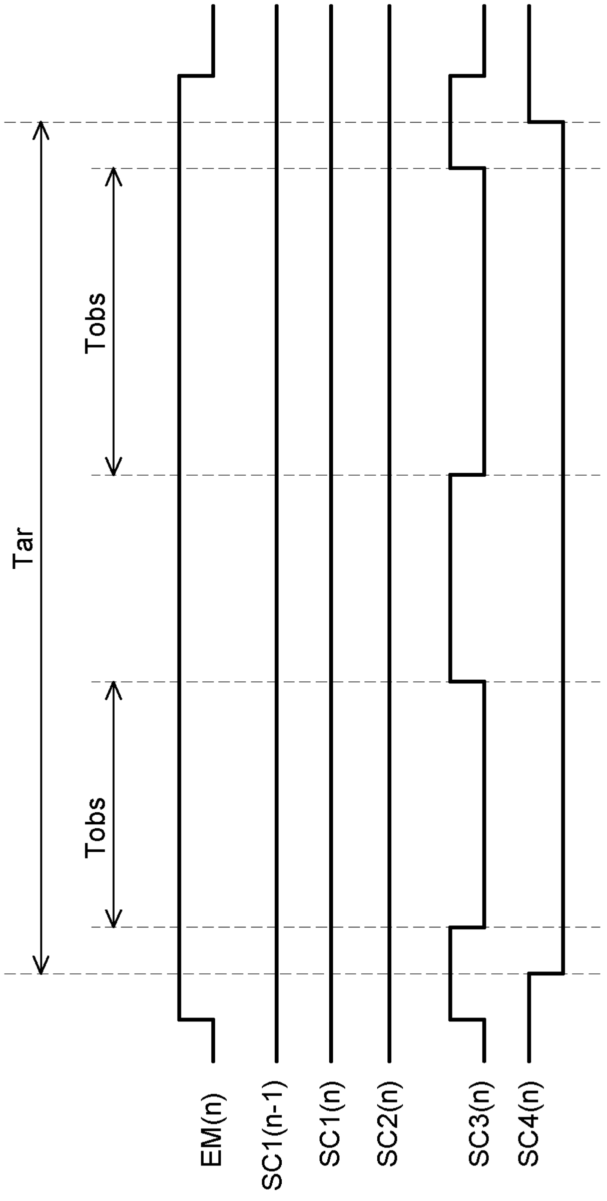
FIG. 13 is a waveform diagram illustrating an emission signal and a scan signal for a reset frame in the organic light emitting display device according to yet another (third) exemplary embodiment of the present disclosure.

FIG. 13 is a waveform diagram illustrating an emission signal and a scan signal for a reset frame in the organic light emitting display device according to yet another (third) exemplary embodiment of the present disclosure.

Figure 14A:
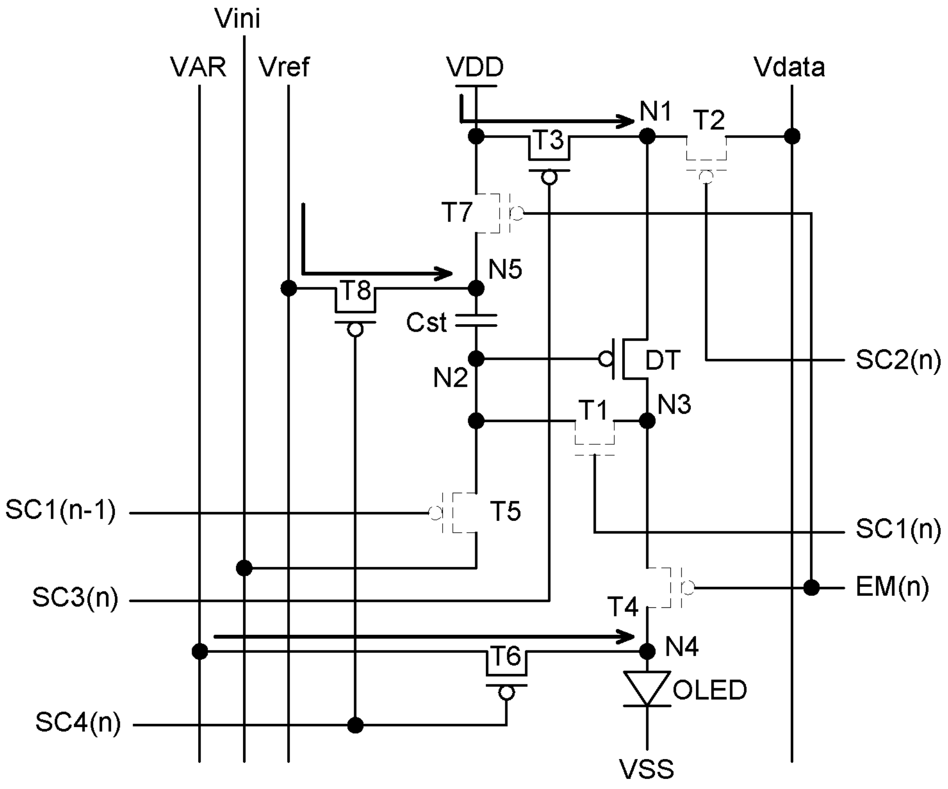
FIG. 14A is a circuit diagram of a pixel for an on-bias stress period in the organic light emitting display device according to yet another (third) exemplary embodiment of the present disclosure.

FIG. 14A is a circuit diagram of a pixel for an on-bias stress period in the organic light emitting display device according to yet another (third) exemplary embodiment of the present disclosure.

Figure 14B:
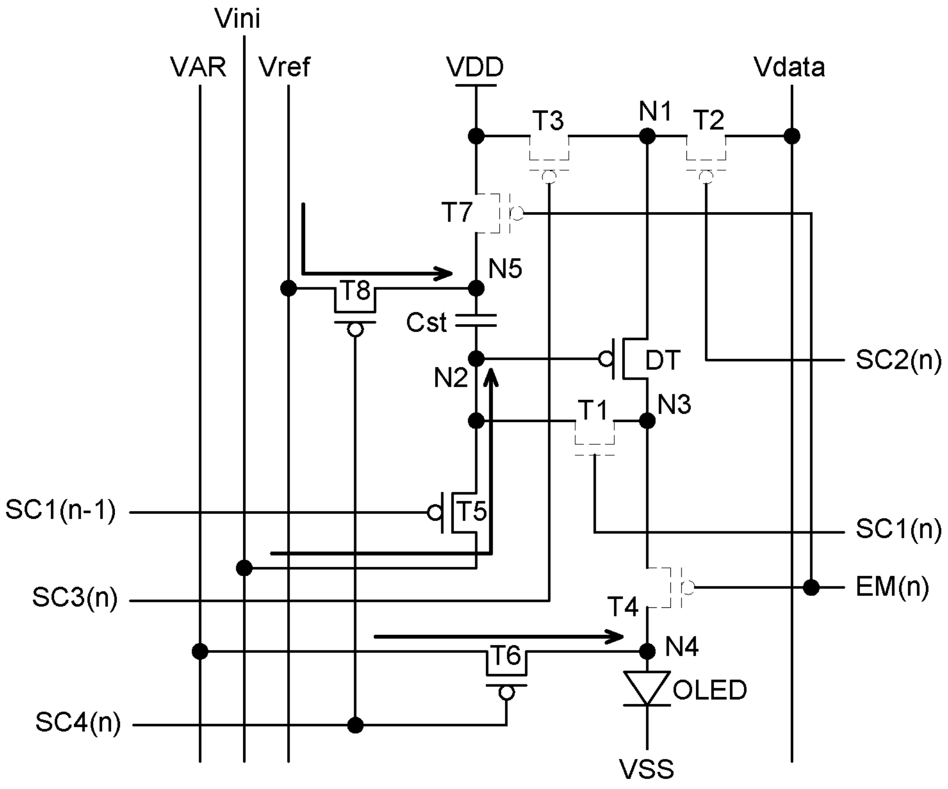
FIG. 14B is a circuit diagram of a pixel for an initial period in the organic light emitting display device according to yet another (third) exemplary embodiment of the present disclosure.

FIG. 14B is a circuit diagram of a pixel for an initial period in the organic light emitting display device according to yet another (third) exemplary embodiment of the present disclosure.

Figure 14C:
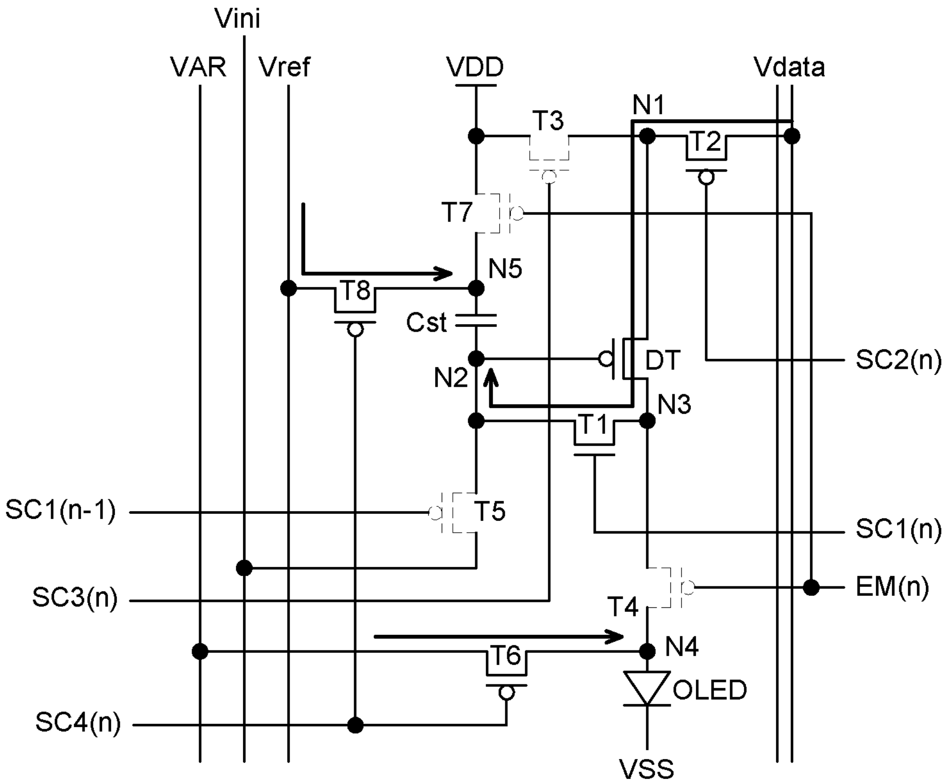
FIG. 14C is a circuit diagram of a pixel for a sampling period in the organic light emitting display device according to yet another (third) exemplary embodiment of the present disclosure.

FIG. 14C is a circuit diagram of a pixel for a sampling period in the organic light emitting display device according to yet another (third) exemplary embodiment of the present disclosure.

Figure 14D:
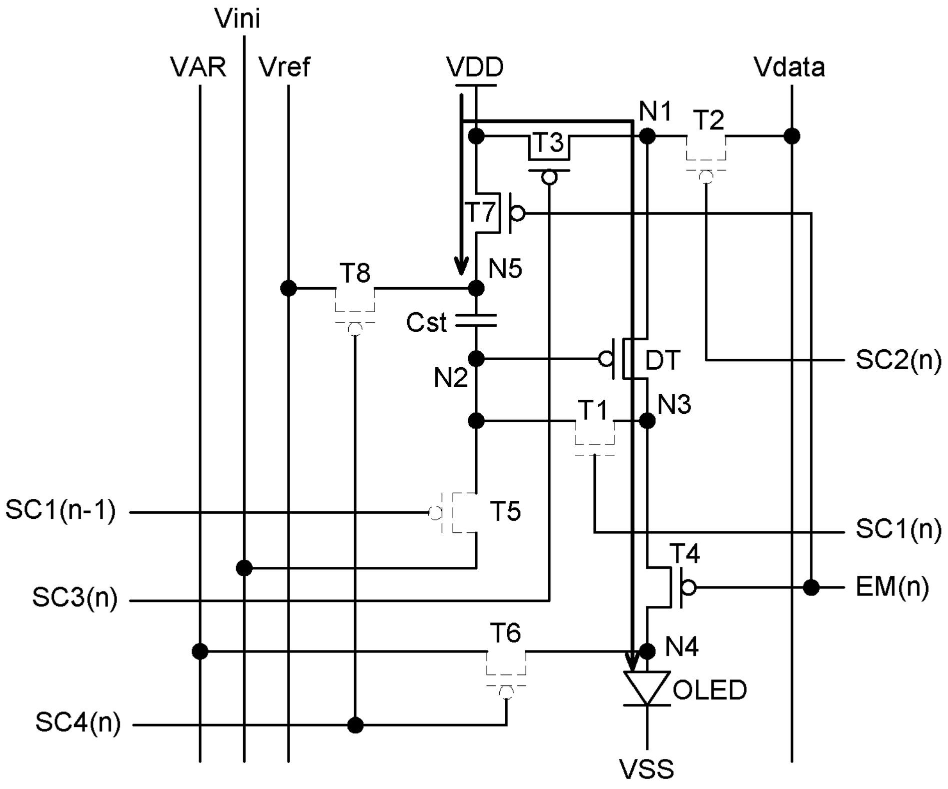
FIG. 14D is a circuit diagram of a pixel for an emission period in the organic light emitting display device according to yet another (third) exemplary embodiment of the present disclosure.

FIG. 14D is a circuit diagram of a pixel for an emission period in the organic light emitting display device according to yet another (third) exemplary embodiment of the present disclosure.

Referring to FIGS. 11 to 14D, the driving of the organic light emitting display device according to yet another (third) exemplary embodiment of the present disclosure will be described as follows.

The organic light emitting display device according to yet another (third) exemplary embodiment of the present disclosure may be driven separately in a refresh frame and a reset frame. In the refresh frame, the data voltage Vdata is programmed in each pixel P, and the organic light emitting diode OLED emits light. Then, the reset frame may be a vertical blank frame, and the anode of the organic light emitting diode OLED is reset for the reset frame.

In the organic light emitting display device according to yet another (third) exemplary embodiment of the present disclosure, the refresh frame may be divided into a stress period Tobs, an initial period Ti, a sampling period Ts, and an emission period Te. The stress period Tobs is a period of giving a bias stress to the first node N1 which is the source electrode of the driving transistor DT. The initial period Ti is a period of initializing the voltage of the third node N3 which is the drain electrode of the driving transistor DT. The sampling period Ts is a period for sampling a threshold voltage Vth of the driving transistor DT and programming the data voltage Vdata. The emission period Te is a period for allowing the organic light emitting diode OLED to emit light according to a driving current by a source-gate voltage of the programmed driving transistor DT.

Specifically, referring to FIGS. 12 and 14A, for a first stress period Tobs, the third scan signal SC3(*n*) has a low level which is a turn-on level and the fourth scan signal SC4(*n*) has a low level which is a turn-on level. Thus, the sixth transistor T6 is turned on to apply the reset voltage to the fourth node N4. That is, the anode electrode of the organic light emitting diode OLED is reset to the reset voltage VAR. In addition, the eighth transistor T8 is turned on to apply the reference voltage Vref to the fifth node N5. In addition, the third transistor T3 is turned on to apply the high-potential driving voltage VDD to the first node N1. That is, for the stress period Tobs, the bias stress is applied to the first node N1 which is the source electrode of the driving transistor DT to lower the gate-source voltage Vgs of the driving transistor DT. Therefore, for the stress period Tobs, a source-drain current Ids of the driving transistor DT flows to mitigate the hysteresis of the driving transistor DT.

In addition, referring to FIGS. 12 and 14B, for the initial period Ti, the first scan signal SC1(*n*−1) at the previous stage has a high level which is a turn-on level and the fourth scan signal SC4(*n*) has a low level which is a turn-on level. In addition, the fifth transistor T5 is turned on to apply the initial voltage Vini to the second node N2. As a result, the gate electrode of the driving transistor DT is initialized to the initial voltage Vini. The initial voltage Vini may be selected within a voltage range that is sufficiently lower than an operating voltage of the organic light emitting diode OLED and set as a voltage equal to or lower than a low-potential driving voltage VSS. In addition, in the initial period Ti, the sixth transistor and the eighth transistor T8 are still turned on, and as a result, the reset voltage VAR is maintained in the fourth node N4 and the reference voltage Vref is maintained in the fifth node N5. In addition, in the initial period Ti, since the second scan signal SC2(*n*) and the third scan signal SC3(*n*) have a high level which is a turn-off level, the second transistor T2 and the third transistor T3 are turned off, and as a result, the first node N1 may be floated while the high-potential driving voltage VDD is applied. Thus, the gate-source voltage Vgs of the driving transistor DT may be Vini−VDD.

In addition, referring to FIGS. 12 and 14C, for the sampling period Ts, the first scan signal SC1(*n*) has a high level which is a turn-on level, the second scan signal SC2(*n*) has a low level which is a turn-on level, and the fourth scan signal SC4(*n*) has a low level which is a turn-on level. In addition, for the sampling period Ts, the second transistor T2 is turned on, and the data voltage Vdata is applied to the first node N1. Then, since the first transistor T1 is also turned on, the driving transistor DT is connected and the gate electrode and the drain electrode of the driving transistor DT are short-circuited, so that the driving transistor DT operates like a diode.

In the sampling period Ts, a current Ids flows between the source-drain of the driving transistor DT. Since the gate electrode and the drain electrode of the driving transistor DT are connected, the voltage of the second node N2 increases by the current flowing from the source electrode to the drain electrode until the gate-source voltage Vgs of the driving transistor DT is Vth. For the sampling period Ts, the voltage of the second node N2 is charged into a voltage Vdata+Vth corresponding to a sum of the data voltage Vdata and the threshold voltage Vth of the driving transistor DT.

Then, in the sampling period Ts, the sixth transistor and the eighth transistor T8 are still turned on, and as a result, the reset voltage VAR is maintained in the fourth node N4 and the reference voltage Vref is maintained in the fifth node N5.

In addition, referring to FIGS. 12 and 14A, for a second stress period Tobs, the third scan signal SC3(*n*) has a low level which is a turn-on level and the fourth scan signal SC4(*n*) has a low level which is a turn-on level. In addition, the third transistor T3 is turned on to apply the high-potential driving voltage VDD to the first node N1. That is, for the stress period Tobs, the bias stress is applied to the first node N1 which is the source electrode of the driving transistor DT to mitigate a hysteresis effect of the driving transistor DT. For the second stress period Tobs, the sixth transistor and the eighth transistor T8 are still turned on, and as a result, the reset voltage VAR is maintained in the fourth node N4 and the reference voltage Vref is maintained in the fifth node N5.

In addition, referring to FIGS. 12 and 14D, for the emission period Te, the third scan signal SC3(*n*) has a low level which is a turn-on level and the emission signal EM(n) has a low level which is a turn-on level. Then, the third transistor T3 is turned on to apply the high-potential driving voltage VDD to the first node N1. In addition, the seventh transistor T7 is turned on to apply the high-potential driving voltage VDD to the fifth node N5. That is, in the fifth node N5, the voltage is increased from the reference voltage Vref to the high-potential driving voltage VDD. In addition, since the second node N2 is coupled with the fifth node N5 through the storage capacitor Cst, a voltage variance VDD−Vref of the fifth node N5 is reflected to the second node N2. Thus, the voltage of the second node N2, which is the gate electrode of the driving transistor DT, is changed to Vdata+Vth+(VDD−Vref). Thus, the gate-source voltage Vgs of the driving transistor DT may be Vdata+Vth−Vref. In addition, the fourth transistor T4 is turned on to form a current path of the third node N3 and the fourth node N4. As a result, the driving current Ioled via the source electrode and the drain electrode of the driving transistor DT is applied to the organic light emitting diode OLED.

For the emission period Te, a relation on the driving current Ioled flowing in the organic light emitting diode OLED is as the following Equation 1.

$$Ioled=k(Vgs-Vth)2=k(Vdata+Vth-Vref-Vth)2=k(Vdata-Vref)2 \qquad \text{[Equation 1]}$$

In Equation 1, k represents a proportional constant determined by an electron mobility, a parasitic capacitance, a channel capacity, and the like of the driving transistor DT.

As shown in Equation 1, in the relation of the driving current Ioled, both a threshold voltage Vth component and a high-potential driving voltage VDD component of the driving transistor DT are erased. This means that in the organic light emitting display device according to the present disclosure, even if the threshold voltage Vth and the high-potential driving voltage VDD change, the driving current Ioled does not change. That is, the organic light emitting display device according to yet another (third) exemplary embodiment of the present disclosure may program the data voltage regardless of the variances of the threshold voltage Vth and the high-potential driving voltage VDD.

In addition, referring to FIG. 13, for the reset frame, the first scan signal SC1(*n*−1) of the previous stage and the first scan signal SC1(*n*) are maintained at a low level which is a turn-off level, and the second scan signal SC2(*n*) is also maintained at a high level which is a turn-off level. Then, for the reset frame, the data voltage Vdata is not programmed in each pixel P, and the organic light emitting diode OLED does not emit light.

However, the emission signal EM(n), the third scan signal SC3(*n*), and the fourth scan signal SC4(*n*) periodically swing, respectively. That is, since the third scan signal SC3(*n*) periodically swings, the reset frame may include a plurality of stress periods Tobs.

That is, for the reset frame, the bias stress may be applied to the first node N1 which is the source electrode of the driving transistor DT.

In addition, since the fourth scan signal SC4(*n*) periodically swings for the reset frame, the reset frame may include an anode reset period Tar in which the fourth scan signal SC4(*n*) has a low level which is a turn-on level.

That is, for the reset frame, the anode electrode of the organic light emitting diode OLED may be periodically reset to the reset voltage VAR.

As a result, in the organic light emitting display device according to yet another (third) exemplary embodiment of the present disclosure, the anode electrode of the organic light emitting diode OLED may be periodically reset through the refresh frame and the reset frame. Then, even in the driving at a low frequency, since the continuous voltage rise of the anode electrode of the organic light emitting diode OLED caused by the leakage current is suppressed, the anode electrode of the organic light emitting diode OLED may maintain a constant voltage level. Therefore, despite the switching of the driving frequency, a change in luminance of the organic light emitting display device may be reduced to increase the image quality.

As described above, the organic light emitting display device according to yet another (third) exemplary embodiment of the present disclosure may apply the bias stress to the driving transistor DT by applying the high-potential driving voltage VDD which has been used, instead of applying a separate on-bias stress voltage. Therefore, since a wiring for applying a separate on-bias stress voltage is unnecessary, the resolution of the panel may be increased and a bezel area may also be reduced.

Hereinafter, an organic light emitting display device according to yet another (fourth) exemplary embodiment of the present disclosure will be described. The organic light emitting display device according to yet another (fourth) exemplary embodiment of the present disclosure has a difference in a signal applied to the transistor from the organic light emitting display device according to another exemplary embodiment of the present disclosure, and other technical features are the same as each other. Therefore, the difference between the organic light emitting display device according to yet another (fourth) exemplary embodiment of the present disclosure and the organic light emitting display device according to another exemplary embodiment of the present disclosure will be mainly described, and the description for the duplicated parts will be omitted.

Fourth Exemplary Embodiment

Figure 15:
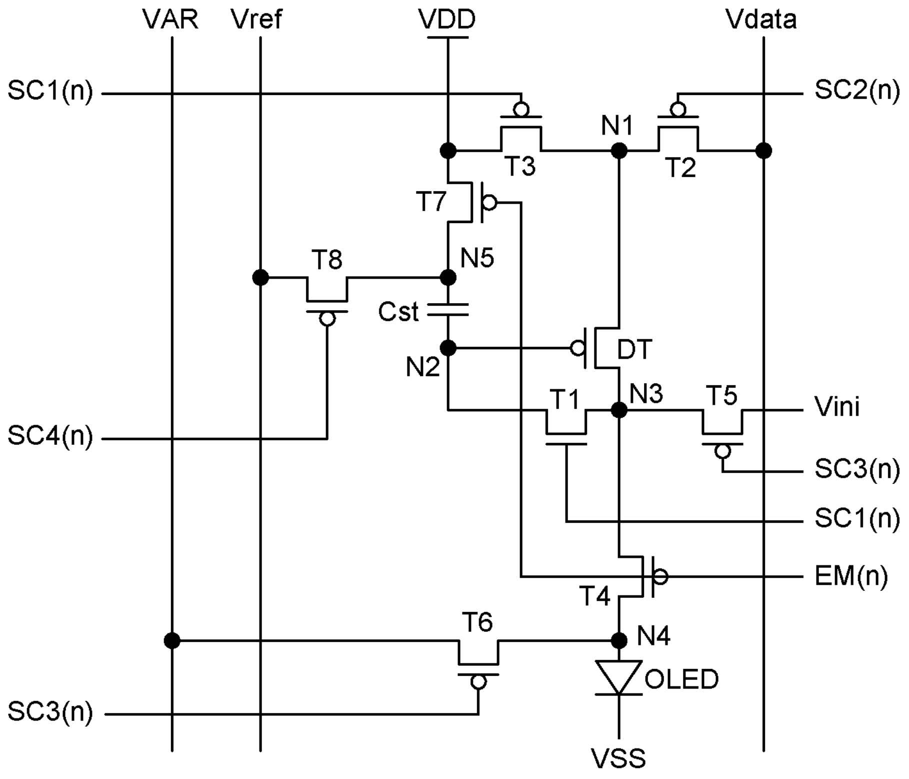
FIG. 15 is a circuit diagram illustrating a pixel of an organic light emitting display device according to yet another (fourth) exemplary embodiment of the present disclosure.

FIG. 15 is a circuit diagram illustrating a pixel of the organic light emitting display device according to yet another (fourth) exemplary embodiment of the present disclosure.

In the organic light emitting display device according to yet another (fourth) exemplary embodiment of the present disclosure, each pixel P includes an organic light emitting diode OLED, a driving transistor DT, first to eighth transistors T1 to T8, and a capacitor Cst.

The driving transistor DT controls a driving current applied to the organic light emitting diode OLED according to a source-gate voltage Vsg thereof. The driving transistor DT may be a p-type MOSFET PMOS and may be a low temperature polycrystalline silicon (LTPS) thin film transistor. In addition, a source electrode of the driving transistor DT is connected to a first node N1, a gate electrode thereof is connected to a second node N2, and a drain electrode thereof is connected to a third node N3.

The first transistor T1 connects the gate electrode and the drain electrode. The first transistor T1 may be an n-type MOSFET NMOS to reduce the leakage current, and may be an oxide thin film transistor. The first transistor T1 includes a drain electrode connected to the third node N3, a source electrode connected to the second node N2, and a gate electrode connected to a first scan signal line for transmitting a first scan signal SC1(*n*). Thus, the first transistor T1 connects a gate electrode and a drain electrode of the driving transistor DT, in response to the first scan signal SC1(*n*) at a high level which is a turn-on level.

The second transistor T2 applies a data voltage Vdata received from the data line to the first node N1 which is the source electrode of the driving transistor DT. The second transistor T2 may be a p-type MOSFET PMOS and may be a low temperature polycrystalline silicon (LTPS) thin film transistor. The second transistor T2 includes a source electrode connected to the data line, a drain electrode connected to the first node N1, and a gate electrode connected to a second scan signal line for transmitting a second scan signal SC2(*n*). Then, the second transistor T2 applies a data voltage Vdata received from the data line to the first node N1 which is the source electrode of the driving transistor DT, in response to the second scan signal SC2(*n*) at a low level which is a turn-on level.

The third transistor T3 applies a high-potential driving voltage VDD to the first node N1 which is the source electrode of the driving transistor DT. The third transistor T3 may be a p-type MOSFET PMOS and may be a low-temperature polycrystalline silicon (LTPS) thin film transistor. The third transistor T3 includes a source electrode connected to a high-potential driving voltage line for transmitting the high-potential driving voltage VDD, a drain electrode connected to the first node N1, and a gate electrode connected to a first scan signal line for transmitting a first scan signal SC1(*n*). Then, the third transistor T3 applies the high-potential driving voltage VDD to the first node N1 which is the source electrode of the driving transistor DT, in response to the first scan signal SC1(*n*) at a low level which is a turn-on level.

The fourth transistor T4 forms a current path between the driving transistor DT and the organic light emitting diode OLED. The fourth transistor T4 may be a p-type MOSFET PMOS and may be a low-temperature polycrystalline silicon (LTPS) thin film transistor. The fourth transistor T4 includes a source electrode connected to the third node N3, a drain electrode connected to the fourth node N4, and a gate electrode connected to an emission signal line for transmitting the emission signal EM(n). The fourth transistor T4 forms a current path between the third node N3 which is the source electrode of the fourth transistor T4 and the fourth node N4 which is the drain electrode of the fourth transistor T4, in response to the emission signal EM(n). Then, the fourth transistor T4 forms a current path between the driving transistor DT and the organic light emitting diode OLED in response to the emission signal EM(n) at a low level which is a turn-on level.

The fifth transistor T5 applies an initial voltage Vini to the third node N3 which is the drain electrode of the driving transistor DT. The fifth transistor T5 may be a p-type MOSFET PMOS and may be a low-temperature polycrystalline silicon (LTPS) thin film transistor. The fifth transistor T5 includes a source electrode connected to an initial voltage line for transmitting the initial voltage Vini, a drain electrode connected to the third node N3, and a gate electrode connected to a third scan signal line for transmitting a third scan signal SC3(*n*). Then, the fifth transistor T5 applies the initial voltage Vini to the third node N3 which is the drain electrode of the driving transistor DT, in response to the third scan signal SC3(*n*) at a low level which is a turn-on level.

The sixth transistor T6 applies a reset voltage VAR to the fourth node N4 which is an anode of the organic light emitting diode. The sixth transistor T6 may be a p-type MOSFET PMOS and may be a low-temperature polycrystalline silicon (LTPS) thin film transistor. The sixth transistor T6 includes a source electrode connected to a reset voltage line for transmitting the reset voltage VAR, a drain electrode connected to the fourth node N4, and a gate electrode connected to a third scan signal line for transmitting a third scan signal SC3(*n*). Then, the sixth transistor T6 applies the reset voltage VAR to the fourth node N4 which is the anode of the organic light emitting diode, in response to the third scan signal SC3(*n*) at a low level which is a turn-on level.

The seventh transistor T7 applies a high-potential driving voltage VDD to the fifth node N5. The seventh transistor T7 may be a p-type MOSFET PMOS and may be a low-temperature polycrystalline silicon (LTPS) thin film transistor. The seventh transistor T7 includes a source electrode connected to a high-potential driving voltage line for transmitting the high-potential driving voltage VDD, a drain electrode connected to the fifth node N5, and a gate electrode connected to an emission signal line for transmitting an emission signal EM(n). Then, the seventh transistor T7 applies the high-potential driving voltage VDD to the fifth node N5, in response to the emission signal EM(n) at a low level which is a turn-on level.

The eighth transistor T8 applies a reference voltage Vref to the fifth node N5. The eighth transistor T8 may be a p-type MOSFET PMOS and may be a low-temperature polycrystalline silicon (LTPS) thin film transistor. The eighth transistor T8 includes a source electrode connected to a reference voltage line for transmitting the reference voltage Vref, a drain electrode connected to the fifth node N5, and a gate electrode connected to a fourth scan signal line for transmitting a fourth scan signal SC4(*n*). Then, the eighth transistor T8 applies the reference voltage Vref to the fifth node N5, in response to the fourth scan signal SC4(*n*) at a low level which is a turn-on level.

The storage capacitor Cst includes a first electrode connected to the second node N2 and a second electrode connected to the fifth node N5. That is, one electrode of the storage capacitor Cst is connected to the gate electrode of the driving transistor DT, and the other electrode of the storage capacitor Cst is connected to the seventh transistor T7 and the eighth transistor T8.

Figure 16:
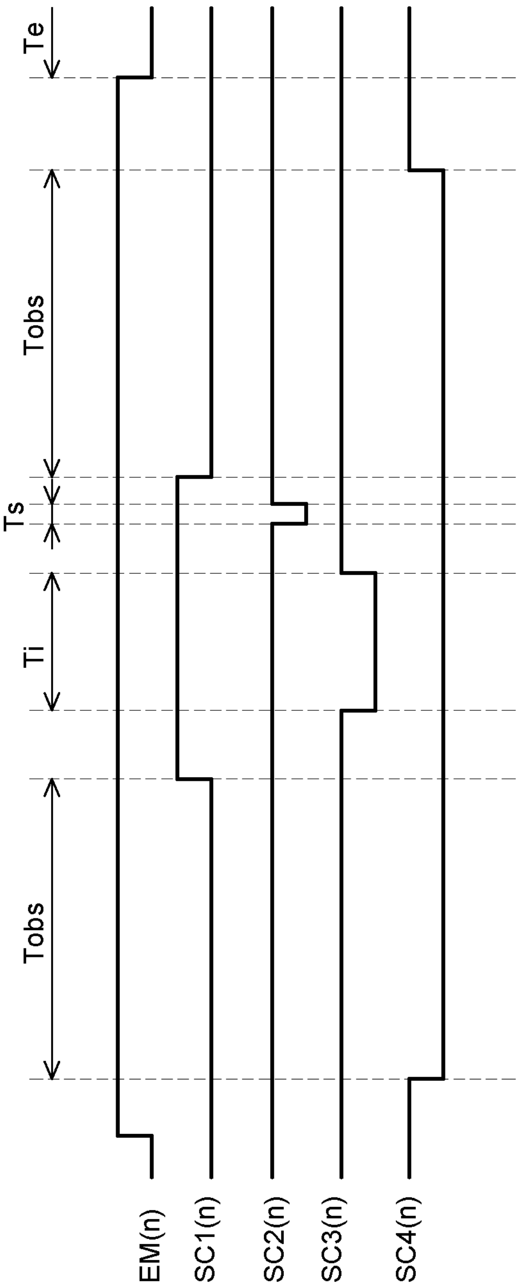
FIG. 16 is a waveform diagram illustrating an emission signal and a scan signal for a refresh frame in the organic light emitting display device according to yet another (fourth) exemplary embodiment of the present disclosure.

FIG. 16 is a waveform diagram illustrating an emission signal and a scan signal for a refresh frame in the organic light emitting display device according to yet another (fourth) exemplary embodiment of the present disclosure.

Figure 17:
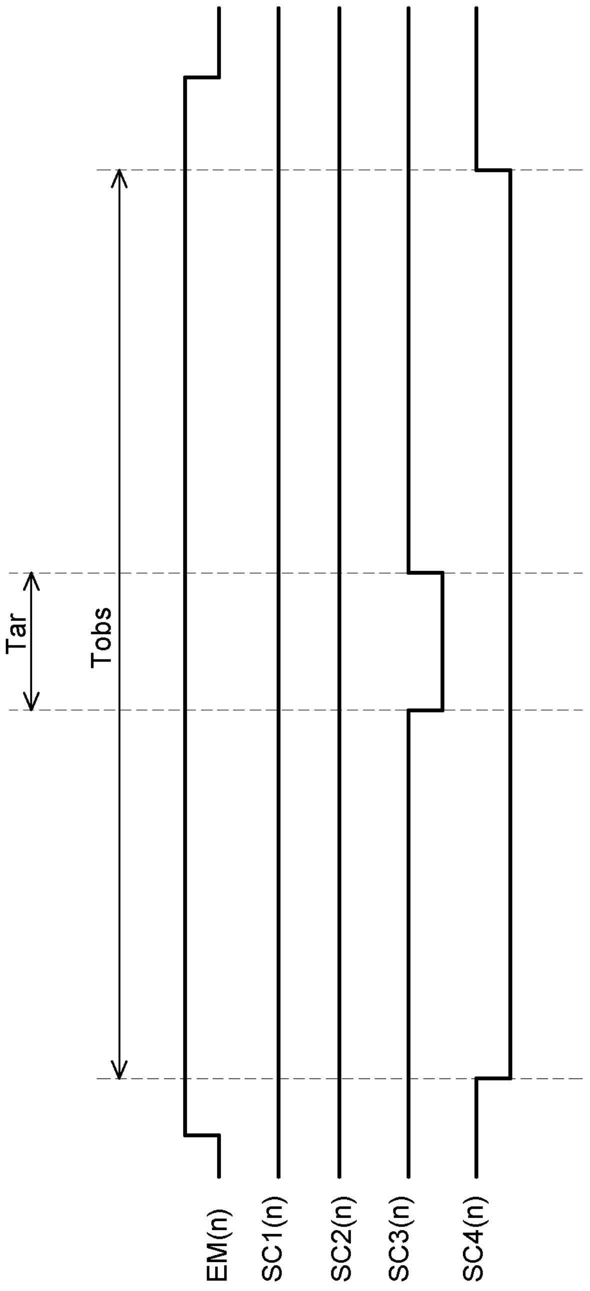
FIG. 17 is a waveform diagram illustrating an emission signal and a scan signal for a reset frame in the organic light emitting display device according to yet another (fourth) exemplary embodiment of the present disclosure.

FIG. 17 is a waveform diagram illustrating an emission signal and a scan signal for a reset frame in the organic light emitting display device according to yet another (fourth) exemplary embodiment of the present disclosure.

Figure 18A:
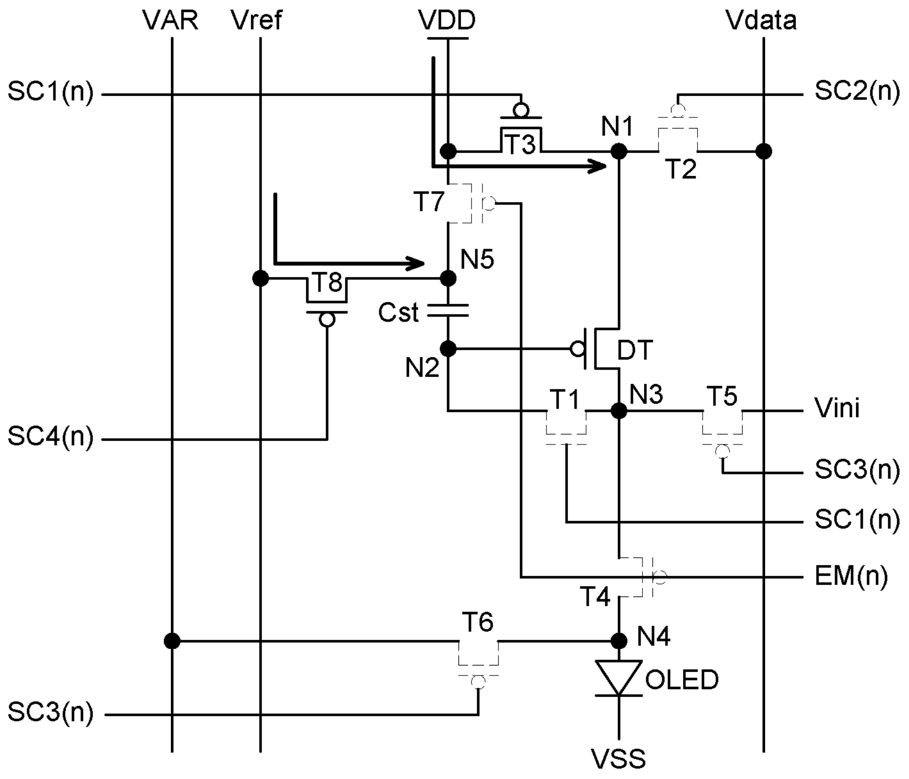
FIG. 18A is a circuit diagram of a pixel for an on-bias stress period in the organic light emitting display device according to yet another (fourth) exemplary embodiment of the present disclosure.

FIG. 18A is a circuit diagram of a pixel for an on-bias stress period in the organic light emitting display device according to yet another (fourth) exemplary embodiment of the present disclosure.

Figure 18B:
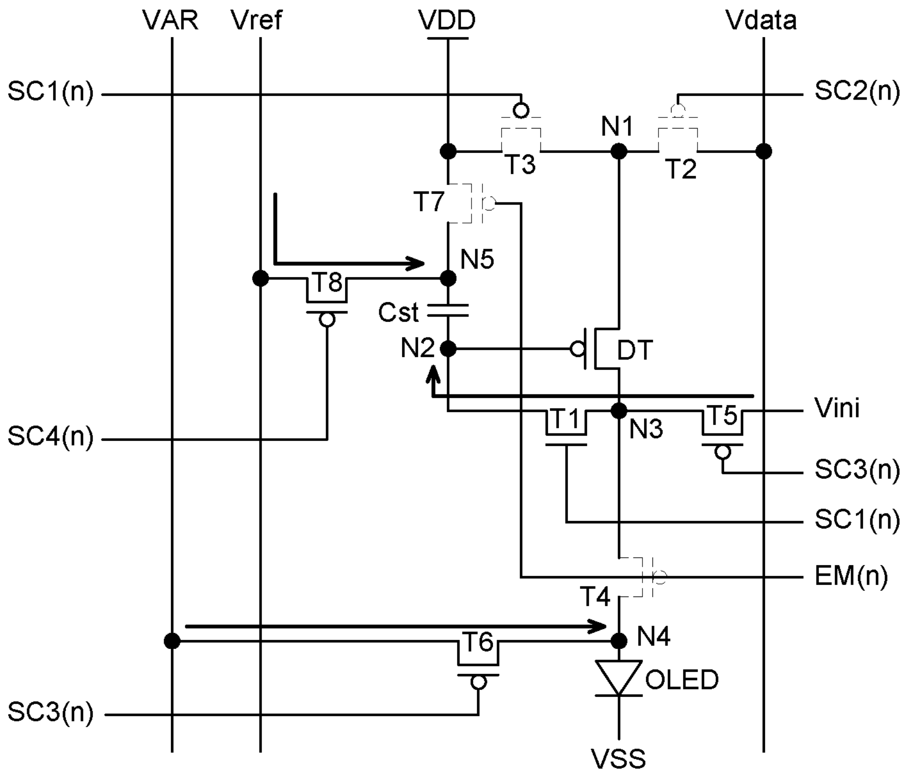
FIG. 18B is a circuit diagram of a pixel for an initial period in the organic light emitting display device according to yet another (fourth) exemplary embodiment of the present disclosure.

FIG. 18B is a circuit diagram of a pixel for an initial period in the organic light emitting display device according to yet another (fourth) exemplary embodiment of the present disclosure.

Figure 18C:
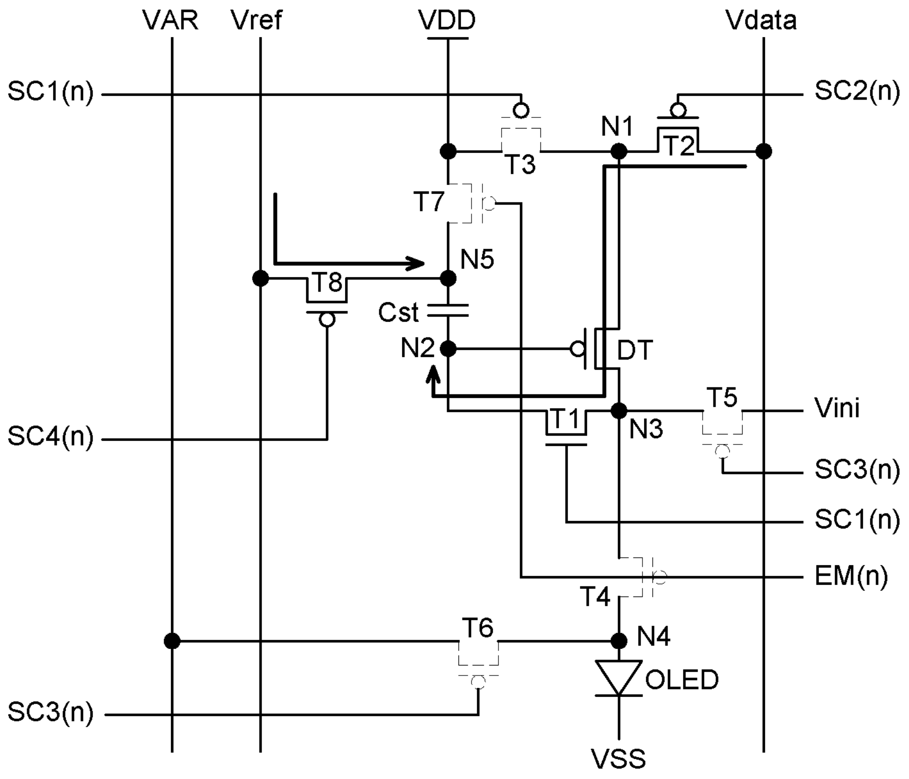
FIG. 18C is a circuit diagram of a pixel for a sampling period in the organic light emitting display device according to yet another (fourth) exemplary embodiment of the present disclosure.

FIG. 18C is a circuit diagram of a pixel for a sampling period in the organic light emitting display device according to yet another (fourth) exemplary embodiment of the present disclosure.

Figure 18D:
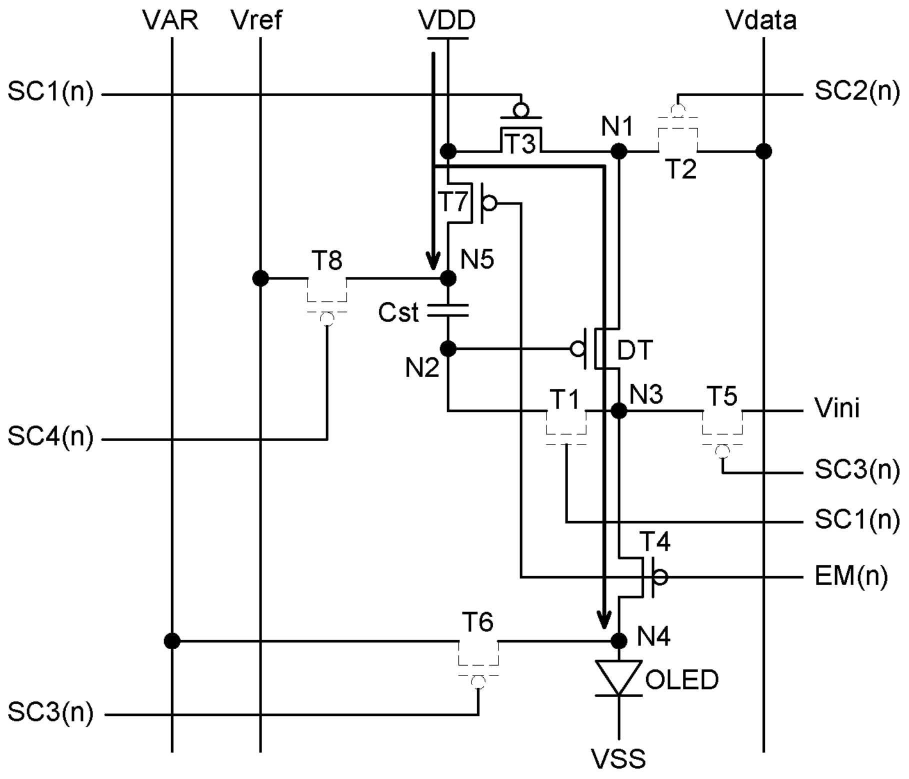
FIG. 18D is a circuit diagram of a pixel for an emission period in the organic light emitting display device according to yet another (fourth) exemplary embodiment of the present disclosure.

FIG. 18D is a circuit diagram of a pixel for an emission period in the organic light emitting display device according to yet another (fourth) exemplary embodiment of the present disclosure.

Referring to FIGS. 15 to 18D, the driving of the organic light emitting display device according to yet another (fourth) exemplary embodiment of the present disclosure will be described as follows.

The organic light emitting display device according to yet another (fourth) exemplary embodiment of the present disclosure may be driven separately in a refresh frame and a reset frame. In the refresh frame, the data voltage Vdata is programmed in each pixel P, and the organic light emitting diode OLED emits light. In addition, the reset frame may be a vertical blank frame, and the anode of the organic light emitting diode OLED is reset for the reset frame.

In the organic light emitting display device according to yet another (fourth) exemplary embodiment of the present disclosure, the refresh frame may be divided into a stress period Tobs, an initial period Ti, a sampling period Ts, and an emission period Te. The stress period Tobs is a period of giving a bias stress to the first node N1 which is the source electrode of the driving transistor DT. The initial period Ti is a period of initializing the voltage of the third node N3 which is the drain electrode of the driving transistor DT. The sampling period Ts is a period for sampling a threshold voltage Vth of the driving transistor DT and programming the data voltage Vdata. The emission period Te is a period for allowing the organic light emitting diode OLED to emit light according to a driving current by a source-gate voltage of the programmed driving transistor DT.

Specifically, referring to FIGS. 16 and 18A, for a first stress period Tobs, the first scan signal SC1(*n*) has a low level and the fourth scan signal SC4(*n*) has a low level which is a turn-on level. Then, the eighth transistor T8 is turned on to apply the reference voltage Vref to the fifth node N5. In addition, the third transistor T3 is turned on to apply the high-potential driving voltage VDD to the first node N1. The reference voltage Vref may have a lower level than the high-potential driving voltage VDD. Then, in the fifth node N5, the voltage is decreased to the reference voltage Vref from the high-potential driving voltage VDD. In addition, since the second node N2 is coupled with the fifth node N5 through the storage capacitor Cst, a voltage variance Vref−VDD of the fifth node N5 is reflected to the second node N2. Thus, the voltage of the second node N2 which is the gate electrode of the driving transistor DT is decreased to lower the gate-source voltage Vgs of the driving transistor DT. Therefore, for the stress period Tobs, a source-drain current Ids of the driving transistor DT flows to mitigate the hysteresis of the driving transistor DT.

In addition, referring to FIGS. 16 and 18B, for the initial period Ti, the first scan signal SC1(*n*) has a high level, the third scan signal SC3(*n*) has a low level which is a turn-on level, and the fourth scan signal SC4(*n*) has a low level which is a turn-on level. Thus, the first transistor T1 and the fifth transistor T5 are turned on, and the initial voltage Vini is applied to the second node N2 and the third node N3. As a result, the gate electrode of the driving transistor DT is initialized to the initial voltage Vini. The initial voltage Vini may be selected within a voltage range that is sufficiently lower than an operating voltage of the organic light emitting diode OLED and set as a voltage equal to or lower than a low-potential driving voltage VSS. In addition, in the initial period Ti, the eighth transistor T8 is still turned on, and the reference voltage Vref is maintained in the fifth node N5. In addition, the sixth transistor T6 is turned on to apply the reset voltage to the fourth node N4. That is, in the initial period Ti, the anode electrode of the organic light emitting diode OLED is reset to the reset voltage VAR. In addition, in the initial period Ti, since the first scan signal SC1(*n*) and the second scan signal SC2(*n*) have a high level which is a turn-off level, the second transistor T2 and the third transistor T3 are turned off, and as a result, the first node N1 may be floated while the high-potential driving voltage VDD is applied. Thus, the gate-source voltage Vgs of the driving transistor DT may be Vini−VDD.

In addition, referring to FIGS. 16 and 18C, for the sampling period Ts, the first scan signal SC1(*n*) has a high level which, the second scan signal SC2(*n*) has a low level which is a turn-on level, and the fourth scan signal SC4(*n*) has a low level which is a turn-on level. In addition, for the sampling period Ts, the second transistor T2 is turned on, and the data voltage Vdata is applied to the first node N1. In addition, since the first transistor T1 is also turned on, the driving transistor DT is connected and the gate electrode and the drain electrode of the driving transistor DT are short-circuited, and as a result, the driving transistor DT operates like a diode.

In the sampling period Ts, a current Ids flows between the source-drain of the driving transistor DT. Since the gate electrode and the drain electrode of the driving transistor DT are connected, the voltage of the second node N2 increases by the current flowing from the source electrode to the drain electrode until the gate-source voltage Vgs of the driving transistor DT is Vth. For the sampling period Ts, the voltage of the second node N2 is charged into a voltage Vdata+Vth corresponding to a sum of the data voltage Vdata and the threshold voltage Vth of the driving transistor DT.

In addition, in the sampling period Ts, the eighth transistor T8 is still turned on, and the reference voltage Vref is maintained in the fifth node N5.

In addition, referring to FIGS. 16 and 18A, for a second stress period Tobs, the first scan signal SC1(*n*) has a low level and the fourth scan signal SC4(*n*) has a low level which is a turn-on level. Then, the third transistor T3 is turned on to apply the high-potential driving voltage VDD to the first node N1. That is, for the stress period Tobs, the voltage of the second node N2 which is the gate electrode of the driving transistor DT is lowered to mitigate a hysteresis effect of the driving transistor DT. For the second stress period Tobs, the eighth transistor T8 is still turned on, and the reference voltage Vref is maintained in the fifth node N5.

In addition, referring to FIGS. 16 and 18D, for the emission period Te, the first scan signal SC1(*n*) has a low level and the emission signal EM(n) has a low level which is a turn-on level. Then, the third transistor T3 is turned on to apply the high-potential driving voltage VDD to the first node N1. In addition, the seventh transistor T7 is turned on to apply the high-potential driving voltage VDD to the fifth node N5. That is, in the fifth node N5, the voltage is increased from the reference voltage Vref to the high-potential driving voltage VDD. In addition, since the second node N2 is coupled with the fifth node N5 through the storage capacitor Cst, a voltage variance VDD−Vref of the fifth node N5 is reflected to the second node N2. Thus, the voltage of the second node N2, which is the gate electrode of the driving transistor DT, is changed to Vdata+Vth+(VDD−Vref). Thus, the gate-source voltage Vgs of the driving transistor DT may be Vdata+Vth−Vref. In addition, the fourth transistor T4 is turned on to form a current path of the third node N3 and the fourth node N4. As a result, the driving current Ioled via the source electrode and the drain electrode of the driving transistor DT is applied to the organic light emitting diode OLED.

For the emission period Te, a relation on the driving current Ioled flowing in the organic light emitting diode OLED is as the following Equation 1.

$$Ioled=k(Vgs-Vth)2=k(Vdata+Vth-Vref-Vth)2=k(Vdata-Vref)2 \quad \text{[Equation 1]}$$

In Equation 1, k represents a proportional constant determined by an electron mobility, a parasitic capacitance, a channel capacity, and the like of the driving transistor DT.

As shown in Equation 1, in the relation of the driving current Ioled, both a threshold voltage Vth component and a high-potential driving voltage VDD component of the driving transistor DT are erased. This means that in the organic light emitting display device according to the present disclosure, even if the threshold voltage Vth and the high-potential driving voltage VDD change, the driving current Ioled does not change. That is, the organic light emitting display device according to yet another (fourth) exemplary embodiment of the present disclosure may program the data voltage regardless of the variances of the threshold voltage Vth and the high-potential driving voltage VDD.

In addition, referring to FIG. 17, for the reset frame, the first scan signal SC1(*n*) is maintained at a low level and the second scan signal SC2(*n*) is maintained at a high level which is a turn-off level. Then, for the reset frame, the data voltage Vdata is not programmed in each pixel P, and the organic light emitting diode OLED does not emit light.

However, the first scan signal SC1(*n*) is maintained at a low level, and the reset frame may be a stress period Tobs.

That is, for the reset frame, the voltage of the second node N2, which is the gate electrode of the driving transistor DT is lowered and the source-drain current Ids of the driving transistor DT flows to mitigate the hysteresis of the driving transistor DT.

In addition, since the third scan signal SC3(*n*) periodically swings for the reset frame, the reset frame may include an anode reset period Tar in which the third scan signal SC3(*n*) has a low level which is a turn-on level.

That is, for the reset frame, the anode electrode of the organic light emitting diode OLED may be periodically reset to the reset voltage VAR.

As a result, in the organic light emitting display device according to yet another (fourth) exemplary embodiment of the present disclosure, the anode electrode of the organic light emitting diode OLED may be periodically reset through the refresh frame and the reset frame. Then, even in the driving at a low frequency, since the continuous voltage rise of the anode electrode of the organic light emitting diode OLED caused by the leakage current is suppressed, the anode electrode of the organic light emitting diode OLED may maintain a constant voltage level. Therefore, despite the switching of the driving frequency, a change in luminance of the organic light emitting display device may be reduced to increase the image quality.

As described above, the organic light emitting display device according to yet another (fourth) exemplary embodiment of the present disclosure may apply the bias stress to the driving transistor DT by applying the high-potential driving voltage VDD which has been used, instead of applying a separate on-bias stress voltage. Therefore, since a wiring for applying a separate on-bias stress voltage is unnecessary, the resolution of the panel may be increased and a bezel area may also be reduced.

Further, in the organic light emitting display device according to yet another (fourth) exemplary embodiment of the present disclosure, the first transistor T1 which is the n-type MOSFET NMOS and the third transistor T3 which is the p-type MOSFET PMOS may be controlled by the first scan signal SC1(*n*) which is one scan signal. Thus, the different types of transistors are controlled by one scan signal to simplify the pixel circuit structure.

Figure 19:
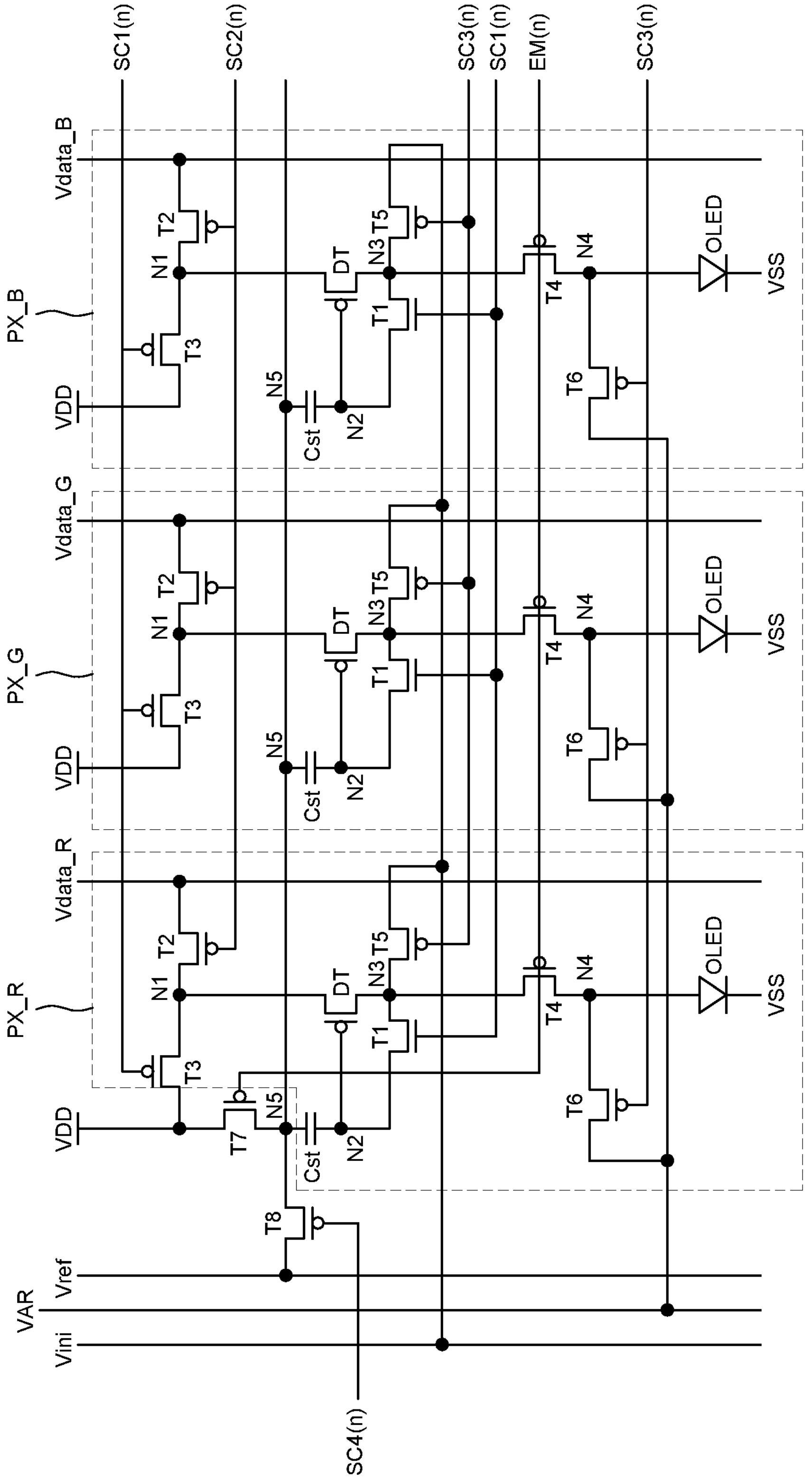
FIG. 19 is a circuit diagram illustrating a pixel of the organic light emitting display device according to yet another (fourth) exemplary embodiment of the present disclosure.

FIG. 19 is a circuit diagram illustrating a pixel of the organic light emitting display device according to yet another (fourth) exemplary embodiment of the present disclosure.

In the organic light emitting display device according to yet another (fourth) exemplary embodiment of the present disclosure, the seventh transistor T7 and the eighth transistor T8 may be shared to a plurality of pixels disposed on one horizontal line.

The plurality of pixels may include red pixels PX_R, green pixels PX_G, and blue pixels PX_B. Then, a red data voltage Vdata_R may be applied to the source electrode of the second transistor T2 of the red pixel PX_R, a green data voltage Vdata_G may be applied to the source electrode of the second transistor T2 of the green pixel PX_G, and a blue data voltage Vdata_B may be applied to the source electrode of the second transistor T2 of the blue pixel PX_B.

In addition, one seventh transistor T7 may be connected to all of the red pixel PX_R, the green pixel PX_G, and the blue pixel PX_B, and one eighth transistor T8 may be connected to all of the red pixel PX_R, the green pixel PX_G, and the blue pixel PX_B.

Specifically, the drain electrode of the seventh transistor T7 may be connected to all of the fifth node N5 of the red pixel PX_R, the fifth node N5 of the green pixel PX_G, and the fifth node N5 of the blue pixel PX_B. In addition, the drain electrode of the eighth transistor T8 may be connected to all of the fifth node N5 of the red pixel PX_R, the fifth node N5 of the green pixel PX_G, and the fifth node N5 of the blue pixel PX_B.

Hereinafter, an organic light emitting display device according to yet another (fifth) exemplary embodiment of the present disclosure will be described. The organic light emitting display device according to yet another (fifth) exemplary embodiment of the present disclosure has a difference in a signal applied to a third transistor from the organic light emitting display device according to yet another (fourth) exemplary embodiment of the present disclosure, and other technical features are the same as each other. Therefore, the difference between the organic light emitting display device according to yet another (fifth) exemplary embodiment of the present disclosure and the organic light emitting display device according to yet another (fourth) exemplary embodiment of the present disclosure will be mainly described, and the description for the duplicated parts will be omitted.

Fifth Exemplary Embodiment

Figure 20:
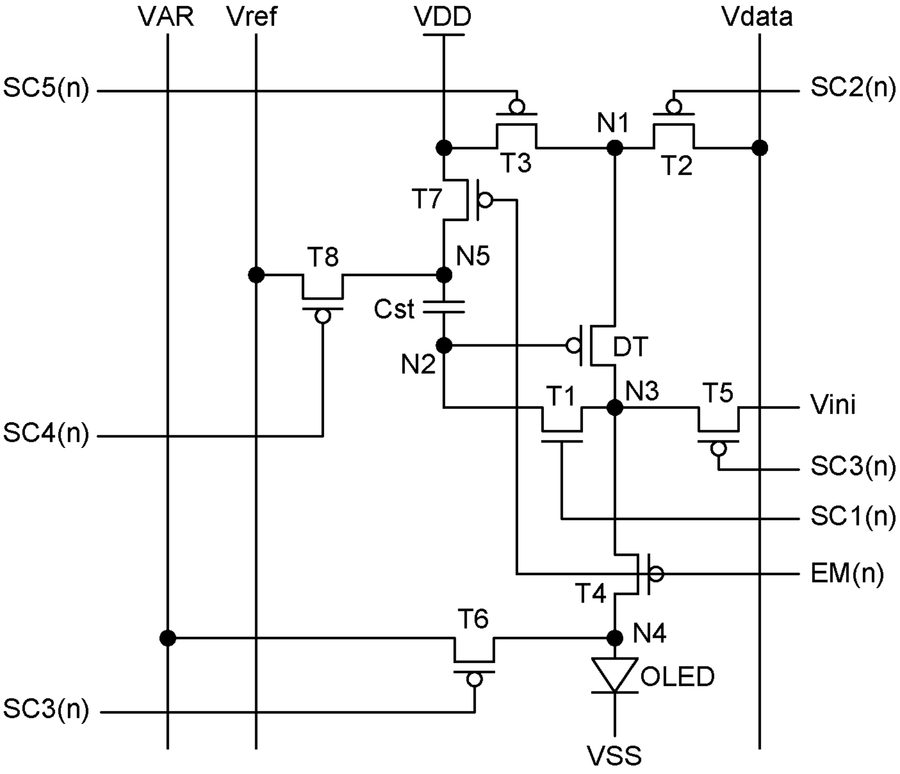
FIG. 20 is a circuit diagram illustrating a pixel of an organic light emitting display device according to yet another (fifth) exemplary embodiment of the present disclosure.

FIG. 20 is a circuit diagram illustrating a pixel of the organic light emitting display device according to yet another (fifth) exemplary embodiment of the present disclosure.

In the organic light emitting display device according to yet another (fifth) exemplary embodiment of the present disclosure, each pixel P includes an organic light emitting diode OLED, a driving transistor DT, first to eighth transistors T1 to T8, and a capacitor Cst.

The driving transistor DT controls a driving current applied to the organic light emitting diode OLED according to a source-gate voltage Vsg thereof. The driving transistor DT may be a p-type MOSFET PMOS and may be a low-temperature polycrystalline silicon (LTPS) thin film transistor. In addition, a source electrode of the driving transistor DT is connected to a first node N1, a gate electrode thereof is connected to a second node N2, and a drain electrode thereof is connected to a third node N3.

The first transistor T1 connects the gate electrode and the drain electrode. The first transistor T1 may be an n-type MOSFET NMOS to reduce the leakage current, and may be an oxide thin film transistor. The first transistor T1 includes a drain electrode connected to the third node N3, a source electrode connected to the second node N2, and a gate electrode connected to a first scan signal line for transmitting a first scan signal SC1(*n*). Thus, the first transistor T1 connects a gate electrode and a drain electrode of the driving transistor DT, in response to the first scan signal SC1(*n*) at a high level which is a turn-on level.

The second transistor T2 applies a data voltage Vdata received from the data line to the first node N1 which is the source electrode of the driving transistor DT. The second transistor T2 may be a p-type MOSFET PMOS and may be a low temperature polycrystalline silicon (LTPS) thin film transistor. The second transistor T2 includes a source electrode connected to the data line, a drain electrode connected to the first node N1, and a gate electrode connected to a second scan signal line for transmitting a second scan signal SC2(*n*). Then, the second transistor T2 applies a data voltage Vdata received from the data line to the first node N1 which is the source electrode of the driving transistor DT, in response to the second scan signal SC2(*n*) at a low level which is a turn-on level.

The third transistor T3 applies a high-potential driving voltage VDD to the first node N1 which is the source electrode of the driving transistor DT. The third transistor T3 may be a p-type MOSFET PMOS and may be a low-temperature polycrystalline silicon (LTPS) thin film transistor. The third transistor T3 includes a source electrode connected to a high-potential driving voltage line for transmitting the high-potential driving voltage VDD, a drain electrode connected to the first node N1, and a gate electrode connected to a fifth scan signal line for transmitting a fifth scan signal SC5(*n*). Then, the third transistor T3 applies the high-potential driving voltage VDD to the first node N1 which is the source electrode of the driving transistor DT, in response to the fifth scan signal SC5(*n*) at a low level which is a turn-on level.

The fourth transistor T4 forms a current path between the driving transistor DT and the organic light emitting diode OLED. The fourth transistor T4 may be a p-type MOSFET PMOS and may be a low-temperature polycrystalline silicon (LTPS) thin film transistor. The fourth transistor T4 includes a source electrode connected to the third node N3, a drain electrode connected to the fourth node N4, and a gate electrode connected to an emission signal line for transmitting an emission signal EM(*n*). The fourth transistor T4 forms a current path between the third node N3 which is the source electrode of the fourth transistor T4 and the fourth node N4 which is the drain electrode of the fourth transistor T4, in response to the emission signal EM(*n*). Then, the fourth transistor T4 forms a current path between the driving transistor DT and the organic light emitting diode OLED in response to the emission signal EM(n) at a low level which is a turn-on level.

The fifth transistor T5 applies an initial voltage Vini to the third node N3 which is the drain electrode of the driving transistor DT. The fifth transistor T5 may be a p-type MOSFET PMOS and may be a low-temperature polycrystalline silicon (LTPS) thin film transistor. The fifth transistor T5 includes a source electrode connected to an initial voltage line for transmitting the initial voltage Vini, a drain electrode connected to the third node N3, and a gate electrode connected to a third scan signal line for transmitting a third scan signal SC3(*n*). Then, the fifth transistor T5 applies the initial voltage Vini to the third node N3 which is the drain electrode of the driving transistor DT, in response to the third scan signal SC3(*n*) at a low level which is a turn-on level.

The sixth transistor T6 applies a reset voltage VAR to the fourth node N4 which is an anode of the organic light emitting diode. The sixth transistor T6 may be a p-type MOSFET PMOS and may be a low-temperature polycrystalline silicon (LTPS) thin film transistor. The sixth transistor T6 includes a source electrode connected to a reset voltage line for transmitting the reset voltage VAR, a drain electrode connected to the fourth node N4, and a gate electrode connected to a third scan signal line for transmitting a third scan signal SC3(*n*). Then, the sixth transistor T6 applies the reset voltage VAR to the fourth node N4 which is the anode of the organic light emitting diode, in response to the third scan signal SC3(*n*) at a low level which is a turn-on level.

The seventh transistor T7 applies a high-potential driving voltage VDD to the fifth node N5. The seventh transistor T7 may be a p-type MOSFET PMOS and may be a low-temperature polycrystalline silicon (LTPS) thin film transistor. The seventh transistor T7 includes a source electrode connected to a high-potential driving voltage line for transmitting the high-potential driving voltage VDD, a drain electrode connected to the fifth node N5, and a gate electrode connected to an emission signal line for transmitting an emission signal EM(n). Then, the seventh transistor T7 applies the high-potential driving voltage VDD to the fifth node N5, in response to the emission signal EM(n) at a low level which is a turn-on level.

The eighth transistor T8 applies a reference voltage Vref to the fifth node N5. The eighth transistor T8 may be a p-type MOSFET PMOS and may be a low-temperature polycrystalline silicon (LTPS) thin film transistor. The eighth transistor T8 includes a source electrode connected to a reference voltage line for transmitting the reference voltage Vref, a drain electrode connected to the fifth node N5, and a gate electrode connected to a fourth scan signal line for transmitting a fourth scan signal SC4(*n*). Then, the eighth transistor T8 applies the reference voltage Vref to the fifth node N5, in response to the fourth scan signal SC4(*n*) at a low level which is a turn-on level.

Figure 21:
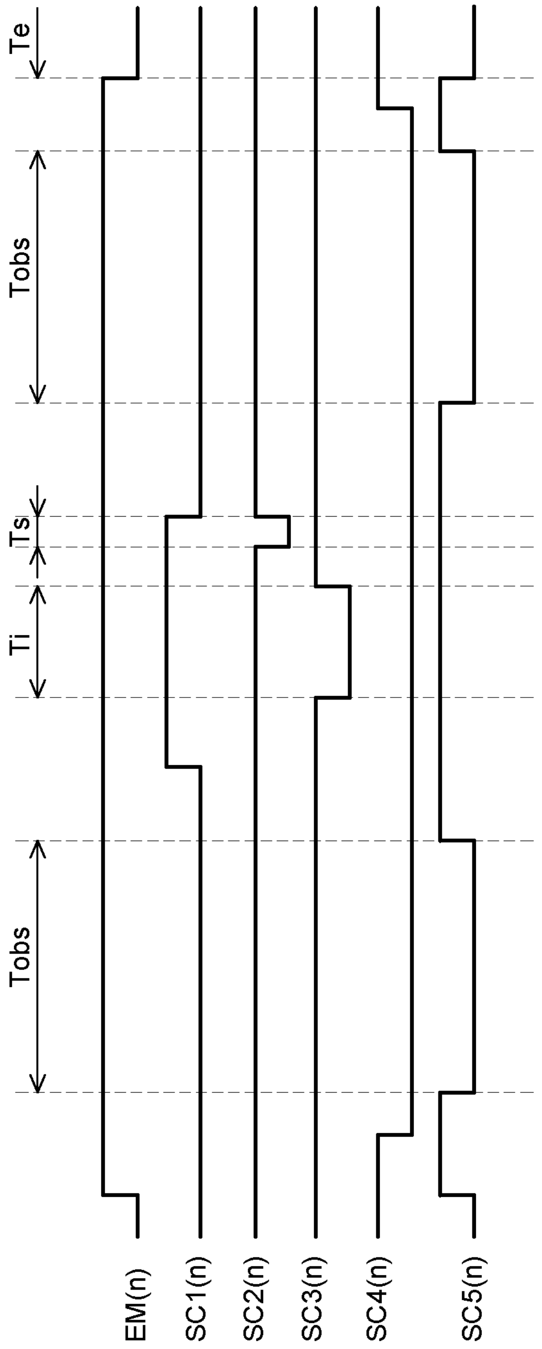
FIG. 21 is a waveform diagram illustrating an emission signal and a scan signal for a refresh frame in the organic light emitting display device according to yet another (fifth) exemplary embodiment of the present disclosure.

FIG. 21 is a waveform diagram illustrating an emission signal and a scan signal for a refresh frame in the organic light emitting display device according to yet another (fifth) exemplary embodiment of the present disclosure.

Figure 22:
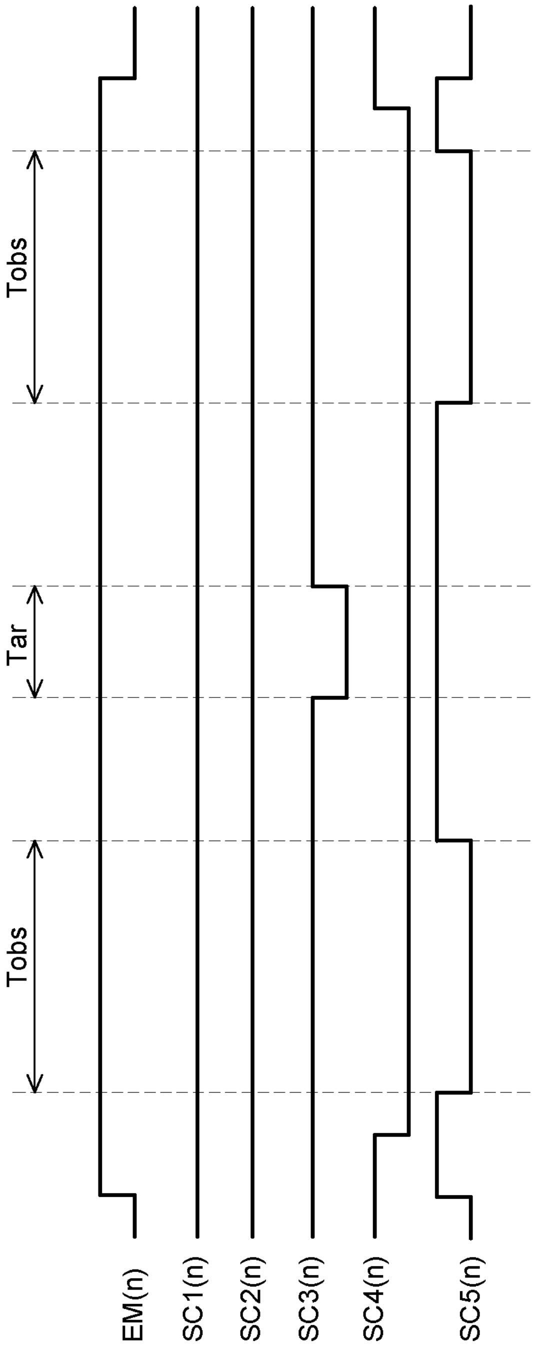
FIG. 22 is a waveform diagram illustrating an emission signal and a scan signal for a reset frame in the organic light emitting display device according to yet another (fifth) exemplary embodiment of the present disclosure.

FIG. 22 is a waveform diagram illustrating an emission signal and a scan signal for a reset frame in the organic light emitting display device according to yet another (fifth) exemplary embodiment of the present disclosure.

Figure 23A:
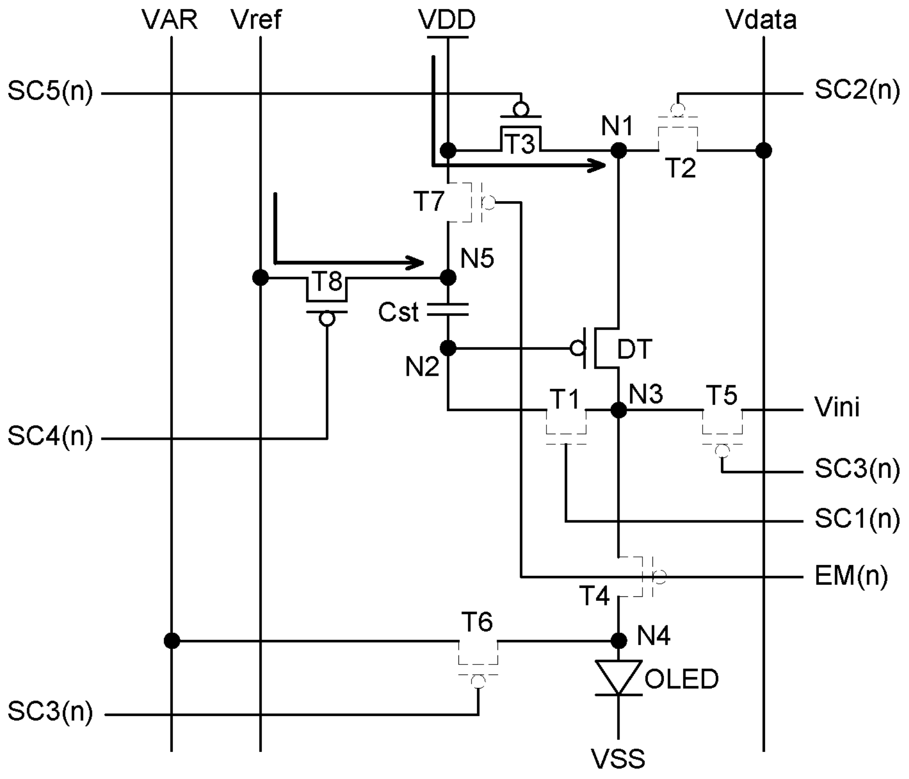
FIG. 23A is a circuit diagram of a pixel for an on-bias stress period in the organic light emitting display device according to yet another (fifth) exemplary embodiment of the present disclosure.

FIG. 23A is a circuit diagram of a pixel for an on-bias stress period in the organic light emitting display device according to yet another (fifth) exemplary embodiment of the present disclosure.

Figure 23B:
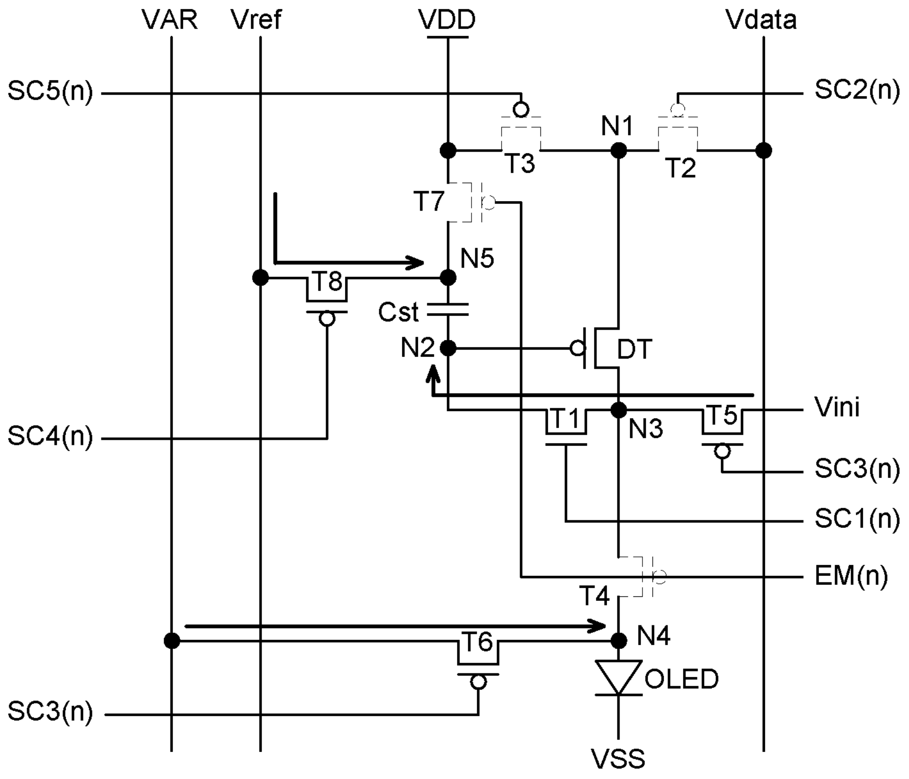
FIG. 23B is a circuit diagram of a pixel for an initial period in the organic light emitting display device according to yet another (fifth) exemplary embodiment of the present disclosure.

FIG. 23B is a circuit diagram of a pixel for an initial period in the organic light emitting display device according to yet another (fifth) exemplary embodiment of the present disclosure.

Figure 23C:
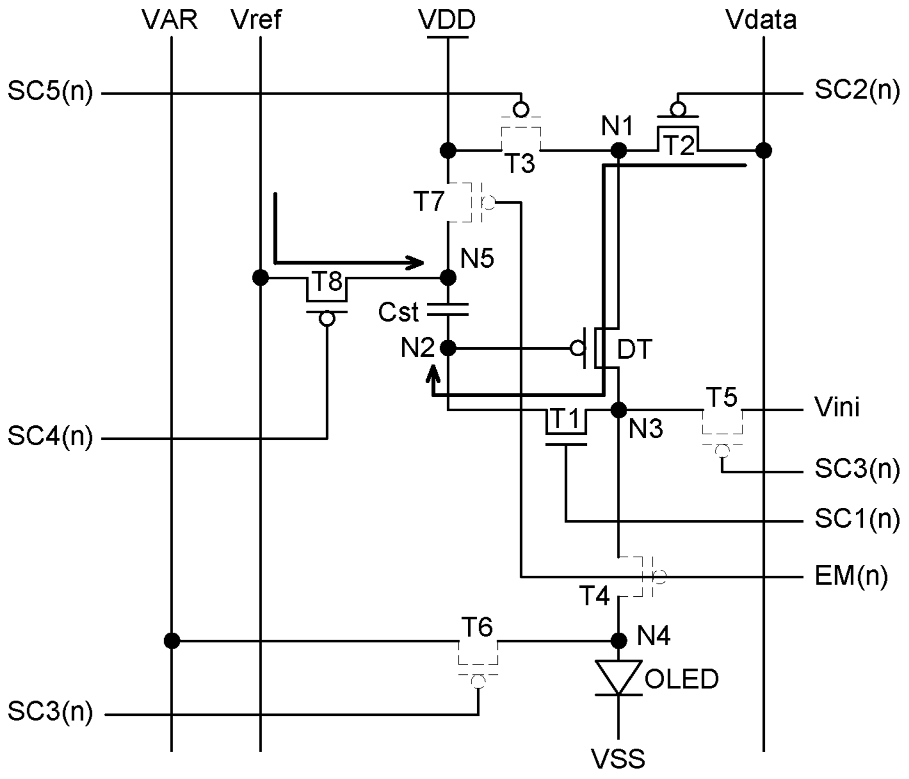
FIG. 23C is a circuit diagram of a pixel for a sampling period in the organic light emitting display device according to yet another (fifth) exemplary embodiment of the present disclosure.

FIG. 23C is a circuit diagram of a pixel for a sampling period in the organic light emitting display device according to yet another (fifth) exemplary embodiment of the present disclosure.

Figure 23D:
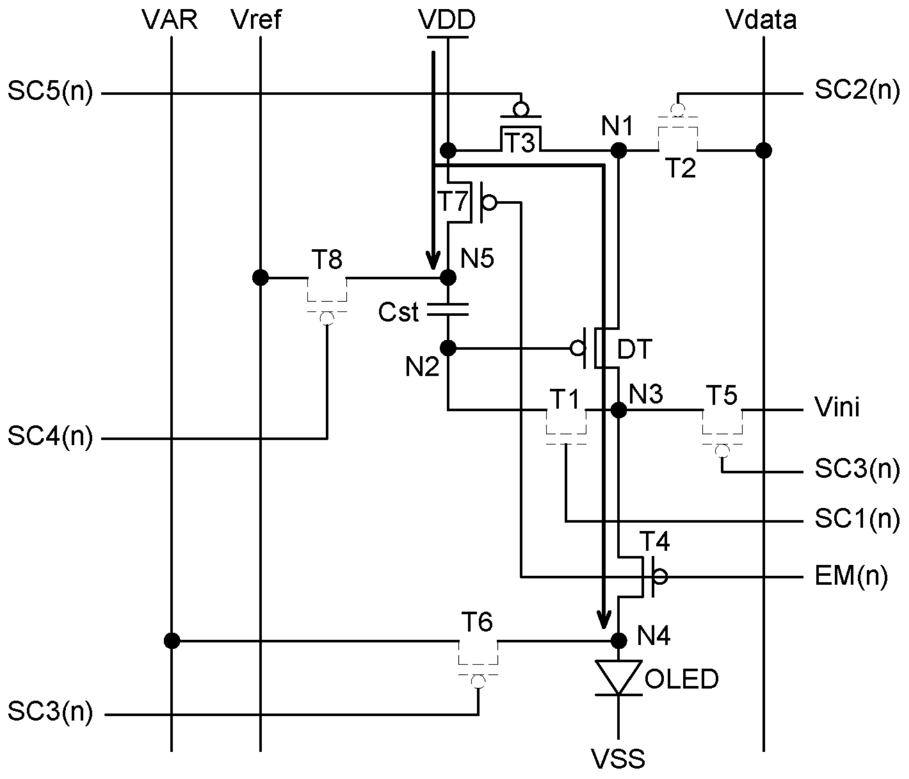
FIG. 23D is a circuit diagram of a pixel for an emission period in the organic light emitting display device according to yet another (fifth) exemplary embodiment of the present disclosure.

FIG. 23D is a circuit diagram of a pixel for an emission period in the organic light emitting display device according to yet another (fifth) exemplary embodiment of the present disclosure.

Referring to FIGS. 20 to 23D, the driving of the organic light emitting display device according to yet another (fifth) exemplary embodiment of the present disclosure will be described as follows.

The organic light emitting display device according to yet another (fifth) exemplary embodiment of the present disclosure may be driven separately in a refresh frame and a reset frame. In the refresh frame, the data voltage Vdata is programmed in each pixel, and the organic light emitting diode OLED emits light. In addition, the reset frame may be a vertical blank frame, and the anode of the organic light emitting diode OLED is reset for the reset frame.

In the organic light emitting display device according to yet another (fifth) exemplary embodiment of the present disclosure, the refresh frame may be divided into a stress period Tobs, an initial period Ti, a sampling period Ts, and an emission period Te. The stress period Tobs is a period of giving a bias stress to the first node N1 which is the source electrode of the driving transistor DT. The initial period Ti is a period of initializing the voltage of the third node N3 which is the drain electrode of the driving transistor DT. The sampling period Ts is a period for sampling a threshold voltage Vth of the driving transistor DT and programming the data voltage Vdata. The emission period Te is a period for allowing the organic light emitting diode OLED to emit light according to a driving current by a source-gate voltage of the programmed driving transistor DT.

Specifically, referring to FIGS. 21 and 23A, for a first stress period Tobs, the fifth scan signal SC5(*n*) has a low level which is a turn-on level and the fourth scan signal SC4(*n*) has a low level which is a turn-on level. In addition, the eighth transistor T8 is turned on to apply the reference voltage Vref to the fifth node N5. In addition, the third transistor T3 is turned on to apply the high-potential driving voltage VDD to the first node N1. The reference voltage Vref may have a lower level than the high-potential driving voltage VDD. Then, in the fifth node N5, the voltage is decreased from the high-potential driving voltage VDD to the reference voltage Vref. In addition, since the second node N2 is coupled with the fifth node N5 through the storage capacitor Cst, a voltage variance Vref−VDD of the fifth node N5 is reflected to the second node N2. Thus, the voltage of the second node N2 which is the gate electrode of the driving transistor DT is decreased to lower the gate-source voltage Vgs of the driving transistor DT. Therefore, for the stress period Tobs, a source-drain current Ids of the driving transistor DT flows to mitigate the hysteresis of the driving transistor DT.

In addition, referring to FIGS. 21 and 23B, for the initial period Ti, the first scan signal SC1(*n*) has a high level which is a turn-on level, the third scan signal SC3(*n*) has a low level which is a turn-on level, and the fourth scan signal SC4(*n*) has a low level which is a turn-on level. Thus, the first transistor T1 and the fifth transistor T5 are turned on, and then the initial voltage Vini is applied to the second node N2 and the third node N3. As a result, the gate electrode of the driving transistor DT is initialized to the initial voltage Vini. The initial voltage Vini may be selected within a voltage range that is sufficiently lower than an operating voltage of the organic light emitting diode OLED and set as a voltage equal to or lower than a low-potential driving voltage VSS. In addition, in the initial period Ti, the eighth transistor T8 is still turned on, and the reference voltage Vref is maintained in the fifth node N5. In addition, the sixth transistor T6 is turned on to apply the reset voltage to the fourth node N4. That is, in the initial period Ti, the anode electrode of the organic light emitting diode OLED is reset to the reset voltage VAR. In addition, in the initial period Ti, since the first scan signal SC1(*n*) and the second scan signal SC2(*n*) have a high level which is a turn-off level, the second transistor T2 and the third transistor T3 are turned off, and as a result, the first node N1 may be floated while the high-potential driving voltage VDD is applied. Thus, the gate-source voltage Vgs of the driving transistor DT may be Vini−VDD.

In addition, referring to FIGS. 21 and 23C, for the sampling period Ts, the first scan signal SC1(*n*) has a high level which is a turn-on level, the second scan signal SC2(*n*) has a low level which is a turn-on level, and the fourth scan signal SC4(*n*) has a low level which is a turn-on level. In addition, for the sampling period Ts, the second transistor T2 is turned on, and the data voltage Vdata is applied to the first node N1. In addition, since the first transistor T1 is also turned on, the driving transistor DT is connected and the gate electrode and the drain electrode of the driving transistor DT are short-circuited, so that the driving transistor DT operates like a diode.

In the sampling period Ts, a current Ids flows between the source-drain of the driving transistor DT. Since the gate electrode and the drain electrode of the driving transistor DT are connected, the voltage of the second node N2 increases by the current flowing from the source electrode to the drain electrode until the gate-source voltage Vgs of the driving transistor DT is Vth. For the sampling period Ts, the voltage of the second node N2 is charged into a voltage Vdata+Vth corresponding to a sum of the data voltage Vdata and the threshold voltage Vth of the driving transistor DT.

In addition, in the sampling period Ts, the eighth transistor T8 is still turned on, and the reference voltage Vref is maintained in the fifth node N5.

In addition, referring to FIGS. 21 and 23A, for a second stress period Tobs, the fifth scan signal SC5(*n*) has a low level which is a turn-on level and the fourth scan signal SC4(*n*) has a low level which is a turn-on level. In addition, the third transistor T3 is turned on to apply the high-potential driving voltage VDD to the first node N1. That is, for the stress period Tobs, the voltage of the second node N2 which is the gate electrode of the driving transistor DT is lowered to mitigate a hysteresis effect of the driving transistor DT. For the second stress period Tobs, the eighth transistor T8 is still turned on, and the reference voltage Vref is maintained in the fifth node N5.

In addition, referring to FIGS. 21 and 23D, for the emission period Te, the fifth scan signal SC5(*n*) has a low level which is a turn-on level and the emission signal EM(n) has a low level which is a turn-on level. Then, the third transistor T3 is turned on to apply the high-potential driving voltage VDD to the first node N1. In addition, the seventh transistor T7 is turned on to apply the high-potential driving voltage VDD to the fifth node N5. That is, in the fifth node N5, the voltage is increased from the reference voltage Vref to the high-potential driving voltage VDD. In addition, since the second node N2 is coupled with the fifth node N5 through the storage capacitor Cst, a voltage variance VDD−Vref of the fifth node N5 is reflected to the second node N2. Thus, the voltage of the second node N2, which is the gate electrode of the driving transistor DT, is changed to Vdata+Vth+(VDD−Vref). Thus, the gate-source voltage Vgs of the driving transistor DT may be Vdata+Vth−Vref. In addition, the fourth transistor T4 is turned on to form a current path of the third node N3 and the fourth node N4. As a result, the driving current Ioled via the source electrode and the drain electrode of the driving transistor DT is applied to the organic light emitting diode OLED.

For the emission period Te, a relation on the driving current Ioled flowing in the organic light emitting diode OLED is as the following Equation 1.

$$Ioled=k(Vgs-Vth)2=k(Vdata+Vth-Vref-Vth)2=k(Vdata-Vref)2 \quad \text{[Equation 1]}$$

In Equation 1, k represents a proportional constant determined by an electron mobility, a parasitic capacitance, a channel capacity, and the like of the driving transistor DT.

As shown in Equation 1, in the relation of the driving current Ioled, both a threshold voltage Vth component and a high-potential driving voltage VDD component of the driving transistor DT are erased. This means that in the organic light emitting display device according to the present disclosure, even if the threshold voltage Vth and the high-potential driving voltage VDD change, the driving current Ioled does not change. That is, the organic light emitting display device according to yet another (fifth) exemplary embodiment of the present disclosure may program the data voltage regardless of the variances of the threshold voltage Vth and the high-potential driving voltage VDD.

In addition, referring to FIG. 22, for the reset frame, the first scan signal SC1(*n*) is maintained at a low level, and the second scan signal SC2(*n*) is also maintained at a high level which is a turn-off level. Then, for the reset frame, the data voltage Vdata is not programmed in each pixel P, and the organic light emitting diode OLED does not emit light.

However, the emission signal EM(n), the third scan signal SC3(*n*), the fourth scan signal SC4(*n*) and the fifth scan signal SC5(*n*) periodically swing, respectively. That is, since the fifth scan signal SC5(*n*) periodically swings, the reset frame may include a plurality of stress periods Tobs.

That is, for the reset frame, the voltage of the second node N2, which is the gate electrode of the driving transistor DT is lowered and the source-drain current Ids of the driving transistor DT flows to mitigate the hysteresis of the driving transistor DT.

In addition, since the third scan signal SC3(*n*) periodically swings for the reset frame, the reset frame may include an anode reset period Tar in which the third scan signal SC3(*n*) has a low level which is a turn-on level.

That is, for the reset frame, the anode electrode of the organic light emitting diode OLED may be periodically reset to the reset voltage VAR.

As a result, in the organic light emitting display device according to yet another (fifth) exemplary embodiment of the present disclosure, the anode electrode of the organic light emitting diode OLED may be periodically reset through the refresh frame and the reset frame. Then, even in the driving at a low frequency, since the continuous voltage rise of the anode electrode of the organic light emitting diode OLED caused by the leakage current is suppressed, the anode electrode of the organic light emitting diode OLED may maintain a constant voltage level. Therefore, despite the switching of the driving frequency, a change in luminance of the organic light emitting display device may be reduced to increase the image quality.

The exemplary embodiments of the present disclosure can also be described as follows:

According to an aspect of the present disclosure, a pixel may comprise: an organic light emitting diode that emits light by a driving current, a driving transistor configured to control the driving current and may include a source electrode as a first node, a gate electrode as a second node, and a drain electrode as a third node, a first transistor configured to connect the second node and the third node, a second transistor configured to apply a data voltage to the first node, a third transistor configured to apply a high-potential driving voltage VDD to the second node, a fourth transistor that forms a current path between the driving transistor and the organic light emitting diode, a fifth transistor configured to apply an initial voltage Vini to the driving transistor, a sixth transistor configured to apply a reset voltage VAR to a fourth node which is an anode electrode of the organic light emitting diode, a storage capacitor that may include one electrode connected to the second node and the other electrode connected to a fifth node, a seventh transistor configured to apply the high-potential driving voltage to the fifth node, and an eighth transistor configured to apply a reference voltage Vref to the fifth node, so as to uniformize the pixel luminance of a large-scaled organic light emitting display device.

The initial voltage may set as a voltage equal to or lower than a low-potential driving voltage.

The first transistor may be an n-type oxide thin film transistor and the driving transistor, the second transistor, the third transistor, the fourth transistor, the sixth transistor, the seventh transistor, and the eighth transistor may be p-type low-temperature polycrystalline silicon (LTPS) thin film transistors, respectively, The driving current may be irrelevant to the threshold voltage and the high-potential driving voltage of the driving transistor.

The seventh transistor and the eighth transistor may be shared to a plurality of pixels disposed on one horizontal line The organic light emitting display device may further comprise a ninth transistor configured to apply a stress voltage to a source electrode of the driving transistor.

The stress voltage may be set as a voltage equal to or lower than the high-potential driving voltage.

The first transistor may include a drain electrode connected to the third node, a source electrode connected to the second node, and a gate electrode connected to a first scan signal line for transmitting a first scan signal, the second transistor may include a source electrode connected to a data line, a drain electrode connected to the first node, and a gate electrode connected to a second scan signal line for transmitting a second scan signal, the third transistor may include a source electrode connected to a high-potential driving voltage line for transmitting the high-potential driving voltage, a drain electrode connected to the first node, and a gate electrode connected to an emission signal line for transmitting an emission signal, the fourth transistor may include a source electrode connected to the third node, a drain electrode connected to the fourth node, and a gate electrode connected to the emission signal line, the fifth transistor may include a source electrode connected to an initial voltage line for transmitting the initial voltage, a drain electrode connected to the third node, and a gate electrode connected to a fourth scan signal line for transmitting a fourth scan signal, the sixth transistor may include a source electrode connected to a reset voltage line for transmitting the reset voltage, a drain electrode connected to the fourth node, and a gate electrode connected to a third scan signal line for transmitting a third scan signal, the seventh transistor may include a source electrode connected to the high-potential driving voltage line, a drain electrode connected to the fifth node, and a gate electrode connected to the emission signal line, the eighth transistor may include a source electrode connected to a reference voltage line for transmitting the reference voltage, a drain electrode connected to the fifth node, and a gate electrode connected to a fifth scan signal line for transmitting a fifth scan signal, and the ninth transistor may include a source electrode connected to a stress voltage line for transmitting the stress voltage, a drain electrode connected to the first node, and a gate electrode connected to the third scan signal line.

The first transistor may include a drain electrode connected to the third node, a source electrode connected to the second node, and a gate electrode connected to a first scan signal line for transmitting a first scan signal, the second transistor may include a source electrode connected to a data line, a drain electrode connected to the first node, and a gate electrode connected to a second scan signal line for transmitting a second scan signal, the third transistor may include a source electrode connected to a high-potential driving voltage line for transmitting the high-potential driving voltage, a drain electrode connected to the first node, and a gate electrode connected to an emission signal line for transmitting an emission signal, the fourth transistor may include a source electrode connected to the third node, a drain electrode connected to the fourth node, and a gate electrode connected to the emission signal line, the fifth transistor may include a source electrode connected to an initial voltage line for transmitting the initial voltage, a drain electrode connected to the third node, and a gate electrode connected to a third scan signal line for transmitting a third scan signal, the sixth transistor may include a source electrode connected to a reset voltage line for transmitting the reset voltage, a drain electrode connected to the fourth node, and a gate electrode connected to the third scan signal line, the seventh transistor may include a source electrode connected to the high-potential driving voltage line, a drain electrode connected to the fifth node, and a gate electrode connected to the emission signal line, and the eighth transistor may include a source electrode connected to a reference voltage line for transmitting the reference voltage, a drain electrode connected to the fifth node, and a gate electrode connected to a fourth scan signal line for transmitting a fourth scan signal.

The seventh transistor and the eighth transistor may be shared to a plurality of pixels disposed on one horizontal line.

The initial voltage may be periodically switched to a high level and a low level.

The first transistor may include a drain electrode connected to the third node, a source electrode connected to the second node, and a gate electrode connected to a first scan signal line for transmitting a first scan signal, the second transistor may include a source electrode connected to a data line, a drain electrode connected to the first node, and a gate electrode connected to a second scan signal line for transmitting a second scan signal, the third transistor may include a source electrode connected to a high-potential driving voltage line for transmitting the high-potential driving voltage, a drain electrode connected to the first node, and a gate electrode connected to a third scan signal line for transmitting a third scan signal, the fourth transistor may include a source electrode connected to the third node, a drain electrode connected to the fourth node, and a gate electrode connected to an emission signal line for transmitting an emission signal, the fifth transistor may include a source electrode connected to an initial voltage line for transmitting the initial voltage, a drain electrode connected to the second node, and a gate electrode connected to a first scan signal line at a previous stage transmitting a first scan signal at the previous stage, the sixth transistor may include a source electrode connected to a reset voltage line for transmitting the reset voltage, a drain electrode connected to the fourth node, and a gate electrode connected to a fourth scan signal line for transmitting a fourth scan signal, the seventh transistor may include a source electrode connected to the high-potential driving voltage line, a drain electrode connected to the fifth node, and a gate electrode connected to the emission signal line, and the eighth transistor may include a source electrode connected to a reference voltage line for transmitting the reference voltage, a drain electrode connected to the fifth node, and a gate electrode connected to the fourth scan signal line.

The first transistor may include a drain electrode connected to the third node, a source electrode connected to the second node, and a gate electrode connected to a first scan signal line for transmitting a first scan signal, the second transistor may include a source electrode connected to a data line, a drain electrode connected to the first node, and a gate electrode connected to a second scan signal line for transmitting a second scan signal, the third transistor may include a source electrode connected to a high-potential driving voltage line for transmitting the high-potential driving voltage, a drain electrode connected to the first node, and a gate electrode connected to a fifth scan signal line for transmitting a fifth scan signal, the fourth transistor may include a source electrode connected to the third node, a drain electrode connected to the fourth node, and a gate electrode connected to an emission signal line for transmitting an emission signal, the fifth transistor may include a source electrode connected to an initial voltage line for transmitting the initial voltage, a drain electrode connected to the third node, and a gate electrode connected to a third scan signal line for transmitting a third scan signal, the sixth transistor may include a source electrode connected to a reset voltage line for transmitting the reset voltage, a drain electrode connected to the fourth node, and a gate electrode connected to the third scan signal line, the seventh transistor may include a source electrode connected to the high-potential driving voltage line, a drain electrode connected to the fifth node, and a gate electrode connected to the emission signal line, and the eighth transistor may include a source electrode connected to a reference voltage line for transmitting the reference voltage, a drain electrode connected to the fifth node, and a gate electrode connected to a fourth scan signal line for transmitting a fourth scan signal.

The first transistor may include a drain electrode connected to the third node, a source electrode connected to the second node, and a gate electrode connected to a first scan signal line for transmitting a first scan signal, the second transistor may include a source electrode connected to a data line, a drain electrode connected to the first node, and a gate electrode connected to a second scan signal line for transmitting a second scan signal, the third transistor may include a source electrode connected to a high-potential driving voltage line for transmitting the high-potential driving voltage, a drain electrode connected to the first node, and a gate electrode connected to the first scan signal line, the fourth transistor may include a source electrode connected to the third node, a drain electrode connected to the fourth node, and a gate electrode connected to an emission signal line for transmitting an emission signal, the fifth transistor may include a source electrode connected to an initial voltage line for transmitting the initial voltage, a drain electrode connected to the third node, and a gate electrode connected to a third scan signal line for transmitting a third scan signal, the sixth transistor may include a source electrode connected to a reset voltage line for transmitting the reset voltage, a drain electrode connected to the fourth node, and a gate electrode connected to the third scan signal line, the seventh transistor may include a source electrode connected to the high-potential driving voltage line, a drain electrode connected to the fifth node, and a gate electrode connected to the emission signal line, and the eighth transistor may include a source electrode connected to a reference voltage line for transmitting the reference voltage, a drain electrode connected to the fifth node, and a gate electrode connected to a fourth scan signal line for transmitting a fourth scan signal.

According to an aspect of the present disclosure, an organic light emitting display device may comprise a plurality of pixels as disclosed above disposed on a display panel.

The organic light emitting display device may be driven separately in a refresh frame of programming the data voltage and a reset frame of resetting an anode of the organic light emitting diode in the pixels, the refresh frame may be divided into a stress period, an initial period, a sampling period, and an emission period, and for the stress period, a bias stress may be applied to the driving transistor, for the initial period, the second node or the third node may be initialized to the initial voltage, for the sampling period, the second node may be charged to a voltage corresponding to a sum of the data voltage and a threshold voltage (Vth) of the driving transistor, and for the emission period, the driving current may be applied to the organic light emitting diode, and the organic light emitting diode emits light.

The refresh frame may further include another stress period between the sampling period and the emission period in which the eighth transistor is turned on and the reference voltage is maintained at the fifth node.

For the reset frame, the anode electrode of the organic light emitting diode may reset to the reset voltage, and apply a bias stress to the first node.

The reset frame may include a plurality of stress periods.

For the emission period, the voltage of the second node may be $V_{data}+V_{th}+(VDD-V_{ref})$, the voltage of the first node is VDD, and the gate-source voltage of the driving transistor is $V_{data}+V_{th}-V_{ref}$.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A pixel for an organic light emitting display device comprising:

an organic light emitting diode that emits light by a driving current;

a driving transistor configured to control the driving current, the driving transistor including a source electrode as a first node, a gate electrode as a second node, and a drain electrode as a third node;

a first transistor configured to connect the second node and the third node;

a second transistor configured to apply a data voltage (Vdata) to the first node according to a second scan signal applied to the second transistor;

a third transistor configured to apply a first-potential driving voltage (VDD) to the first node;

a fourth transistor that forms a current path between the driving transistor and the organic light emitting diode according to an emission signal applied to the fourth transistor;

a fifth transistor configured to apply an initial voltage to the driving transistor;

a sixth transistor configured to apply a reset voltage to a fourth node which is an anode electrode of the organic light emitting diode;

a storage capacitor that includes one electrode connected to the second node and another electrode connected to a fifth node;

a seventh transistor configured to apply the first-potential driving voltage to the fifth node;

an eighth transistor configured to apply a reference voltage (Vref) to the fifth node; and a ninth transistor connected to the source electrode of the driving transistor, the ninth transistor configured to apply a stress voltage to the source electrode of the driving transistor, wherein the organic light emitting display device is driven separately in a refresh frame during which the data voltage is programmed and a reset frame during which the data voltage is not programmed following the programming of the data voltage during the refresh frame, and the ninth transistor is configured to apply the stress voltage to the source electrode of the driving transistor after the second scan signal is applied to the second transistor that turns on the second transistor during a portion of the refresh frame and apply the same stress voltage to the source electrode of the driving transistor after the second transistor is turned on during the portion of the refresh frame and after the emission signal transitions from a first level to a second level that turns off the fourth transistor during a portion of the reset frame such that during a period of time between the refresh frame and the reset frame the stress voltage is not applied to the source electrode of the driving transistor.

2. The pixel of claim 1, wherein the initial voltage is set as a voltage equal to or less than a second-potential driving voltage that is less than the first-potential driving voltage.

3. The pixel of claim 1, wherein the first transistor is an n-type oxide thin film transistor, and the driving transistor, the second transistor, the third transistor, the fourth transistor, the sixth transistor, the seventh transistor, and the eighth transistor are p-type low-temperature polycrystalline silicon thin film transistors, respectively.

4. The pixel of claim 1, wherein the driving current is irrelevant to a threshold voltage and the first-potential driving voltage of the driving transistor.

5. The pixel of claim 1, wherein the stress voltage is set as a voltage equal to or less than the first-potential driving voltage.

6. The pixel of claim 1, wherein the first transistor includes a drain electrode connected to the third node, a source electrode connected to the second node, and a gate electrode connected to a first scan signal line for transmitting a first scan signal, the second transistor includes a source electrode connected to a data line, a drain electrode connected to the first node, and a gate electrode connected to a second scan signal line for transmitting the second scan signal, the third transistor includes a source electrode connected to a first-potential driving voltage line for transmitting the first-potential driving voltage, a drain electrode connected to the first node, and a gate electrode connected to an emission signal line for transmitting the emission signal, the fourth transistor includes a source electrode connected to the third node, a drain electrode connected to the fourth node, and a gate electrode connected to the emission signal line, the fifth transistor includes a source electrode connected to an initial voltage line for transmitting the initial voltage, a drain electrode connected to the third node, and a gate electrode connected to a fourth scan signal line for transmitting a fourth scan signal, the sixth transistor includes a source electrode connected to a reset voltage line for transmitting the reset voltage, a drain electrode connected to the fourth node, and a gate electrode connected to a third scan signal line for transmitting a third scan signal, the seventh transistor includes a source electrode connected to the first-potential driving voltage line, a drain electrode connected to the fifth node, and a gate electrode connected to the emission signal line, the eighth transistor includes a source electrode connected to a reference voltage line for transmitting the reference voltage, a drain electrode connected to the fifth node, and a gate electrode connected to a fifth scan signal line for transmitting a fifth scan signal, and the ninth transistor includes a source electrode connected to a stress voltage line for transmitting the stress voltage, a drain electrode connected to the first node, and a gate electrode connected to the third scan signal line.

7. An organic light emitting display device comprising:

a plurality of pixels including the pixel according to claim 1 disposed on a display panel.

8. The organic light emitting display device of claim 7, wherein the refresh frame includes a stress period, an initial period, a sampling period, and an emission period, and for the stress period, a bias stress is applied to the driving transistor, for the initial period, the second node or the third node is initialized to the initial voltage, for the sampling period, the second node is charged to a voltage corresponding to a sum of the data voltage and a threshold voltage (Vth) of the driving transistor, and for the emission period, the driving current is applied to the organic light emitting diode, and the organic light emitting diode emits light.

9. The organic light emitting display device of claim 8, wherein the refresh frame further includes another stress period between the sampling period and the emission period in which the eighth transistor is turned on and the reference voltage is maintained at the fifth node.

10. The organic light emitting display device of claim 8, wherein for the reset frame, the anode electrode of the organic light emitting diode is reset to the reset voltage, and applies a bias stress to the first node.

11. The organic light emitting display device of claim 8, wherein the reset frame includes a plurality of stress periods.

12. The organic light emitting display device of claim 8, wherein for the emission period, a voltage of the second node is Vdata+Vth+(VDD−Vref), a voltage of the first node is VDD, and a gate-source voltage of the driving transistor is Vdata+Vth−Vref.

* * * * *